US012520358B2

(12) United States Patent
Cheng et al.

(10) Patent No.: US 12,520,358 B2
(45) Date of Patent: Jan. 6, 2026

(54) UPLINK ACTIVITY IN SECONDARY CELL GROUP SUSPENSION

(71) Applicant: Qualcomm Incorporated, San Diego, CA (US)

(72) Inventors: Peng Cheng, Beijing (CN); Yu-Ting Yu, Union City, CA (US); Huichun Liu, Beijing (CN); Linhai He, San Diego, CA (US); Gavin Bernard Horn, La Jolla, CA (US); Masato Kitazoe, Hachiouji (JP)

(73) Assignee: Qualcomm Incorporated, San Diego, CA (US)

( * ) Notice: Subject to any disclaimer, the term of this patent is extended or adjusted under 35 U.S.C. 154(b) by 496 days.

(21) Appl. No.: 17/286,708

(22) PCT Filed: Dec. 3, 2019

(86) PCT No.: PCT/CN2019/122573
§ 371 (c)(1),
(2) Date: Apr. 19, 2021

(87) PCT Pub. No.: WO2020/114372
PCT Pub. Date: Jun. 11, 2020

(65) Prior Publication Data
US 2021/0352750 A1  Nov. 11, 2021

(51) Int. Cl.
*H04W 76/15* (2018.01)
*H04W 24/08* (2009.01)
(Continued)

(52) U.S. Cl.
CPC ........... *H04W 76/15* (2018.02); *H04W 24/08* (2013.01); *H04W 24/10* (2013.01);
(Continued)

(58) Field of Classification Search
CPC ..... H04W 76/15; H04W 24/08; H04W 24/10; H04W 56/0045; H04W 72/21; H04W 76/27; H04W 28/0864
See application file for complete search history.

(56) References Cited

U.S. PATENT DOCUMENTS

2017/0332431 A1   11/2017  Kim et al.
2017/0359747 A1   12/2017  Lunden et al.
(Continued)

FOREIGN PATENT DOCUMENTS

CN   105075314 A   11/2015
CN   105340343 A   2/2016
(Continued)

OTHER PUBLICATIONS

Pupiales et al., "Fast Data Recovery for Improved Mobility Support in Multiradio Dual Connectivity" IEEE 2022 (Year: 2022).*
(Continued)

*Primary Examiner* — Omer S Mian
(74) *Attorney, Agent, or Firm* — Holland & Hart LLP

(57) ABSTRACT

Methods, systems, and devices for wireless communications are described. The method may include receiving from a master cell group of a dual connectivity environment a first message indicating that a secondary cell group of the dual connectivity environment is suspended, maintaining a lower layer configuration for the secondary cell group and modifying a measurement report configuration for the secondary cell group based on the first message and while the secondary cell group is suspended, receiving from the master cell group a second message indicating that the secondary cell group is no longer suspended, and reconnecting to the secondary cell group using the lower layer configuration for the secondary cell group based on the second message.

26 Claims, 24 Drawing Sheets

(51) Int. Cl.
    *H04W 24/10*     (2009.01)
    *H04W 56/00*     (2009.01)
    *H04W 72/21*     (2023.01)
    *H04W 76/27*     (2018.01)

(52) U.S. Cl.
    CPC ....... *H04W 56/0045* (2013.01); *H04W 72/21* (2023.01); *H04W 76/27* (2018.02)

(56) References Cited

U.S. PATENT DOCUMENTS

| | | | |
|---|---|---|---|
| 2018/0242326 A1* | 8/2018 | Aiba | H04L 1/1848 |
| 2018/0278357 A1 | 9/2018 | Kim et al. | |
| 2018/0302848 A1 | 10/2018 | Liu et al. | |
| 2020/0245393 A1* | 7/2020 | Teyeb | H04W 76/25 |
| 2021/0274587 A1* | 9/2021 | Jung | H04W 12/0433 |
| 2022/0304071 A1* | 9/2022 | Pelletier | H04W 74/0891 |
| 2022/0418002 A1* | 12/2022 | Dinan | H04W 52/22 |

FOREIGN PATENT DOCUMENTS

| | | |
|---|---|---|
| CN | 106105340 A | 11/2016 |
| CN | 108366401 A | 8/2018 |
| CN | 108574993 A | 9/2018 |
| EP | 3796744 A1 | 3/2021 |
| WO | WO-2014126356 A1 | 8/2014 |
| WO | WO-2016026109 A1 | 2/2016 |

OTHER PUBLICATIONS

Rosa et al., "Dual Connectivity for LTE Small Cell Evolution: Functionality and Performance Aspects", 2016, IEEE (Year: 2016).*
Ericsson: "RRC Suspend/Resume in LTE-NR Tight Interworking", 3GPP TSG-RAN WG2 NR AH#2, Tdoc R2-1706634, (Revision of R2-1704452), Qingdao, P.R. of China, Jun. 27-29, 2017, pp. 1-4.
Ericsson: "Independent Handling of SCG Resume/suspend", 3GPP Draft, 3GPP TSG-RAN WG2 #107, R2-1910266, Independent Handling of SCG Resume suspend, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 15, 2019 (Aug. 15, 2019), XP051768045, 3 Pages.
Qualcomm Incorporated: "RRC_Inactive with MR_DC", 3GPP Draft, 3GPP TSG-RAN WG3 Meeting NR Ad-Hoc2, R3-172430, RRC_Inactive With MR_DC, 3rd Generation Partnership Project (3GPP), Mobile Competence Centre, 650, Route Des Lucioles, F-06921 Sophia-Antipolis Cedex, France, vol. RAN WG3, No. Qingdao, China, Jun. 27, 2017-Jun. 29, 2017, Jun. 20, 2017 (Jun. 20, 2017), XP051308067, 6 Pages.
Supplementary European Search Report—EP19893695—Search Authority—Berlin—Jul. 29, 2022.
ZTE Corporation: "Inactive Mode Handling in NSA", 3GPP Draft, 3GPP TSG-RAN WG2 Meeting #99, R2-1708135, Inactive Mode Handling in NSA, 3rd Generation Partnership Project (3GPP), Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017 (Aug. 20, 2017), XP051318038, 3 Pages.
Interdigital: "Summary of [103#50][NR late drop]—MR-DC Configuration in Inactive (Interdigital)", R2-1814021, 3GPP TSG-RAN WG2 Meeting #103bis, Chengdu, China, Oct. 8-12, 2018, Oct. 12, 2018, 18 Pages, Section 2, Section, 1-3, the whole document.
International Search Report and Written Opinion—PCT/CN2018/119234—ISA/EPO—Sep. 2, 2019.
International Search Report and Written Opinion—PCT/CN2019/101005—ISA/EPO—Nov. 21, 2019.
International Search Report and Written Opinion—PCT/CN2019/122573—ISA/EPO—Feb. 26, 2020.

* cited by examiner

UPLINK ACTIVITY IN SECONDARY CELL GROUP SUSPENSION

CROSS REFERENCE TO RELATED APPLICATIONS

The present Application for Patent claims priority to International Patent Application No. PCT/CN2019/122573 by Cheng et al., entitled "UPLINK ACTIVITY IN SECONDARY CELL GROUP SUSPENSION," filed Dec. 3, 2019; and to International Patent Application No. PCT/CN2019/101005 by Cheng et al., entitled "UL ACTIVITY IN SCG SUSPENSION," filed Aug. 16, 2019, and International Patent Application No. PCT/CN2018/119234 by Cheng et al., entitled "FAST SECONDARY CELL GROUP ACTIVATION AND DEACTIVATION USING A SUSPENDED STATE," filed Dec. 4, 2018, which are assigned to the assignee hereof, and which are each incorporated by reference herein in their entirety.

BACKGROUND

The following relates generally to wireless communications, and more specifically to fast secondary cell group activation and deactivation using suspension and uplink activity during secondary cell group suspension.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples, a UE may support dual connectivity in which the UE maintains simultaneous connections with two or more cellular base stations. Some dual connectivity systems may introduce latency and overhead under certain circumstances. In some cases, it may be desirable to reduce the latency associated with dual connectivity systems.

SUMMARY

The described techniques relate to improved methods, systems, devices, and apparatuses that support fast secondary cell group activation and deactivation using a suspended state. Generally, the described techniques provide for implementing a suspended state for a secondary cell group that enables a base station of a master cell group to temporarily place a secondary cell group in a suspended state to conserve UE power when no data is exchanged between the UE and the secondary cell group. The use of the suspended state for the secondary cell group allows for a fast reactivation of the secondary cell group with reduced signaling overhead, thereby increasing performance of the secondary cell group while conserving UE resources. If a UE detects uplink data for the suspended base station, the UE may act so that the UE is able to provide the uplink data to the suspended base station without waiting for the suspended base station to be independently activated. The action taken by the UE to provide the uplink data may vary based on the UE's behavior during suspension.

A method for wireless communication at a UE is described. The method may include receiving from a master cell group of a dual connectivity environment a first message indicating that a secondary cell group of the dual connectivity environment is suspended, maintaining a lower layer configuration for the secondary cell group and modifying a measurement report configuration for the secondary cell group based on the first message and while the secondary cell group is suspended, receiving from the master cell group a second message indicating that the secondary cell group is no longer suspended, and reconnecting to the secondary cell group using the lower layer configuration for the secondary cell group based on the second message.

An apparatus for wireless communication at a UE is described. The apparatus may include a processor, memory in electronic communication with the processor, and instructions stored in the memory. The instructions may be executable by the processor to cause the apparatus to receive from a master cell group of a dual connectivity environment a first message indicating that a secondary cell group of the dual connectivity environment is suspended, maintain a lower layer configuration for the secondary cell group and modify a measurement report configuration for the secondary cell group based on the first message and while the secondary cell group is suspended, receive from the master cell group a second message indicating that the secondary cell group is no longer suspended, and reconnect to the secondary cell group using the lower layer configuration for the secondary cell group based on the second message.

Another apparatus for wireless communication at a UE is described. The apparatus may include means for receiving from a master cell group of a dual connectivity environment a first message indicating that a secondary cell group of the dual connectivity environment is suspended, means for maintaining a lower layer configuration for the secondary cell group and modifying a measurement report configuration for the secondary cell group based on the first message and while the secondary cell group is suspended, means for receiving from the master cell group a second message indicating that the secondary cell group is no longer suspended, and means for reconnecting to the secondary cell group using the lower layer configuration for the secondary cell group based on the second message.

A non-transitory computer-readable medium storing code for wireless communication at a UE is described. The code may include instructions executable by a processor to receive from a master cell group of a dual connectivity environment a first message indicating that a secondary cell group of the dual connectivity environment is suspended, maintain a lower layer configuration for the secondary cell group and modify a measurement report configuration for the secondary cell group based on the first message and while the secondary cell group is suspended, receive from the master cell group a second message indicating that the secondary cell group is no longer suspended, and reconnect to the secondary cell group using the lower layer configuration for the secondary cell group based on the second message.

In some examples of the method, apparatuses, and non-transitory computer-readable medium described herein, the lower layer configuration includes a physical layer configuration, a medium access control (MAC) configuration, and a radio link control (RLC) configuration.

In some examples of the method, apparatuses, and non-transitory computer-readable medium described herein, reconnecting to the secondary cell group may include operations, features, means, or instructions for reconfiguring the lower layer configuration for the secondary cell group such that data associated with the secondary cell group is mapped to lower layers of the master cell group while the secondary cell group is suspended.

Some examples of the method, apparatuses, and non-transitory computer-readable medium described herein may further include operations, features, means, or instructions for receiving the updated lower layer configuration of the secondary cell group from master cell group while the secondary cell group is suspended.

In some examples of the method, apparatuses, and non-transitory computer-readable medium described herein, reconnecting to the secondary cell group may include operations, features, means, or instructions for reconfiguring the lower layer configuration of the secondary cell group such that data associated with the secondary cell group is mapped to the lower layer of the secondary cell group.

In some examples of the method, apparatuses, and non-transitory computer-readable medium described herein, the first message or the second message includes one or more of: a MAC control element (MAC-CE), a downlink control information (DCI), or a radio resource control (RRC) message.

In some examples of the method, apparatuses, and non-transitory computer-readable medium described herein, reconnecting to the secondary cell group may include operations, features, means, or instructions for performing a random access procedure with a primary secondary cell of the secondary cell group.

Some examples of the method, apparatuses, and non-transitory computer-readable medium described herein may further include operations, features, means, or instructions for receiving a timing advance parameter from the secondary cell group during the random access procedure.

Some examples of the method, apparatuses, and non-transitory computer-readable medium described herein may further include operations, features, means, or instructions for determining, prior to the first message, a system frame number offset between the master cell group and the secondary cell group, where reconnecting to the secondary cell group includes determining a timing advance parameter based on the system frame number offset, a first propagation delay associated with the master cell group, and a second propagation delay associated with the secondary cell group.

Some examples of the method, apparatuses, and non-transitory computer-readable medium described herein may further include operations, features, means, or instructions for receiving from the master cell group a first master information block indicating the first propagation delay, and receiving from the secondary cell group a second master information block indicating the second propagation delay.

In some examples of the method, apparatuses, and non-transitory computer-readable medium described herein, the system frame number offset is received in a radio resource control message.

In some examples of the method, apparatuses, and non-transitory computer-readable medium described herein, modifying the measurement report configuration for the secondary cell group may include operations, features, means, or instructions for refraining from performing one or more of radio resource management measurements for the secondary cell group or channel quality indicator measurements for the secondary cell group.

In some examples of the method, apparatuses, and non-transitory computer-readable medium described herein, modifying the measurement report configuration for the secondary cell group may include operations, features, means, or instructions for limiting radio resource management measurements to serving cells of the secondary cell group while the secondary cell group is suspended.

In some examples of the method, apparatuses, and non-transitory computer-readable medium described herein, modifying the measurement report configuration for the secondary cell group may include operations, features, means, or instructions for limiting radio resource management measurements to a fixed number of frequencies of the secondary cell group, where the fixed number of frequencies includes a frequency of a primary secondary cell of the secondary cell group.

Some examples of the method, apparatuses, and non-transitory computer-readable medium described herein may further include operations, features, means, or instructions for receiving from the master cell group a measurement periodicity configuration for the secondary cell group via a radio resource control message.

In some examples of the method, apparatuses, and non-transitory computer-readable medium described herein, modifying the measurement report configuration for the secondary cell group may include operations, features, means, or instructions for performing a radio resource management measurement of the secondary cell group in accordance with the received measurement periodicity configuration while the secondary cell group is suspended, and transmitting to the master cell group a radio resource management measurement report for the secondary cell group.

Some examples of the method, apparatuses, and non-transitory computer-readable medium described herein may further include operations, features, means, or instructions for receiving from the master cell group, while the secondary cell group is suspended, a channel measurement trigger for the secondary cell group, performing a channel measurement of the secondary cell group based on a tracking reference signal of the secondary cell group, and transmitting to the master cell group a channel measurement report for the secondary cell group.

In some examples of the method, apparatuses, and non-transitory computer-readable medium described herein, the channel measurement trigger is indicated in DCI. In some examples of the method, apparatuses, and non-transitory computer-readable medium described herein, the tracking reference signal is from the secondary cell group. In some examples of the method, apparatuses, and non-transitory computer-readable medium described herein, the tracking reference signal is from the master cell group and is quasi-co-located (QCL) with the secondary cell group. In some examples of the method, apparatuses, and non-transitory computer-readable medium described herein, the tracking reference signal is aperiodic or semi-persistent.

Some examples of the method, apparatuses, and non-transitory computer-readable medium described herein may further include operations, features, means, or instructions for transmitting to the master cell group an activation request for the secondary cell group. In some examples of the method, apparatuses, and non-transitory computer-readable medium described herein, transmitting the activation request is based at least in part on a status of an uplink buffer for the secondary cell group. In some examples of the method, apparatuses, and non-transitory computer-readable medium described herein, the activation request comprises one or more of: a MAC-CE, a buffer status report, a scheduling request, or a contention free random access preamble.

Some examples of the method, apparatuses, and non-transitory computer-readable medium described herein may further include operations, features, means, or instructions for determining, while the secondary cell group is suspended, that there is data in an uplink buffer for the secondary cell group, and transmitting, while the secondary cell group is suspended, the data to the secondary cell group using the maintained lower layer configuration for the secondary cell group.

Some examples of the method, apparatuses, and non-transitory computer-readable medium described herein may further include operations, features, means, or instructions for maintaining a timing advance (TA) timer for the secondary cell group while the secondary cell group is suspended, the TA timer indicating whether the UE has maintained synchronization with the secondary cell group.

Some examples of the method, apparatuses, and non-transitory computer-readable medium described herein may further include operations, features, means, or instructions for determining, based on the TA timer, that the UE has maintained synchronization with the secondary cell group, transmitting, based on determining that the UE has maintained synchronization, a scheduling request to the secondary cell group on physical uplink control channel (PUCCH) resources maintained during suspension of the secondary cell group, and receiving an uplink grant in response to the scheduling request, where the data is transmitted to the secondary cell group based on the received uplink grant.

Some examples of the method, apparatuses, and non-transitory computer-readable medium described herein may further include operations, features, means, or instructions for determining, based on the TA timer, that the UE has lost synchronization with the secondary cell group, performing a random access procedure with the secondary cell group based on determining that the UE has lost synchronization with the secondary cell group, and obtaining timing information for the secondary cell group via the random access procedure, where the data is transmitted to the secondary cell group using the timing information.

Some examples of the method, apparatuses, and non-transitory computer-readable medium described herein may further include operations, features, means, or instructions for maintaining data radio bearers (DRBs) associated with the secondary cell group while the secondary cell group is suspended.

Some examples of the method, apparatuses, and non-transitory computer-readable medium described herein may further include operations, features, means, or instructions for maintaining uplink resources configured by an uplink grant for the secondary cell group while the secondary cell group is suspended, where the data is transmitted to the secondary cell group using the maintained uplink resources.

Some examples of the method, apparatuses, and non-transitory computer-readable medium described herein may further include operations, features, means, or instructions for refraining from sending a scheduling request to, or performing a random access procedure with, the secondary cell group based on the uplink resources being maintained.

Some examples of the method, apparatuses, and non-transitory computer-readable medium described herein may further include operations, features, means, or instructions for transmitting a sounding reference signal (SRS), or channel state information (CSI), or both, to the secondary cell group while the secondary cell group is suspended.

Some examples of the method, apparatuses, and non-transitory computer-readable medium described herein may further include operations, features, means, or instructions for stopping a TA timer for the secondary cell group based on the secondary cell group being in the suspended state, the TA timer indicating whether the UE has maintained synchronization with the secondary cell group.

Some examples of the method, apparatuses, and non-transitory computer-readable medium described herein may further include operations, features, means, or instructions for releasing, based on the secondary cell group being suspended, uplink resources for control information associated with the secondary cell group, and transmitting to the master cell group an activation request for the secondary cell group based on releasing of the uplink resources for control information.

Some examples of the method, apparatuses, and non-transitory computer-readable medium described herein may further include operations, features, means, or instructions for releasing, based on the secondary cell group being suspended, uplink resources configured by an uplink grant for the secondary cell group.

In some examples of the method, apparatuses, and non-transitory computer-readable medium described herein, the activation request includes one or more of an uplink MAC-CE, a DCI message, or an RRC message.

Some examples of the method, apparatuses, and non-transitory computer-readable medium described herein may further include operations, features, means, or instructions for releasing resources for contention free random access (CFRA) based on the secondary cell group being suspended, and suspending DRBs associated with the secondary cell group based on the secondary cell group being suspended.

Some examples of the method, apparatuses, and non-transitory computer-readable medium described herein may further include operations, features, means, or instructions for identifying that the UE is prohibited from performing a random access procedure with a primary secondary cell (PSCell) of the secondary cell group while the secondary cell group is suspended, and stopping a TA timer for the secondary cell group based on determining that the UE is prohibited from performing the random access procedure, the TA timer indicating whether the UE has maintained synchronization with the secondary cell group.

Some examples of the method, apparatuses, and non-transitory computer-readable medium described herein may further include operations, features, means, or instructions for identifying that the UE may be allowed to perform a random access procedure with a PSCell of the secondary cell group while the secondary cell group is suspended, and maintaining a TA timer for the secondary cell group based on determining that the UE may be allowed to perform the random access procedure, the TA timer indicating whether the UE has maintained synchronization with the secondary cell group.

Some examples of the method, apparatuses, and non-transitory computer-readable medium described herein may further include operations, features, means, or instructions for refraining from monitoring physical downlink control channel (PDCCH) resources associated with the secondary cell group while the secondary cell group is suspended.

A method for wireless communication at a UE is described. The method may include receiving from a master cell group of a dual connectivity environment a first message indicating that a secondary cell group of the dual connectivity environment is suspended, maintaining a lower layer configuration for the secondary cell group and modifying a measurement report configuration for the secondary cell group based on the first message and while the secondary cell group is suspended, determining that there is data in an uplink buffer for the secondary cell group while the secondary cell group is suspended, and transmitting, based on the determination, the data to the secondary cell group using the lower layer configuration for the secondary cell group.

An apparatus for wireless communication at a UE is described. The apparatus may include a processor, memory in electronic communication with the processor, and instructions stored in the memory. The instructions may be executable by the processor to cause the apparatus to receive from a master cell group of a dual connectivity environment a first message indicating that a secondary cell group of the dual connectivity environment is suspended, maintain a lower layer configuration for the secondary cell group and modify a measurement report configuration for the secondary cell group based on the first message and while the secondary cell group is suspended, determine that there is data in an uplink buffer for the secondary cell group while the secondary cell group is suspended, and transmit, based on the determination, the data to the secondary cell group using the lower layer configuration for the secondary cell group.

Another apparatus for wireless communication at a UE is described. The apparatus may include means for receiving from a master cell group of a dual connectivity environment a first message indicating that a secondary cell group of the dual connectivity environment is suspended, means for maintaining a lower layer configuration for the secondary cell group and modifying a measurement report configuration for the secondary cell group based on the first message and while the secondary cell group is suspended, means for determining that there is data in an uplink buffer for the secondary cell group while the secondary cell group is suspended, and means for transmitting, based on the determination, the data to the secondary cell group using the lower layer configuration for the secondary cell group.

A non-transitory computer-readable medium storing code for wireless communication at a UE is described. The code may include instructions executable by a processor to receive from a master cell group of a dual connectivity environment a first message indicating that a secondary cell group of the dual connectivity environment is suspended, maintain a lower layer configuration for the secondary cell group and modify a measurement report configuration for the secondary cell group based on the first message and while the secondary cell group is suspended, determine that there is data in an uplink buffer for the secondary cell group while the secondary cell group is suspended, and transmit, based on the determination, the data to the secondary cell group using the lower layer configuration for the secondary cell group.

Some examples of the method, apparatuses, and non-transitory computer-readable medium described herein may further include operations, features, means, or instructions for maintaining a TA timer for the secondary cell group while the secondary cell group is suspended, the TA timer indicating whether the UE has maintained synchronization with the secondary cell group.

Some examples of the method, apparatuses, and non-transitory computer-readable medium described herein may further include operations, features, means, or instructions for determining, based on the TA timer, that the UE has maintained synchronization with the secondary cell group, transmitting, based on determining that the UE has maintained synchronization, a scheduling request to the secondary cell group on PUCCH resources maintained during the suspension of the secondary cell group, and receiving an uplink grant in response to the scheduling request, where the data is transmitted to the secondary cell group based on the received uplink grant.

Some examples of the method, apparatuses, and non-transitory computer-readable medium described herein may further include operations, features, means, or instructions for determining, based on the TA timer, that the UE has lost synchronization with the secondary cell group, performing a random access procedure with the secondary cell group based on determining that the UE has lost synchronization with the secondary cell group, and obtaining timing information for the secondary cell group via the random access procedure, where the data is transmitted to the secondary cell group using the timing information.

Some examples of the method, apparatuses, and non-transitory computer-readable medium described herein may further include operations, features, means, or instructions for maintaining DRBs associated with the secondary cell group while the secondary cell group is suspended.

Some examples of the method, apparatuses, and non-transitory computer-readable medium described herein may further include operations, features, means, or instructions for maintaining uplink resources configured by an uplink grant for the secondary cell group while the secondary cell group is suspended, where the data is transmitted to the secondary cell group using the maintained uplink resources.

Some examples of the method, apparatuses, and non-transitory computer-readable medium described herein may further include operations, features, means, or instructions for refraining from sending a scheduling request to, or performing a random access procedure with, the secondary cell group based on the uplink resources being maintained.

Some examples of the method, apparatuses, and non-transitory computer-readable medium described herein may further include operations, features, means, or instructions for transmitting a sounding reference signal (SRS), or CSI, or both, to the secondary cell group while the secondary cell group is suspended.

Some examples of the method, apparatuses, and non-transitory computer-readable medium described herein may further include operations, features, means, or instructions for releasing, based on the secondary cell group being suspended, uplink resources for control information associated with the secondary cell group, and transmitting to the master cell group an activation request for the secondary cell group based on releasing of the uplink resources for control information.

Some examples of the method, apparatuses, and non-transitory computer-readable medium described herein may further include operations, features, means, or instructions for releasing, based on the secondary cell group being suspended, uplink resources configured by an uplink grant for the secondary cell group.

In some examples of the method, apparatuses, and non-transitory computer-readable medium described herein, the activation request includes one or more of an uplink MAC-CE, a DCI message, or RRC message.

Some examples of the method, apparatuses, and non-transitory computer-readable medium described herein may further include operations, features, means, or instructions for stopping a TA timer for the secondary cell group based on the secondary cell group being suspended, the TA timer indicating whether the UE has maintained synchronization with the secondary cell group.

Some examples of the method, apparatuses, and non-transitory computer-readable medium described herein may further include operations, features, means, or instructions for releasing resources for CFRA based on the secondary cell group being suspended, and suspending DRBs associated with the secondary cell group based on the secondary cell group being suspended.

Some examples of the method, apparatuses, and non-transitory computer-readable medium described herein may further include operations, features, means, or instructions for identifying that the UE is prohibited from performing a random access procedure with a primary secondary cell (PSCell) of the secondary cell group while the secondary cell group is suspended, and stopping a TA timer for the secondary cell group based on determining that the UE is prohibited from performing the random access procedure, the TA timer indicating whether the UE has maintained synchronization with the secondary cell group.

Some examples of the method, apparatuses, and non-transitory computer-readable medium described herein may further include operations, features, means, or instructions for identifying that the UE is allowed to perform a random access procedure with a PSCell of the secondary cell group while the secondary cell group is suspended state, and maintaining a TA timer for the secondary cell group based on determining that the UE is allowed to perform the random access procedure, the TA timer indicating whether the UE has maintained synchronization with the secondary cell group.

Some examples of the method, apparatuses, and non-transitory computer-readable medium described herein may further include operations, features, means, or instructions for refraining from monitoring PDCCH resources associated with the secondary cell group while the secondary cell group is suspended.

A method of wireless communications at a base station of a master cell group in a dual connectivity environment is described. The method may include transmitting to a UE a first message indicating that a secondary cell group in the dual connectivity environment has entered the suspended state, receiving a channel measurement report from the UE for the secondary cell group, transmitting to the secondary cell group an activation request including the channel measurement report from the UE, receiving from the secondary cell group a confirmation that the secondary cell group has been activated, and transmitting to the UE a second message indicating that the secondary cell group has been activated.

An apparatus for wireless communications at a base station of a master cell group in a dual connectivity environment is described. The apparatus may include a processor, memory in electronic communication with the processor, and instructions stored in the memory. The instructions may be executable by the processor to cause the apparatus to transmit to a UE a first message indicating that a secondary cell group in the dual connectivity environment is suspended, receive a channel measurement report from the UE for the secondary cell group, transmit to the secondary cell group an activation request including the channel measurement report from the UE, receive from the secondary cell group a confirmation that the secondary cell group is no longer suspended, and transmit to the UE a second message indicating that the secondary cell group is no longer suspended.

Another apparatus for wireless communications at a base station of a master cell group in a dual connectivity environment is described. The apparatus may include means for transmitting to a UE a first message indicating that a secondary cell group in the dual connectivity environment is suspended, receiving a channel measurement report from the UE for the secondary cell group, transmitting to the secondary cell group an activation request including the channel measurement report from the UE, receiving from the secondary cell group a confirmation that the secondary cell group is no longer suspended, and transmitting to the UE a second message indicating that the secondary cell group is no longer suspended.

A non-transitory computer-readable medium storing code for wireless communications at a base station of a master cell group in a dual connectivity environment is described. The code may include instructions executable by a processor to transmit to a UE a first message indicating that a secondary cell group in the dual connectivity environment is suspended, receive a channel measurement report from the UE for the secondary cell group, transmit to the secondary cell group an activation request including the channel measurement report from the UE, receive from the secondary cell group a confirmation that the secondary cell group is no longer suspended, and transmit to the UE a second message indicating that the secondary cell group is no longer suspended.

Some examples of the method, apparatuses, and non-transitory computer-readable medium described herein may further include operations, features, means, or instructions for transmitting a suspend request to the secondary cell group, and receiving from the secondary cell group an indication that the secondary cell group is suspended, where transmitting the first message may be based on the indication received from the secondary cell group.

Some examples of the method, apparatuses, and non-transitory computer-readable medium described herein may further include operations, features, means, or instructions for reconfiguring the lower layer configuration for the secondary cell group such that data associated with the secondary cell group is mapped to a lower layer of the master cell group while the secondary cell group is suspended.

Some examples of the method, apparatuses, and non-transitory computer-readable medium described herein may further include operations, features, means, or instructions for reconfiguring the lower layer configuration of the secondary cell group such that data associated with the secondary cell group is mapped to the lower layer of the secondary cell group while the secondary cell group no longer suspended.

Some examples of the method, apparatuses, and non-transitory computer-readable medium described herein may further include operations, features, means, or instructions for transmitting to the UE, prior to the first message, a system frame number offset between the master cell group and the secondary cell group.

Some examples of the method, apparatuses, and non-transitory computer-readable medium described herein may further include operations, features, means, or instructions for transmitting to the UE a measurement periodicity configuration for the secondary cell group via a radio resource control message, where receiving the channel measurement report from the UE includes receiving from the UE a radio resource management measurement report for the secondary cell group, and forwarding the radio resource management measurement report from the UE to the secondary cell group through a modification request message.

Some examples of the method, apparatuses, and non-transitory computer-readable medium described herein may further include operations, features, means, or instructions for transmitting to the UE, while the secondary cell group is suspended, a channel measurement trigger for the secondary cell group, where the channel measurement report from the UE for the secondary cell group may be received in response to the channel measurement trigger.

Some examples of the method, apparatuses, and non-transitory computer-readable medium described herein may further include operations, features, means, or instructions for transmitting a tracking reference signal that is quasi-co-located with the secondary cell group, where the channel measurement report corresponds to the tracking reference signal.

Some examples of the method, apparatuses, and non-transitory computer-readable medium described herein may further include operations, features, means, or instructions for receiving from the UE an activation request for the secondary cell group, where the activation request may be transmitted to the secondary cell group in response to the activation request from the UE.

Some examples of the method, apparatuses, and non-transitory computer-readable medium described herein may further include operations, features, means, or instructions for receiving from the secondary cell group an updated lower layer configuration of the secondary cell group while the secondary cell group is suspended.

A method of wireless communication at a base station of a secondary cell group in a dual connectivity environment is described. The method may include entering a suspended state in which a lower layer configuration for a UE is maintained, receiving from a master cell group of the dual connectivity environment an activation request, activating based on the activation request, transmitting to the master cell group a confirmation that the secondary cell group has been activated, and reconnecting to the UE using the lower layer configuration for the secondary cell group based on being activated.

An apparatus for wireless communication at a base station of a secondary cell group in a dual connectivity environment is described. The apparatus may include a processor, memory in electronic communication with the processor, and instructions stored in the memory. The instructions may be executable by the processor to cause the apparatus to enter a suspended state in which a lower layer configuration for a UE is maintained, receive from a master cell group of the dual connectivity environment an activation request, activate based on the activation request, transmit to the master cell group a confirmation that the secondary cell group has been activated, and reconnect to the UE using the lower layer configuration for the secondary cell group based on being activated.

Another apparatus for wireless communication at a base station of a secondary cell group in a dual connectivity environment is described. The apparatus may include means for entering a suspended state in which a lower layer configuration for a UE is maintained, receiving from a master cell group of the dual connectivity environment an activation request, activating based on the activation request, transmitting to the master cell group a confirmation that the secondary cell group has been activated, and reconnecting to the UE using the lower layer configuration for the secondary cell group based on being activated.

A non-transitory computer-readable medium storing code for wireless communication at a base station of a secondary cell group in a dual connectivity environment is described. The code may include instructions executable by a processor to enter a suspended state in which a lower layer configuration for a UE is maintained, receive from a master cell group of the dual connectivity environment an activation request, activate based on the activation request, transmit to the master cell group a confirmation that the secondary cell group has been activated, and reconnect to the UE using the lower layer configuration for the secondary cell group based on being activated.

Some examples of the method, apparatuses, and non-transitory computer-readable medium described herein may further include operations, features, means, or instructions for reconfiguring the lower layer configuration based on a channel measurement report of the UE that is forwarded to the secondary cell group by the master cell group, and forwarding the updated lower layer configuration to the master cell group through a modification request confirmation message.

Some examples of the method, apparatuses, and non-transitory computer-readable medium described herein may further include operations, features, means, or instructions for receiving from the master cell group a suspend request, where entering the suspended state is based on the suspend request.

Some examples of the method, apparatuses, and non-transitory computer-readable medium described herein may further include operations, features, means, or instructions for transmitting to the master cell group a confirmation that the second cell group has entered the suspended state.

In some examples of the method, apparatuses, and non-transitory computer-readable medium described herein, reconnecting to the UE may include operations, features, means, or instructions for reconfiguring the lower layer configuration for the UE such that data associated with the secondary cell group is mapped to the lower layer of the secondary cell group.

In some examples of the method, apparatuses, and non-transitory computer-readable medium described herein, reconnecting to the UE may include operations, features, means, or instructions for reconfiguring the lower layer configuration for the UE such that data associated with the secondary cell group is mapped to a lower layer of the master cell group while the secondary cell group is in the suspended state.

In some examples of the method, apparatuses, and non-transitory computer-readable medium described herein, reconnecting to the UE may include operations, features, means, or instructions for performing a random access procedure with the UE.

Some examples of the method, apparatuses, and non-transitory computer-readable medium described herein may further include operations, features, means, or instructions for transmitting a timing advance parameter to the UE during the random access procedure.

Some examples of the method, apparatuses, and non-transitory computer-readable medium described herein may further include operations, features, means, or instructions for transmitting to the UE, after the secondary cell group has been activated, a channel measurement trigger for the secondary cell group, transmitting a tracking reference signal to the UE, and receiving a channel measurement report from the UE, where the channel measurement report corresponds to the tracking reference signal transmitted to the UE.

Some examples of the method, apparatuses, and non-transitory computer-readable medium described herein may further include operations, features, means, or instructions for transmitting a tracking reference signal to the UE while the secondary cell group is in the suspended state, and receiving from the master cell group a channel measurement report that the master cell group forwards from the UE to the second cell group, where the channel measurement report corresponds to the tracking reference signal transmitted to the UE.

DETAILED DESCRIPTION

Figure 1:
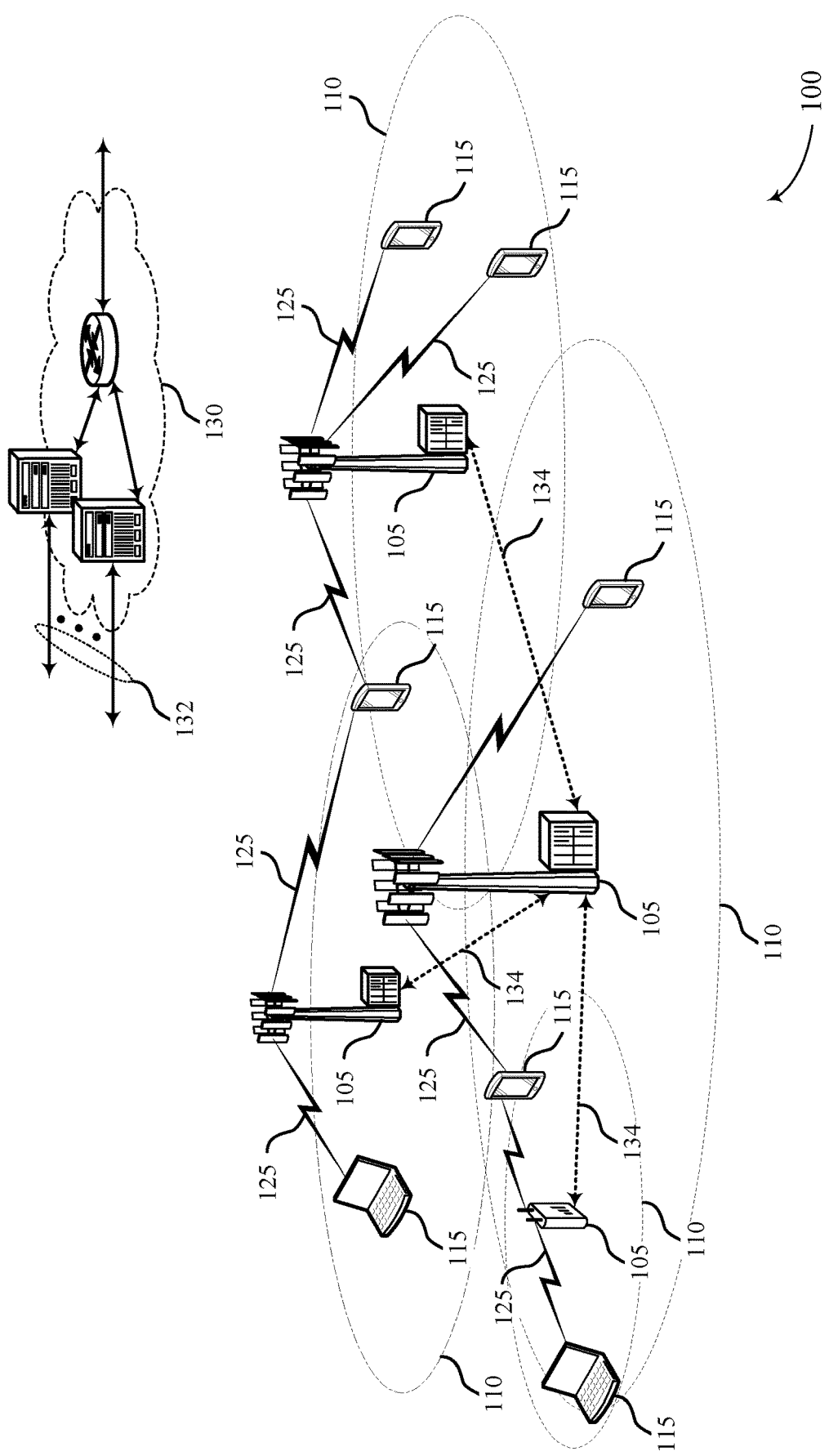
FIG. 1 illustrates an example of a system for wireless communications that supports fast secondary cell group activation and deactivation using a suspended state in accordance with aspects of the present disclosure.

A wireless multiple-access communications system may support dual connectivity, enabling a UE to maintain simultaneous connections to two or more base stations or cell groups. However, under conventional techniques when there is no data traffic between the UE and a secondary cell group in a dual connectivity environment, the secondary cell group may be deactivated and torn down. Reactivating and rebuilding the secondary cell group may involve a significant signaling overhead burden. Thus, a communications system may implement techniques for placing a secondary cell group in a suspended state in which the connection between the UE and the secondary cell group is maintained, but no data is sent between the UE and the secondary cell group. When the secondary cell group enters the suspended state, the UE may maintain the lower layer configuration for the secondary cell group to expedite future communications. While the secondary cell group is in the suspended state the UE may perform fewer measurements on the secondary cell group, which conserves resources at the UE. Additionally, the secondary cell group may be quickly reactivated from the suspended state by a master cell group using a relatively low amount of signaling overhead.

Although traffic is not expected between a UE and the secondary cell group while the secondary cell group is in the suspended state, at some point the UE may nevertheless determine that it has data pending for the secondary cell group. The UE's response to such a determination may vary depending on actions taken by the UE while the secondary cell group is in the suspended state (e.g., based on the UE's suspension behavior).

In a first example, the UE's suspension behavior may involve maintaining certain uplink resources for the secondary cell group. In one alternative, the UE may maintain (e.g., refrain from releasing) uplink data resources (e.g., physical uplink shared channel (PUSCH) resources) that have been configured for uplink transmissions from the UE to the secondary cell group (e.g., configured via persistent scheduling by an uplink grant). Because the uplink data resources are continuously scheduled, the UE may transmit uplink data to the secondary cell group without first sending a scheduling request to the secondary group or performing a random access procedure with the secondary group.

In a second alternative, the UE's suspension behavior may include releasing uplink data resources (e.g., PUSCH resources) while maintaining uplink control resources (e.g., PUCCH resources). Upon determining that there is uplink data pending for the secondary cell group, the UE may send a scheduling request (SR) to the secondary cell group or perform a random access procedure with the secondary cell group. The option the UE selects may be based on the whether the UE has maintained synchronization with the secondary cell group. If synchronization has been maintained, the UE may send a scheduling request to the secondary cell group using the maintained uplink control resources. If synchronization has been lost, the UE may perform the random access procedure to re-gain synchronization (and any uplink control resources released due to the loss in synchronization). Once the UE has synchronized with the secondary cell and obtained uplink control resources, the UE may send a scheduling request to the secondary cell group. In either case, the UE may transmit the uplink data to the secondary cell group according to an uplink grant received in response to the scheduling request.

Although in the above alternative the UE may attempt to maintain uplink control resources, the maintenance and release of uplink control resources may be based on the status of a TA timer for the secondary cell group. Maintaining the TA timer may be part of the UE's suspension behavior in certain scenarios. The TA timer may indicate whether the UE has lost synchronization with the secondary cell group. For example, the TA timer may be configured to run for a predetermined period of time. If the UE receives a TA advance parameter before expiry of the TA timer, the UE may use the timing information from the TA advance parameter to adjust the timing of its uplink transmissions, thereby maintaining synchronization with the secondary cell group. If the UE does not receive a TA advance timer before expiry of the TA timer, the UE may determine that it has lost uplink synchronization with the secondary cell group and, as a result, release uplink control resources for the secondary cell group.

In a second example, the UE's suspension behavior may involve releasing both uplink data resources and uplink control resources for the secondary cell group. The UE may also release data radio bearers (DRBs) for the secondary cell group, which may carry user data over the user data plane, and stop the TA timer. Because, after releasing the DRBs, the UE may not directly communicate with the secondary cell, the UE may request the master cell group to activate the secondary cell group. Once the secondary cell group has been activated, the UE may establish a connection with the secondary cell group to transmit the uplink data.

In some cases, a first base station from a master cell group may reconfigure a configuration of a second base station from a secondary cell group based on the second base station entering a suspended state to reduce latency and overhead in dual connectivity systems. In one example, the first base station from the master cell group may reconfigure a lower layer configuration (e.g., physical (PHY) layer configuration, a MAC configuration, and a radio link control (RLC) configuration) of the second base station from the secondary cell group to use one or more lower layer resources of the first base station. Alternatively, the first base station may allow the second base station to continue using its own lower layer resources.

In some cases, when a base station of the secondary cell group is suspended no data traffic is expected between the suspended base station and the UE. In some cases, the UE may perform measurements on a last serving base station in the secondary cell group with reduced requirement (e.g., for power savings, etc.). For example, a UE may be configured to bypass performing certain measurements such as channel quality indicator (CQI) measurements, radio resource management (RRM) measurements, etc., to reduce latency and overhead in dual connectivity systems. In some cases, the UE may bypass certain measurements based on no channel change being expected in relation to a base station from the secondary wireless group entering a suspended state. In some cases, a UE may be configured for power-efficient measurements (e.g., CQI, RRM, etc.). In some cases, a UE may be triggered to report one or more measurements (e.g., CQI measurements) based on a tracking reference signal (TRS). In some cases, the TRS may be periodic or aperiodic. In some examples, a UE may be triggered to report one or more measurements based on a DCI message from a base station from a master cell group. In some cases, a UE may be configured to perform layer 3 (L3) measurements. In some examples, the UE may be configured to perform L3 measurements only for servings cells in a secondary cell group (e.g., when the secondary cell group is in a suspended state, etc.) to reduce latency and overhead in dual connectivity systems.

Aspects of the disclosure are initially described in the context of one or more wireless communications systems. Aspects of the disclosure are also described in the context of swim diagrams that show the chronology of communications in the one or more wireless communications systems. Aspects of the disclosure are further illustrated by and described with reference to apparatus diagrams, system diagrams, and flowcharts that relate to fast secondary cell group activation and deactivation using a suspended state.

FIG. 1 illustrates an example of a wireless communications system 100 that supports fast secondary cell group activation and deactivation using a suspended state in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "cell group" refers to a group of one or more cells implemented by either a master node (e.g., a master base station) or a secondary node (e.g., a secondary base station) in a dual connectivity environment. The term "master cell group" (MCG) refers to a group of serving cells associated with a master node of the dual connectivity environment. The term "secondary cell group" (SCG) refers to a group of serving cells associated with a secondary node of the dual connectivity environment. The term primary cell (PCell) may refer to the cell, in an MCG, on which a UE 115 performs radio link monitoring (RLM). The term primary secondary cell (PSCell) may refer to the cell, in an SCG, on which a UE 115 performs RLM.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, the one or more base stations 105 may be part of a dual connectivity system. In some examples, one or more of the base stations 105 may be part of a master cell group, while one or more other base stations 105 may be part of a secondary cell group. For example, at least one of the UEs 115 may establish a first connection with at least a first base station from the master cell group and establish a second connection with at least a second base station from the secondary cell group. In some examples, the first base station may put the second base station in a suspended state.

In some cases, the first base station may reconfigure a configuration of the second base station based on the second base station entering a suspended state. For example, the first base station from the master cell group may reconfigure a lower layer configuration of the second base station from the secondary cell group to use one or more lower layer resources of the first base station. Alternatively, the first base station may allow the second base station to continue using its own lower layer resources.

In some cases, the UEs 115 may be configured to bypass performing certain measurements such as channel quality indicator (CQI) measurements, radio resource management (RRM) measurements, etc. In some cases, the UEs 115 may bypass certain measurements based on no channel change being expected in relation to the second base station from the secondary wireless group entering a suspended state. In some cases, the UEs 115 may be configured for power-efficient measurements (e.g., CQI, RRM, etc.). In some cases, the UEs 115 may be triggered to report one or more measurements (e.g., CQI measurements) based on a tracking reference signal (TRS). In some cases, the TRS may be periodic or aperiodic. In some cases, the UEs 115 may receive the TRS from the first base station in the master cell group or the second base station in the secondary cell group. In some examples, the UEs 115 may be triggered by the first base station in the master cell group to report one or more measurements based on a DCI message from the first base station. In some cases, the UEs 115 may be configured to perform layer 3 (L3) measurements. In some examples, the UE may be configured to perform L3 measurements only for servings cells in the secondary cell group.

In some examples, a UE 115 may determine that it has uplink data pending for the secondary cell group while the secondary cell group is in the suspended state. Based on this determination, the UE 115 may transmit a scheduling request to the secondary cell group, perform a random access procedure with the secondary cell group, or transmit a message to the master cell group requesting activation of the secondary cell group. The UE 115 may select an approach based on the behavior of the UE 115 during the suspended state of the secondary cell.

Figure 2:
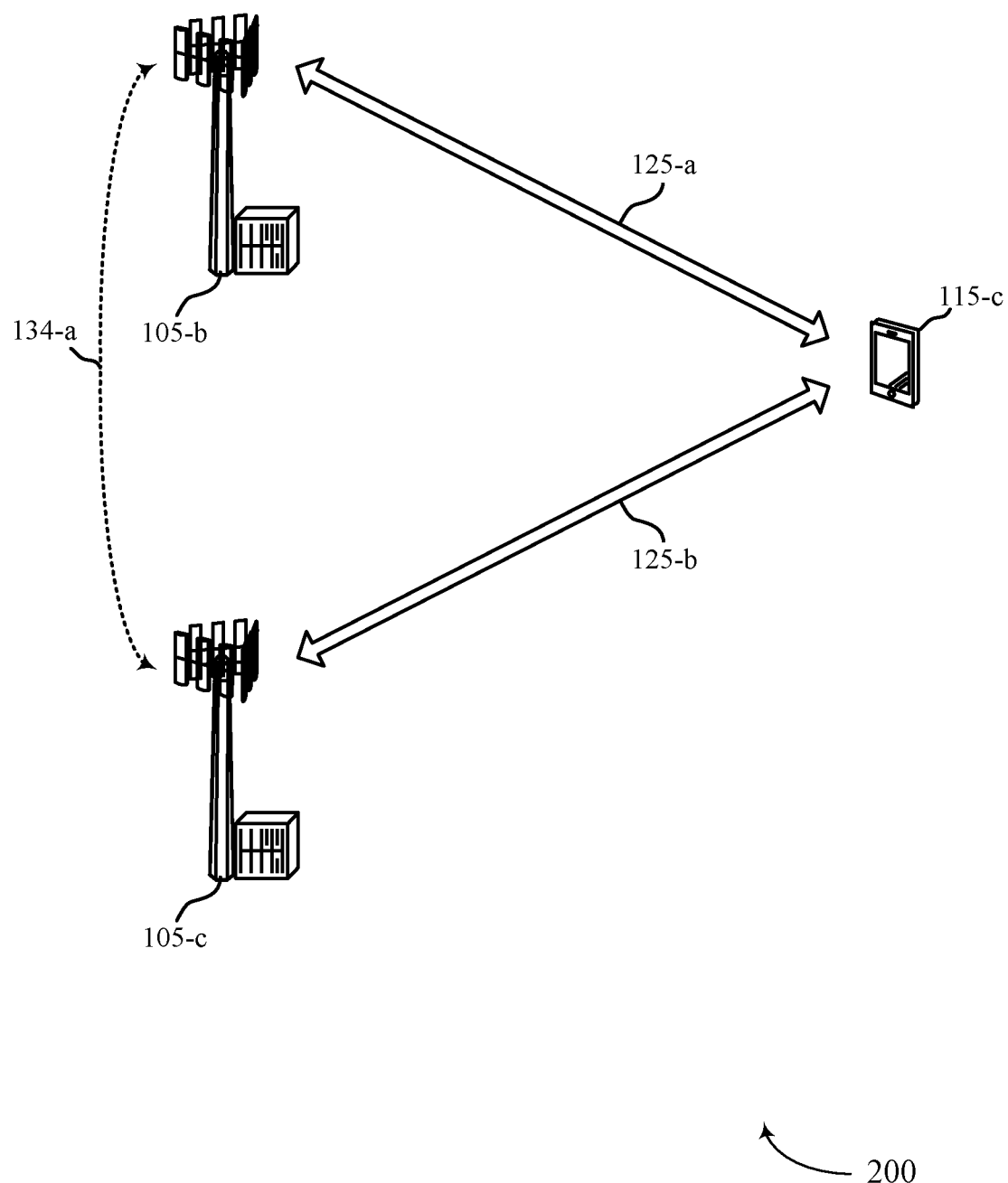
FIG. 2 illustrates an example of a system for wireless communications that supports fast secondary cell group activation and deactivation using a suspended state in accordance with aspects of the present disclosure.

FIG. 2 illustrates an example of a wireless communications system 200 that supports fast secondary cell group activation and deactivation using a suspended state in accordance with aspects of the present disclosure. In some examples, wireless communications system 200 may implement aspects of wireless communications system 100. In the illustrated example, wireless communications system 200 may include UE 115-c, base station 105-b and base station 105-c. UE 115-c may be one example of a UE 115 from FIG. 1. Base station 105-b or base station 105-c may be an example of a base station 105 from FIG. 1.

In one example, UE 115-c may be one example of a dual connectivity device. In some cases, dual connectivity allows UE 115-c to simultaneously transmit and receive data on multiple from two cell groups via a master base station (e.g., base station 105-b), also referred to as a master node, and a secondary base station (e.g., base station 105-c), also referred to as a secondary node. In some cases, dual connectivity may support load-balancing among multiple base stations (e.g., among base station 105-b and base station 105-c).

In one example, UE 115-c may advertise a dual connectivity capability to one or more base stations. For example, UE 115-c may advertise its dual connectivity capability to base station 105-b or base station 105-c. In some cases, UE 115-c may send a broadcast message advertising its dual connectivity capability to base stations 105-b and 105-c simultaneously. In one example, UE 115-c may be configured to establish or request to establish communication link 125-a with base station 105-b. Additionally or alternatively, UE 115-c may be configured to establish or request to establish communication link 125-b with base station 105-c. In one example, UE 115-c may establish a first communication link 125-a with base station 105-b based at least in part on a first radio of UE 115-c. In some cases, UE 115-c may establish a second connection with base station 105-c based at least in part on a second radio of UE 115-c.

In some cases, base station 105-b may communicate directly with base station 105-c. For example, base station 105-b and base station 105-c may establish a backhaul link 134-a (e.g., via an X2, Xn, or other interface). In some cases, the backhaul link may include a direct link (e.g., direct link between base stations 105) or an indirect link (e.g., via core network such as core network 130 of FIG. 1).

In some cases, UE 115-c may send data to or receive data from both base station 105-b and base station 105-c. In some cases, UE 115-c may send data to or receive data from either base station 105-b or base station 105-c. In one example, base station 105-b may send a first message to UE 115-c indicating that base station 105-c has entered a suspended state. In some cases, UE 115-c may maintain a lower layer configuration (e.g., physical layer configuration, media access control configuration, or radio link control configuration, etc.) for base station 105-c. In some cases, UE 115-c may modify a measurement report configuration for base station 105-c based at least in part on the first message and while base station 105-c is in the suspended state. In some cases, base station 105-b may send a second message to UE 115-c indicating that base station 105-c has entered an activated state. In some cases, UE 115-c may reestablish a connection (e.g., communication link 125-b) with base station 105-c using the maintained lower layer configuration for base station 105-c.

Wireless communications system 200 may include a dual connectivity system that enables UE 115-c to send/receive data with one or more base stations from a master cell group (e.g., base station 105-b) and simultaneously send/receive data with one or more base stations from a secondary cell group (e.g., base station 105-c). However, conventional dual connectivity systems may introduce unnecessary signaling latency/overhead when no data traffic is expected to be sent in the secondary cell group for a relatively short duration of time. For example, signaling latency may be introduced when base station 105-b is capable of handling all of the traffic volume in wireless communications system 200. Also, signaling latency may be introduced when a master cell group and secondary cell group are used to handle different slices of the same data (e.g., enhanced mobile broadband (eMBB) handled by base station 105-b and ultra-reliable low-latency communications (URLLC) handled by base station 105-c, etc.). Also, signaling latency may be introduced when a base station in the secondary cell group (e.g., base station 105-c) is overloaded and triggers a temporary suspension of the base station in the secondary cell group.

The present techniques propose using new or modified reporting (e.g., adjusting a periodicity of measurement reports of the base station 105-c when suspended, base station 105-b forwarding measurement reports from UE 115-c to base station 105-c, UE 115-c sending measurement reports directly to base station 105-c when suspended, etc.) and using additional signaling (e.g., additional RRC reconfiguration signaling, etc.) to enable a secondary cell group (e.g., base station 105-c) to temporarily enter a suspended state and then be quickly reactivated from the suspended state by a master cell group (e.g., base station 105-b) using a relatively low amount of signaling overhead.

When a secondary cell group (e.g., base station 105-c) enters a suspended state, no data traffic is expected between the secondary cell group and an associated UE (e.g., UE 115-c). In some cases, UE 115-c may perform measurements on the last serving base station from the secondary cell group (e.g., base station 105-c). In some cases, while base station 105-c is in the suspended state, UE 115-c may perform the measurements on base station 105-c with reduced requirement (e.g., longer intervals between measurements for power savings, etc.).

In some cases, while base station 105-c is in the suspended state an upper layer configuration of base station 105-c (e.g., including signaling radio bearer (SRB) and data radio bearer (DRB)) may be maintained at base station 105-c. In some cases, while base station 105-c is in the suspended state, a lower layer configuration of base station 105-*c* may be maintained by at least one of base station 105-*c*, base station 105-*b*, and UE 115-*c*. Alternatively, base station 105-*b* may reconfigure the lower layer configuration of base station 105-*c* to use lower layer resources of base station 105-*b* via split bearer (e.g., make DRB of base station 105-*c* DRB use lower layer resources of base station 105-*b*). In some cases, a MAC-CE signaling or DCI signaling may be used to indicate base station 105-*c* is in a suspended state or to indicate base station 105-*c* is activated.

As opposed to activation of a secondary cell in carrier aggregation, the present techniques may include UE 115-*c* performing a random access procedure (e.g., random access channel (RACH)) on base station 105-*c* after receiving an indication from base station 105-*b* that base station 105-*c* is activated. In some cases, UE 115-*c* may perform the random access procedure based on asynchronous operations between base station 105-*b* and base station 105-*c*.

In one example, UE 115-*c* may calculate a system frame number offset (D) between base station 105-*b* and base station 105-*c*. In some cases, UE 115-*c* reconnecting to base station 105-*c* may include determining a timing advance parameter of base station 105-*c* (TA_2) based at least in part on the timing advance parameter of base station 105-*b* (TA_1), the system frame number offset, a first propagation delay (T1) between base station 105-*b* and UE 115-*c* (e.g., a propagation delay over communication link 125-*a*), and a second propagation delay (T2) between base station 105-*c* and UE 115-*c* (e.g., a propagation delay over communication link 125-*b*). In some cases, the timing advance parameter of base station 105-*c* may be calculated by UE 115-*c* by subtracting both the system frame number offset and a difference between the first and second propagation delays from the timing advance parameter of base station 105-*b* (e.g., TA_2=TA_1−(T1−T2)−D).

In some cases, base station 105-*b* or base station 105-*c* may transmit a system frame number offset to UE 115-*c* prior to base station 105-*b* sending the first message to UE 115-*c* to indicate base station 105-*c* is entering a suspended state. In some cases, the system frame number offset may be based on a timing offset between base station 105-*b* and base station 105-*c* due to asynchronous operations. In some examples, the first propagation delay may be obtained from an information message sent by base station 105-*b* to UE 115-*c* (e.g., master information block, etc.). Similarly, in some examples the second propagation delay may be obtained from an information message sent by base station 105-*c* to UE 115-*c* (e.g., master information block, etc.).

UE 115-*c* may include a TA timer that is reset each time UE 115-*c* receives the timing advance parameter for a cell group or base station. For example, UE 115-*c* may include a TA timer for base station 105-*c* that resets when the UE 115-*c* receives a TA parameter for the base station 105-*c*. As noted, the TA parameter may include timing information that enables the UE 115-*c* to maintain synchronization (e.g., by adjusting the UE's uplink transmission timing) with the corresponding base station 105. If the TA timer for a base station 105 expires, UE 115-*c* may assume that it has lost uplink synchronization with that base station 105. Accordingly, the UE 115-*c* may release uplink control resources (e.g., PDCCH, sPDCCH, sounding reference signal (SRS) resources) and suspend uplink transmissions until synchronization and uplink control resources have been re-established.

When base station 105-*c* (e.g., the secondary cell group) is in a suspended state, UE 115-*c* may not expect active physical downlink shared channel or physical uplink shared channel data transfer from base station 105-*c* (e.g., from the secondary cell group). Accordingly, while base station 105-*c* is suspended, UE 115-*c* may bypass monitoring the physical downlink control channel of base station 105-*c* (e.g., the primary secondary cell from the secondary cell group). In some cases, while base station 105-*c* is suspended, UE 115-*c* may bypass transmitting uplink sounding reference signal (SRS), random access channel, physical uplink control channel in base station 105-*c* (e.g., the primary secondary cell from the secondary cell group).

In some cases, base station 105-*b* (e.g., a master node from a master cell group) may reconfigure a configuration of base station 105-*c* (e.g., secondary node from a secondary cell group) based on base station 105-*c* entering a suspended state. In one example, the base station 105-*b* from the master cell group may reconfigure a lower layer configuration (e.g., physical (PHY) layer configuration, a MAC configuration, and a radio link control (RLC) configuration) of base station 105-*c* from the secondary cell group to use one or more lower layer resources of the base station 105-*b*. Alternatively, the base station 105-*b* may allow base station 105-*c* to continue using its own lower layer resources.

In some cases, when a base station of the secondary cell group is suspended no data traffic is expected between the suspended base station and UE 115-*c*. In some cases, UE 115-*c* may perform measurements on a last serving base station in the secondary cell group (e.g., base station 105-*c*) using reduced measurement requirements (e.g., relatively fewer measurements for power savings while base station 105-*c* is suspended, etc.). For example, UE 115-*c* may be configured to bypass performing certain measurements such as channel quality indicator (CQI) measurements, radio resource management (RRM) measurements, etc. In some cases, UE 115-*c* may bypass certain measurements based on no channel change being expected in relation to base station 105-*c* entering a suspended state.

In some cases, UE 115-*c* may be configured for power-efficient measurements (e.g., CQI, RRM, etc.). In some cases, UE 115-*c* may be triggered to report one or more measurements (e.g., CQI measurements) based on a tracking reference signal (TRS). In some examples, UE 115-*c* may receive the TRS from at least one of base station 105-*b* and base station 105-*c*. In some cases, the TRS may be periodic or aperiodic. In some examples, UE 115-*c* may be triggered to report one or more measurements based on a DCI message from a base station from a master cell group. In some cases, UE 115-*c* may be configured to perform layer 3 (L3) measurements. In some examples, UE 115-*c* may be configured to perform L3 measurements only for servings cells in a secondary cell group (e.g., on base station 105-*c* when base station 105-*c* is in a suspended state, etc.).

Although data traffic is not expected between base station 105-*c* and UE 115-*c* while base station 105-*c* is suspended, data for base station 105-*c* may nevertheless arrive at UE 115-*c*. When UE 115-*c* determines that there is data in an uplink buffer for base station 105-*c*, UE 115-*c* may take one or more actions so that it is able to provide the data to base station 105-*c*. By taking such actions, UE 115-*c* may avoid waiting for base station 105-*c* to independently leave the suspended state, which increases the latency of the data. The actions taken by UE 115-*c* may vary based on the behavior of UE 115-*c* during the suspended state of base station 105-*c*. The behavior of UE 115-*c* during the suspended state of the base station 105-*c* may be referred to as the UE's suspension behavior or dormancy behavior. In general, a UE's suspension behavior may include maintaining a lower layer configuration for the suspended secondary cell group/base station.

In a first example, the suspension behavior of UE 115-*c* may include maintaining DRBs and uplink data resources for base station 105-*c*. The uplink data resources may be resources that are continuously configured by one or more uplink grants from base station 105-*c*. For example, the uplink data resources may be resources that base station 105-*c* reserves for UE 115-*c* via persistent scheduling. Once UE 115-*c* determines that uplink data resources are persistently scheduled, UE 115-*c* may cease monitoring for the uplink grants. When data arrives at UE 115-*c* for base station 105-*c*, UE 115-*c* may use the persistently scheduled uplink data resources to transmit the uplink data to base station 105-*c*. Because UE 115-*c* has maintained the uplink data resources, and the DRBs, UE 115-*c* may transmit the uplink data without transmitting an associated scheduling request or performing a random access procedure. Thus, this implementation may reduce latency and signaling overhead compared to other implementations.

In a second example, the suspension behavior of UE 115-*c* may include releasing uplink data resources but maintaining uplink control resources. Releasing the uplink data resources may increase system efficiency, compared to other implementations, because the uplink data resources can be used by other devices in the wireless communications system 200. UE 115-*c* may also maintain DRBs and the TA timer associated with base station 105-*c*. If the TA timer indicates that UE 115-*c* has lost synchronization with base station 105-*c*, UE 115-*c* may perform a random access procedure with base station 105-*c* to re-acquire timing information for base station 105-*c*. After the random access procedure has been completed—or, after UE 115-*c* determines that synchronization has been maintained—UE 115-*c* may transmit a scheduling request to base station 105-*c*. Upon receiving an uplink grant in response to the scheduling request, UE 115-*c* may use uplink data resources indicated by the uplink grant to transmit the uplink data to base station 105-*c*.

In a third example, the suspension behavior of UE 115-*c* may include releasing both uplink data resources and uplink control resources. Releasing both uplink data resources and uplink control resources may increase system efficiency, relative to other implementations, because other devices in wireless communications system 200 can use those resources. UE 115-*c* may also suspend DRBs and stop the TA timer for the suspended base station, which may reduce power consumption and processing at UE 115-*c*. Upon detecting uplink data for base station 105-*c*, UE 115-*c* may send a message to base station 105-*b* requesting the activation of base station 105-*c*. Once base station 105-*c* has been activated, UE 115-*c* may establish a connection with base station 105-*c* and transmit the uplink data to the base station 105-*c* using the connection.

Figure 3:
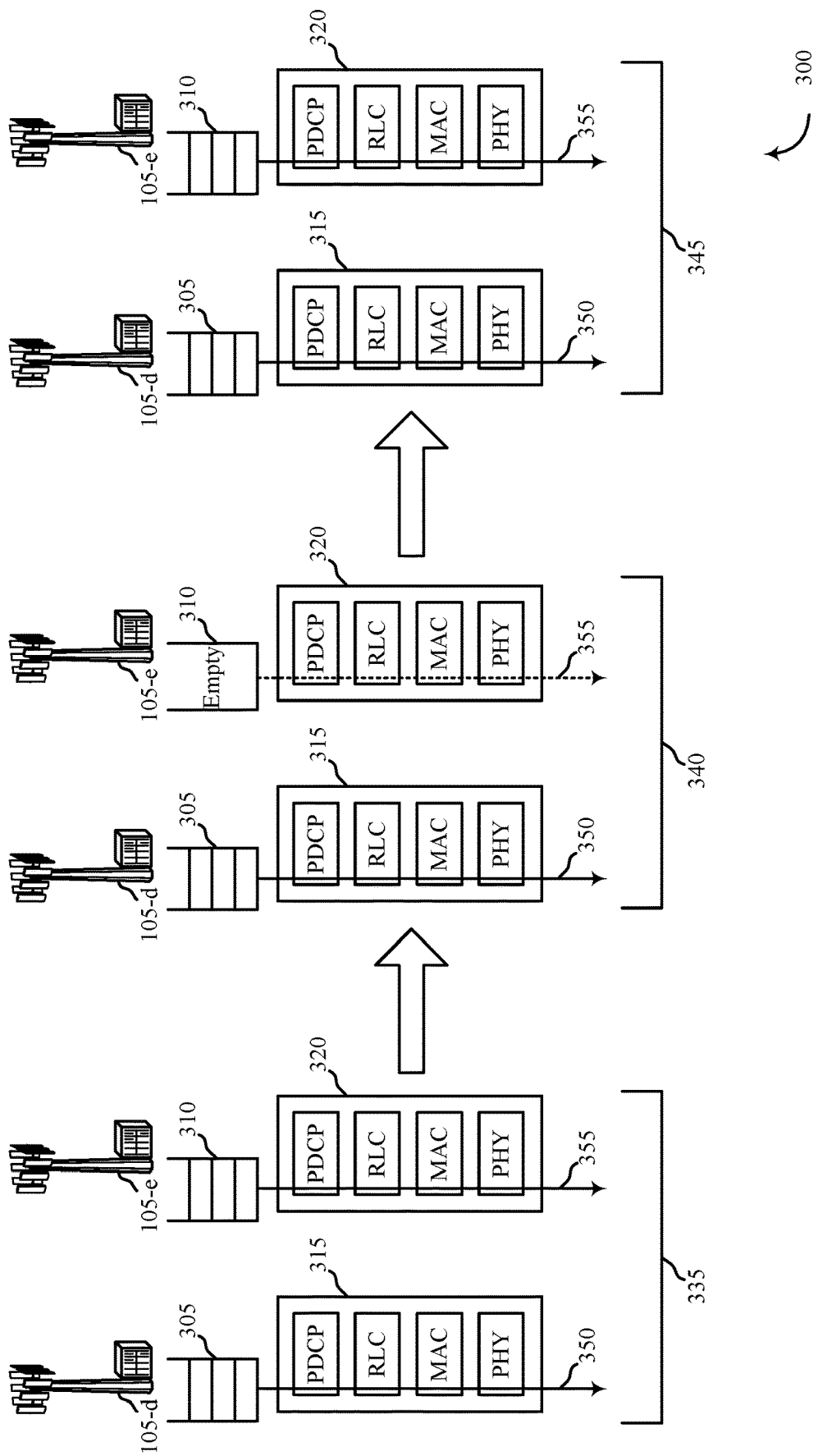
FIG. 3 illustrates an example of a system for wireless communications that supports fast secondary cell group activation and deactivation using a suspended state in accordance with aspects of the present disclosure.

FIG. 3 illustrates an example of a wireless communications system 300 that supports fast secondary cell group activation and deactivation using a suspended state in accordance with aspects of the present disclosure. In some examples, wireless communications system 300 may implement aspects of wireless communications system 100.

In the illustrated example, wireless communications system 300 may include base station 105-*d* and base station 105-*e*. Base station 105-*d* or base station 105-*e* may be an example of a base station 105 from FIG. 1 or 2.

At 335, base station 105-*d* may include data in its buffer 305. In some cases, base station 105-*d* may be configured to use protocol stack 315 to send/receive the data in the buffer 305 as data traffic 350. Similarly, base station 105-*e* may include data in its buffer 310. In some cases, base station 105-*e* may be configured to use protocol stack 320 to send/receive the data in the buffer 310 as data traffic 355. As shown, protocol stack 315 and protocol stack 320 may include multiple layers or protocol stack functions. For example, protocol stack 315 or protocol stack 320 may include at least one of a packet data convergence protocol (PDCP) layer, a radio link control (RLC) layer, a MAC layer, and a physical (PHY) layer. In some cases, data traffic 350 and data traffic 355 may be sent/received by a UE (e.g., UE 115 of FIG. 1 or 2) in a dual connectivity environment.

At 340, base station 105-*e* may enter a suspended state. In one example, base station 105-*d* may send a suspend request to base station 105-*e* (e.g., via backhaul link 134), and base station 105-*e* may enter the suspended state based on the suspend request. In some cases, base station 105-*d* may send the suspend request based on the buffer 310 of base station 105-*e* being empty or approaching being empty. Thus, in some cases, data traffic 355 of base station 105-*e* may be suspended at 340. Accordingly, at 340 a UE that was receiving data traffic 350 and data traffic 355 in a dual connectivity environment may continue to receive data traffic 350, but no longer receives data traffic 355.

At 345, base station 105-*e* may exit the suspended state and be activated. In one example, base station 105-*d* may send an activation request to base station 105-*e* (e.g., via backhaul link 134). Thus, base station 105-*e* may be activated based on the activation request from base station 105-*d*. In some cases, base station 105-*d* may send the activation request to base station 105-*e* based on a determination that there is data that is pending to be sent/received by base station 105-*e*. In some cases, base station 105-*d* may send the activation request based on a UE (e.g., UE 115 of FIG. 1 or 2) having uplink data meant for base station 105-*e*. In some cases, buffer 310 base station 105-*e* may be filled after base station 105-*e* is activated. As shown, data traffic 355 may resume after base station 105-*e* is activated. Accordingly, at 345 a UE may again receive data traffic 350 and data traffic 355 in a dual connectivity environment.

Figure 4:
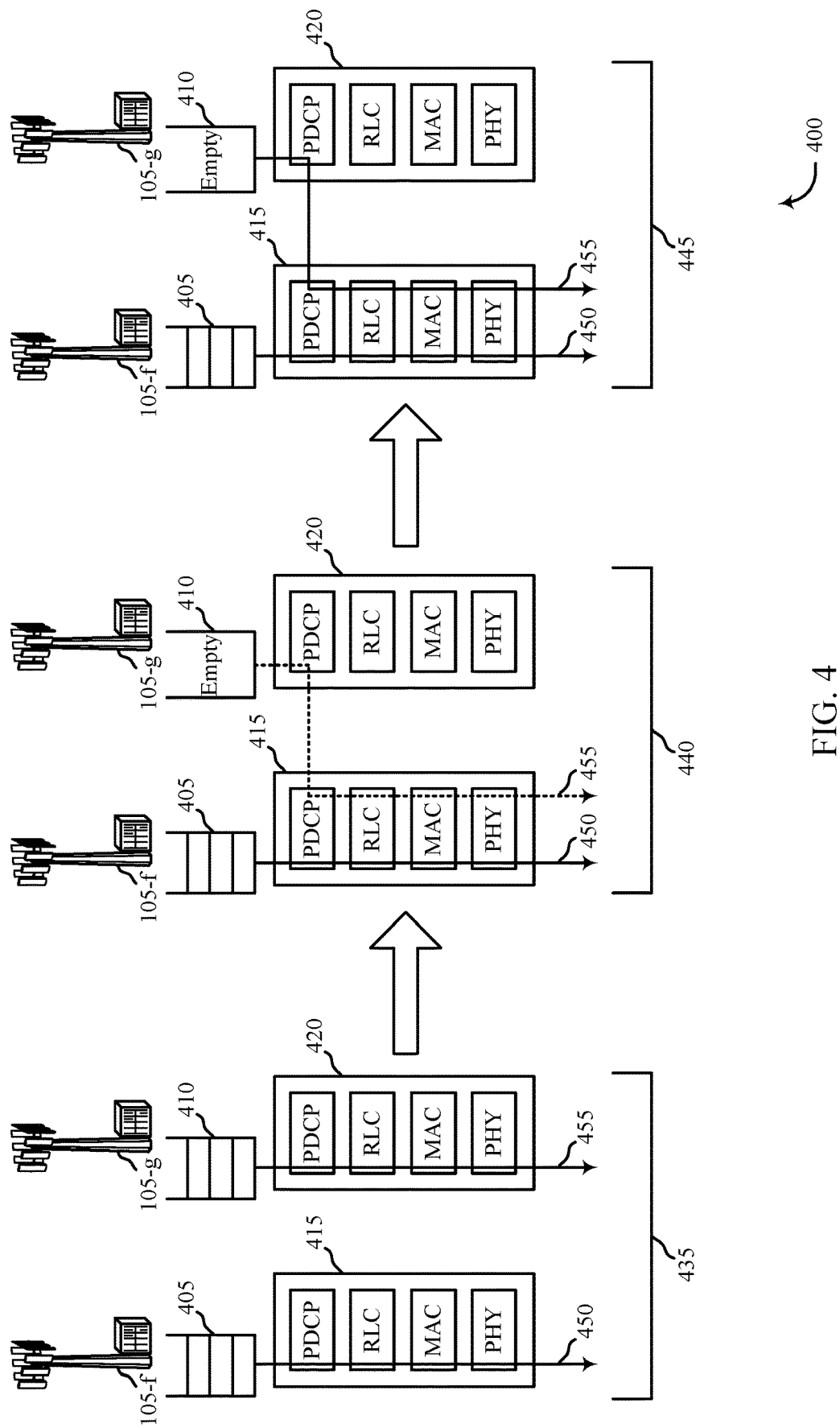
FIG. 4 illustrates an example of a system for wireless communications that supports fast secondary cell group activation and deactivation using a suspended state in accordance with aspects of the present disclosure.

FIG. 4 illustrates an example of a wireless communications system 400 that supports fast secondary cell group activation and deactivation using a suspended state in accordance with aspects of the present disclosure. In some examples, wireless communications system 400 may implement aspects of wireless communications system 100.

In the illustrated example, wireless communications system 400 may include base station 105-*f* and base station 105-*g*. Base station 105-*f* or base station 105-*g* may be an example of a base station 105 from FIG. 1, 2, or 3.

At 435, base station 105-*f* may include data in its buffer 405. In some cases, base station 105-*f* may be configured to use protocol stack 415 to send/receive the data in the buffer 405 as data traffic 450. Similarly, base station 105-*g* may include data in its buffer 410. In some cases, base station 105-*g* may be configured to use protocol stack 420 to send/receive the data in the buffer 410 as data traffic 455. As shown, protocol stack 415 and protocol stack 420 may include multiple layers or protocol stack functions. For example, protocol stack 415 or protocol stack 420 may include at least one of a packet data convergence protocol (PDCP) layer, a radio link control (RLC) layer, a MAC layer, and a physical (PHY) layer. In some cases, data traffic 450 and data traffic 455 may be sent/received by a UE (e.g., UE 115 of FIG. 1 or 2) in a dual connectivity environment.

At 440, base station 105-*g* may enter a suspended state. In one example, base station 105-*f* may send a suspend request to base station 105-g (e.g., via backhaul link 134), and base station 105-g may enter the suspended state based on the suspend request. Accordingly, at 440 a UE that was receiving data traffic 450 and data traffic 455 in a dual connectivity environment may continue to receive data traffic 450, but no longer receives data traffic 455. In some examples, a path of data traffic 455 may be reconfigured. As shown, data traffic 455 may be reconfigured to a path using one or more layers of the protocol stack 415 of base station 105-f. In one example, a lower layer configuration of the protocol stack 420 for base station 105-g may be reconfigured such that data associated with the base station 105-g is mapped to a lower layer of the protocol stack 415 for base station 105-f. In some cases, the lower layer configuration of the protocol stack 420 of base station 105-g may include a physical (PHY) layer configuration, a MAC configuration, and a radio link control (RLC) configuration.

In some cases, the lower layer configuration of base station 105-g may be reconfigured to use the lower layer of base station 105-f while base station 105-g is in the suspended state. In some cases, the lower layer configuration of base station 105-g may be maintained by using the lower layer of base station 105-f once base station 105-g is activated after being suspended. In some cases, the lower layer configuration of base station 105-g may be reconfigured to switch back to using the lower layer of base station 105-g once base station 105-g is activated after being suspended.

In some cases, the lower layer configuration of base station 105-g may be reconfigured based at least in part on a channel measurement report (e.g., radio resource management measurement) from a UE (e.g., UE 115 from FIG. 1 or 2) that is forwarded to base station 105-g by base station 105-f. In some cases, base station 105-f may forward the channel measurement report from the UE to base station 105-g through a modification request message. In some cases, the lower layer configuration of base station 105-g may be maintained (e.g., stored without changes at base station 105-f or a UE such as UE 115 from FIG. 1 or 2). In some cases, the lower layer configuration of base station 105-f may be maintained or updated at 435, 440, or at 445 since the lower layer configuration of base station 105-f remains active throughout 435-445. In some cases, the lower layer configuration of base station 105-g may be sent to base station 105-f via a backhaul link (e.g., backhaul link 134 of FIG. 1 or 2). In some cases, base station 105-f may send the lower layer configuration of base station 105-g to a UE via an air interface of base station 105-f.

At 445, base station 105-g may exit the suspended state and be activated. In one example, base station 105-f may send an activation request to base station 105-g (e.g., via backhaul link 134). Thus, base station 105-g may be activated based on the activation request from base station 105-f. In some cases, base station 105-f may determine to send the activation request to activate base station 105-g. Alternatively, a UE (e.g., UE 115 from FIG. 1 or 2) may determine to activate base station 105-g and may send an activation request to base station 105-f, and then base station 105-f may send the activation request to base station 105-g based on the activation request from the UE. As shown, data traffic 455 may resume after base station 105-g is activated. In some cases, the mapping of the lower layer configuration of base station 105-g to the lower layer of base station 105-f may be maintained after base station 105-g is activated. Accordingly, after activation at 445, data associated with the base station 105-g may remain mapped to the lower layer of the protocol stack 415 for base station 105-f. Accordingly, at 445 a UE may again receive data traffic 450 and data traffic 455 in a dual connectivity environment, however, both data traffic 450 and data traffic 455 may be routed though the lower layer of base station 105-f.

Figure 5A:
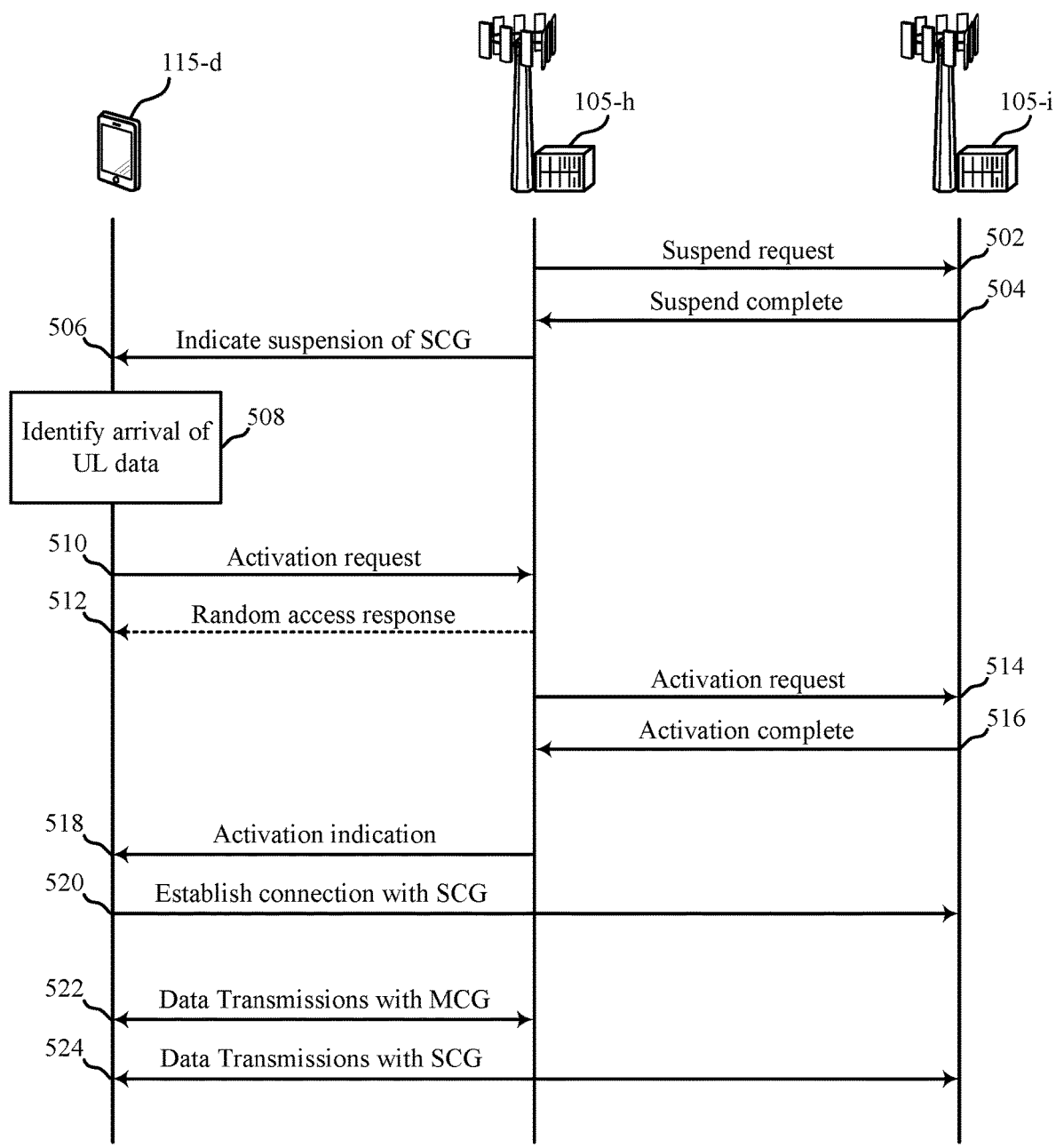
FIGS. 5A through 5D illustrate examples of swim diagrams that support fast secondary cell group activation and deactivation using a suspended state in accordance with aspects of the present disclosure.

FIG. 5A illustrates an example of a swim diagram 500-a that supports fast secondary cell group activation and deactivation using a suspended state in accordance with aspects of the present disclosure. In some examples, swim diagram 500 may implement aspects of wireless communications system 100. In the illustrated example, diagram 500-a may include UE 115-d, base station 105-h, and base station 105-i. In one example, UE 115-d may be one example of a UE 115 from FIG. 1 or 2. In one example, UE 115-d may be one example of a dual connectivity device. In one example, UE 115-d may be a dual connectivity device that establishes a first connection with base station 105-h and a second connection with base station 105-i. In some cases, base station 105-h may be a master node of a master cell group. In some cases, base station 105-i may be a secondary node of a secondary cell group.

In the following description of the swim diagram 500-a, the operations between base station 105-h, base station 105-i, and UE 115-d may occur in a different order than the exemplary order shown, or the operations performed by the devices may be performed in different orders or at different times. Certain operations may also be left out of the swim diagram 500-a, or other operations may be added to the swim diagram 500-a.

At 502, base station 105-h may send a suspend request to base station 105-i. (e.g., via backhaul link 134). At 504, base station 105-i may send a suspend complete message to base station 105-h indicating that suspension is completed.

At 506, base station 105-h may send a message to UE 115-d indicating base station 105-i is suspended. In some cases, base station 105-h may send a MAC-CE message, DCI message, or RRC message to UE 115-d to indicate base station 105-i is suspended.

At 508, UE 115-d may identify an arrival of uplink data. In some cases, the uplink data may include data meant for base station 105-i. In some cases, UE 115-d may determine to request base station 105-h activate base station 105-i based on the arrival of the uplink data. In some cases, UE 115-d may send the activation request to base station 105-h based on uplink data being restricted to only go through base station 105-i.

At 510, UE 115-d may send an activation request to base station 105-h. In some cases, the activation request from UE 115-d may communicated to base station 105-h via an uplink MAC-CE, a buffer status report, a scheduling request, or a random access preamble (e.g., contention free random access preamble). In some cases, the activation request from UE 115-d may include a 1-bit activation request (e.g., binary 1 indicates request, binary 0 indicates no request).

At 512, base station 105-h may optionally send a random access response to UE 115-d. For example, at 525 UE 115-d may send a random access preamble to base station 105-h. When UE 115-d sends a random access preamble to base station 105-h at 525, then base station 105-h may send a random access response to UE 115-d at 512.

At 514, base station 105-h may send an activation request to base station 105-i. In some cases, base station 105-h may send the activation request at 514 based on an activation request that base station 105-h previously received from UE 115-d. Alternatively, base station 105-h may send the activation request at 514 based on a determination by base station 105-h to activate base station 105-i independent from any request from UE 115-*d*. At 516, base station 105-*i* may send an activation complete message to base station 105-*h*.

At 518, base station 105-*h* may send an activation indication to UE 115-*d*. In some cases, base station 105-*h* may send the activation indication at 518 to confirm that base station 105-*i* is activated. In some cases, base station 105-*h* may send a MAC-CE message, DCI message, or RRC message to UE 115-*d* to communicate the activation indication.

At 520, UE 115-*d* may establish a connection with base station 105-*i*. In some cases, UE 115-*d* may re-establish a connection with base station 105-*i* at 520. For example, before 502 UE 115-*d* may have established a connection with base station 105-*i*. In some cases, before 502 UE 115-*d* may have established a first connection with base station 105-*h* and a second connection with base station 105-*i* in a dual connectivity environment. Accordingly, at 520, UE 115-*d* may re-establish the second connection with base station 105-*i*. In some cases, UE 115-*d* may perform a random access procedure (e.g., random access channel procedure) with base station 105-*i* after receiving the activation indication at 518. In some cases, UE 115-*d* may perform the random access procedure in order to determine or calculate a timing advance parameter for base station 105-*i*.

At 522, UE 115-*d* may continue sending/receiving data with base station 105-*h*. At 524, UE 115-*d* may start sending/receiving data with base station 105-*i* based on the connection with base station 105-*i* that UE 115-*d* established at 520.

Figure 5B:
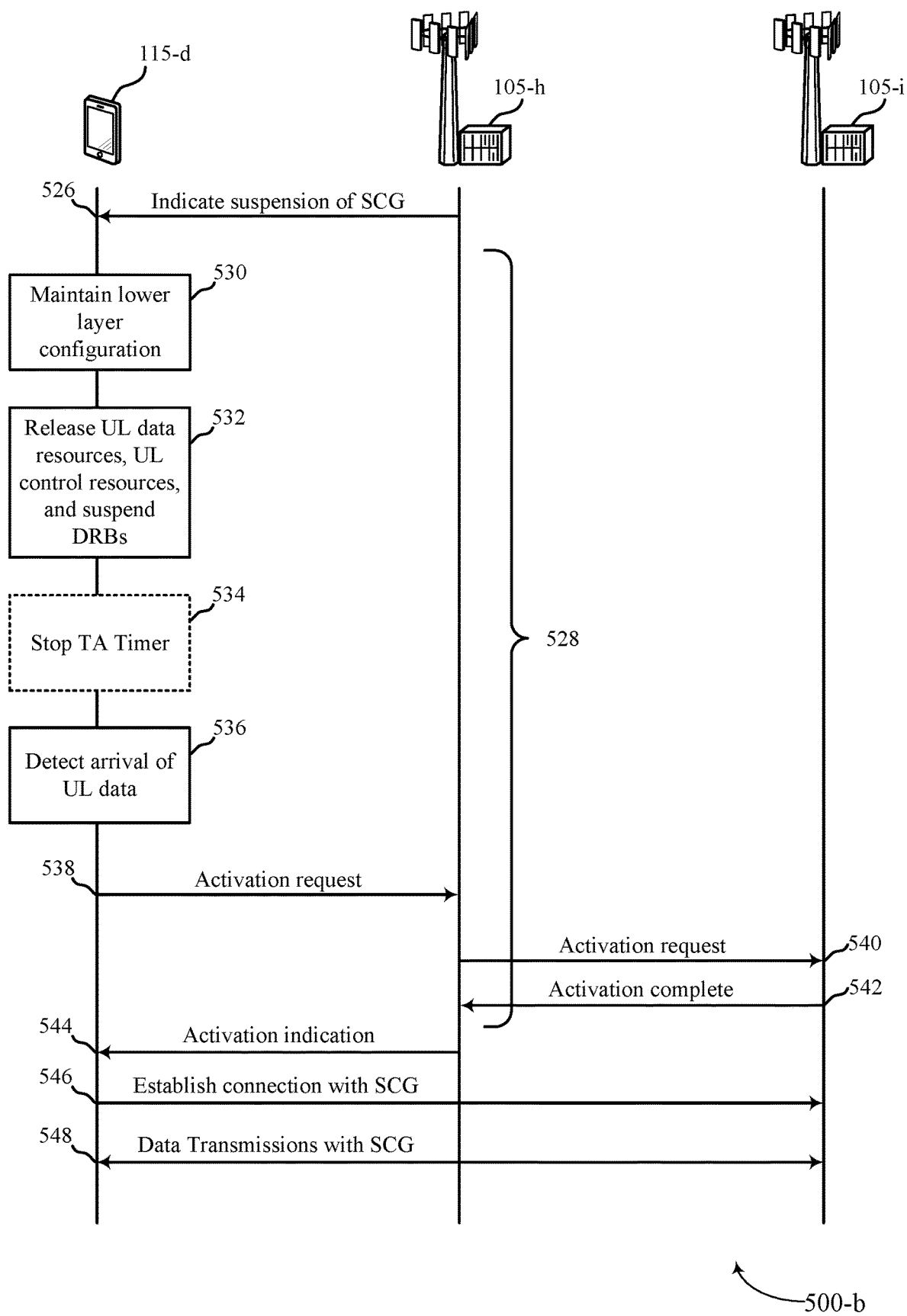

FIG. 5B illustrates an example of a swim diagram 500-*b* that supports fast secondary cell group activation and deactivation using a suspended state in accordance with aspects of the present disclosure. In some examples, swim diagram 500-*b* may implement aspects of wireless communications system 100. In the following description of the swim diagram 500-*b*, the operations between base station 105-*h*, base station 105-*i*, and UE 115-*d* may occur in a different order than the exemplary order shown, or the operations performed by the devices may be performed in different orders or at different times. Certain operations may also be left out of the swim diagram 500-*b*, or other operations may be added to the swim diagram 500-*b*.

In the illustrated example, diagram 500-*b* may include UE 115-*d*, base station 105-*h*, and base station 105-*i*. Prior to 526, base station 105-*i* may enter a suspended state (e.g., in response to a request from base station 105-*h*).

At 526, UE 115-*d* may receive a message from base station 105-*h* indicating that base station 105-*i* has entered a suspended state. The message may be a DCI or RRC message. Thus, UE 115-*d* may determine that base station 105-*i* has entered the suspended state. In some cases, base station 105-*i*, rather than base station 105-*h*, may inform UE 115-*d* of its impending suspended state before entering the suspended state.

At 528, UE 115-*d* may stop monitoring downlink channels associated with base station 105-*i*. For example, UE 115-*d* may stop monitoring the PDCCH for a least a portion of the time base station 105-*i* is in suspended mode. In some cases, ceasing to monitor downlink resources may involve powering-down radio frequency (RF) components used for monitoring. Thus, UE 115-*d* may conserve power by ceasing to monitor downlink resources.

At 530, UE 115-*d* may maintain the lower layer configuration for base station 105-*i* based on determining that base station 105-*i* has entered, or will enter, the suspended state. Maintaining the lower layer configuration may allow the UE 115-*d* to communicate with base station 105-*i* without first re-obtaining the lower layer configuration, which may reduce signaling overhead and latency.

At 532, UE 115-*d* may, based on the suspension state of base station 105-*i*, suspend DRBs associated with base station 105-*i* and release CFRA resources, uplink data resources (e.g., uplink resources reserved for data, such as PUSCH resources), and uplink control resources (e.g., uplink resources reserved for control information, such as PUCCH, sPUCCH, and SRS resources) associated with base station 105-*i*. Thus, UE 115-*d* may not actively transmit over uplink control resources during suspension. By releasing the resources for other devices to use, UE 115-*d* may increase the efficiency of the communication system of which UE 115-*d* is a part.

Releasing uplink resources (e.g., uplink data resources and uplink control resources) may involve UE 115-*d* indicating (e.g., by taking certain actions or refraining from certain actions) to base station 105-*i* that the uplink resources can be allocated to other devices. For example, UE 115-*d* may implicitly release uplink resources by refraining from transmitting over the uplink resources. Or UE 115-*d* may explicitly release uplink resources by sending a message indicating release to base station 105-*i*. In some cases, the uplink data resources released by UE 115-*d* may be resources previously reserved for UE 115-*d* via one or more uplink grants (e.g., via persistent scheduling).

Releasing DRBs may include tearing down the DRBs (e.g., discarding all aspects of the DRBs). Suspending DRBs may include retaining a portion of the DRBs, rather than tearing them down completely, so that signaling to re-establish the DRBs (e.g., when a connection with base station 105-*i* becomes available) is reduced. Compared to releasing the DRBs, suspending the DRBs may allow the UE 115-*d* to communicate with base station 105-*i* more quickly and with reduced signaling overhead (because the DRBs only need to be partially, rather than completely, reconstructed).

At 534, UE 115-*d* may stop the TA timer associated with base station 105-*i*. The stoppage may be based on base station 105-*i* entering the suspended state and/or the release of the uplink resources associated with base station 105-*i*. Because synchronization with base station 105-*i* is irrelevant when resources have been released, stopping the TA timer may allow UE 115-*d* to reduce power consumption and processing. In some cases, the TA timer may be stopped based on the determination that UE 115-*d* is prohibited from triggering or performing a random access procedure (e.g., RACH) in the PSCell of the secondary cell group of which base station 105-*i* is a part. In other cases, the TA timer may be maintained based on determining that UE 115-*d* is allowed to trigger or perform a random access procedure with the PSCell.

At 536, UE 115-*d* may detect the arrival of uplink data. In some cases, detecting the arrival of uplink data may include determining that there is data intended for base station 105-*i* in an uplink buffer. At 538, UE 115-*d* may send a message (e.g., an activation request) to base station 105-*h* requesting that base station 105-*i* be activated (e.g., leave the suspended state). The message may be a MAC-CE, DCI message, or RRC message. In some cases, UE 115-*d* may send the activation request message based on releasing the uplink resources (e.g., UE 115-*d* may determine that communicating with base station 105-*i* directly is impracticable). At 540, base station 105-*h* may send an activation request to base station 105-*i*. The activation request at 540 may be based on the activation request that base station 105-*h* previously received from UE 115-*d*. At 542, base station 105-*i* may send an activation complete message to base station 105-*h*.

At 544, base station 105-*h* may send an activation indication to UE 115-*d*. In some cases, base station 105-*h* may send the activation indication at 544 to confirm that base station 105-*i* is activated. In some cases, base station 105-*h* may send a MAC-CE message, DCI message, or RRC message to UE 115-*d* to communicate the activation indication.

At 546, UE 115-*d* may establish a connection with base station 105-*i*. In some cases, UE 115-*d* may re-establish a connection with base station 105-*i* at 546. For example, before 526 UE 115-*d* may have established a connection with base station 105-*i*. In some cases, before 526 UE 115-*d* may have established a first connection with base station 105-*h* and a second connection with base station 105-*i* in a dual connectivity environment. Accordingly, at 546, UE 115-*d* may re-establish the second connection with base station 105-*i*. In some cases, UE 115-*d* may perform a random access procedure (e.g., random access channel procedure) with base station 105-*i* after receiving the activation indication at 544. In some cases, UE 115-*d* may perform the random access procedure in order to determine or calculate a timing advance parameter for base station 105-*i*.

At 548, UE 115-*d* may start communicating with base station 105-*i* using the connection with base station 105-*i* that UE 115-*d* established at 546. For example, UE 115-*d* may send a scheduling request to base station 105-*i*, to which base station 105-*i* may respond by sending an uplink grant. UE 115-*i* may transmit the uplink data detected at 536 to base station 105-*i* in accordance with the uplink grant.

Figure 5C:
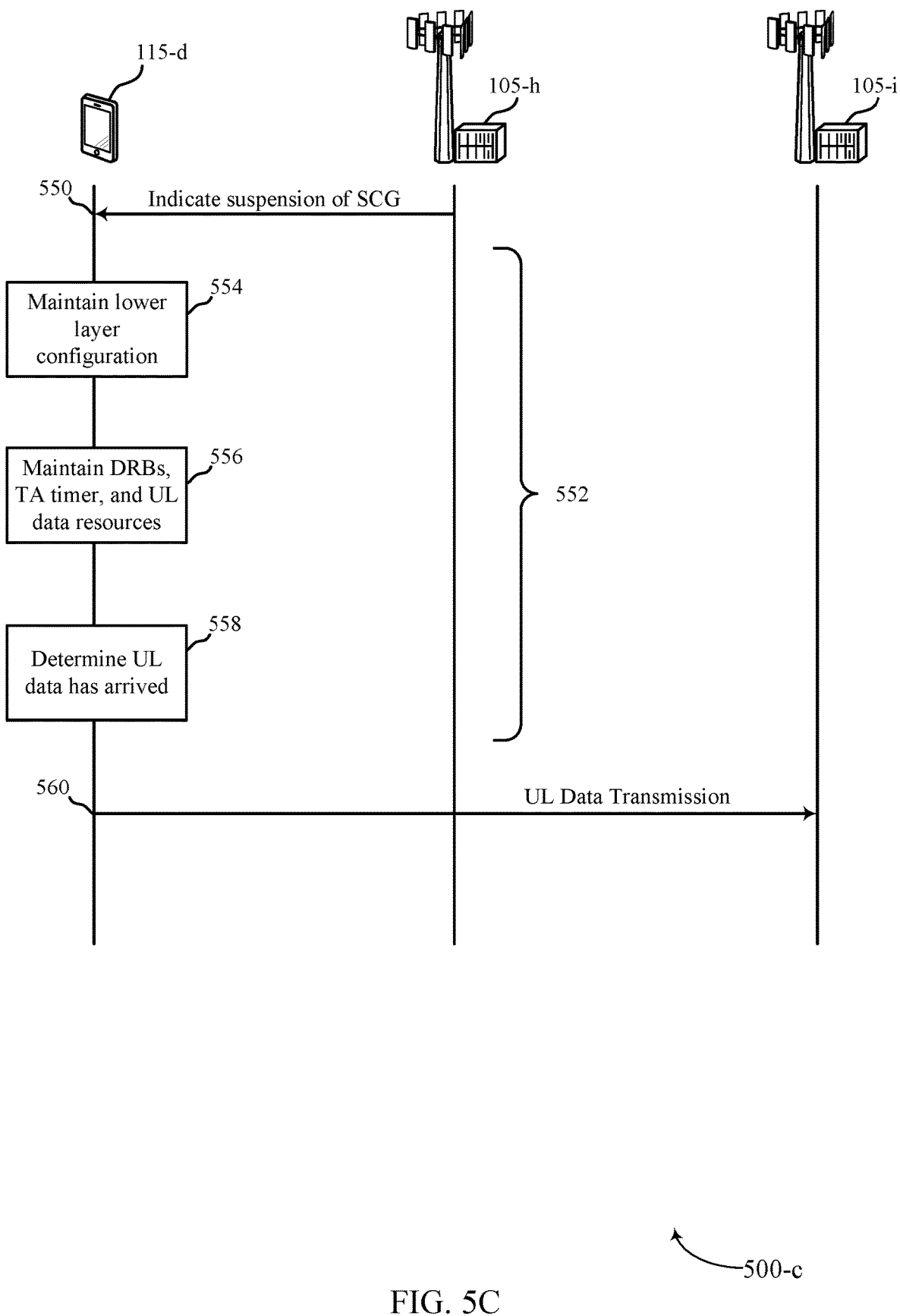

FIG. 5C illustrates an example of a swim diagram 500-*c* that supports fast secondary cell group activation and deactivation using a suspended state in accordance with aspects of the present disclosure. In some examples, swim diagram 500-*c* may implement aspects of wireless communications system 100. In the following description of the swim diagram 500-*c*, the operations between base station 105-*h*, base station 105-*i*, and UE 115-*d* may occur in a different order than the exemplary order shown, or the operations performed by the devices may be performed in different orders or at different times. Certain operations may also be left out of the swim diagram 500-*c*, or other operations may be added to the swim diagram 500-*c*.

In the illustrated example, diagram 500-*c* may include UE 115-*d*, base station 105-*h*, and base station 105-*i*. Prior to 550, base station 105-*i* may enter a suspended state (e.g., in response to a request from base station 105-*h*).

At 550, UE 115-*d* may receive, from base station 105-*h*, a message indicating that base station 105-*i* has entered the suspended state. In some cases, the message may be a MAC-CE message, DCI message, or RRC message. At 552, UE 115-*d* may stop monitoring downlink channels associated with base station 105-*i*. For example, UE 115-*d* may stop monitoring the PDCCH for a least a portion of the time base station 105-*i* is in the suspended state. However, in some cases UE 115-*d* may receive an uplink grant conveyed by the uplink control resources before ceasing to monitor the uplink control resources. The uplink grant may persistently schedule the same resources for uplink transmissions by UE 115-*d* to base station 105-*i*.

At 554, UE 115-*d* may maintain a lower layer configuration for base station 105-*i* based on base station 105-*i* entering the suspended state. At 556, UE 115-*d* may maintain DRBs associated with base station 105-*i*, the TA timer associated with base station 105-*i*, and uplink data resources associated with base station 105-*i*. The uplink data resources may be resources reserved, via one or more uplink grants, for uplink data transmissions by UE 115-*d*. For example, the uplink data resources may be resources that are persistently scheduled for UE 115-*d*.

Maintaining DRBs may include retaining all or most of the aspects of the DRBs established with base station 105-*i* so that they are ready to use when UE 115-*d* detects uplink data for transmission. By maintaining the DRBs, instead of suspending or releasing them, UE 115-*d* may transmit uplink data using the DRBs without first signaling to reconstruct them. Maintaining uplink data resources may include UE 115-*d* taking actions that indicate to base station 105-*i* that the uplink resources are in use by UE 115-*d* (and thus should not be allocated to another device). For example, UE 115-*d* may implicitly maintain uplink resources by intermittently transmitting over the resources to base station 105-*i* (e.g., by sending maintenance signals to base station 105-*i*).

In some examples (e.g., in implementations in which UE 115-*d* maintains uplink resources), UE 115-*d* may be permitted to send reference signals and channel information to base station 105-*i*, or base station 105-*h*, during the suspension. For example, UE 115-*d* may periodically or semi-persistently send SRS and/or channel state information (CSI) to base station 105-*i*, or base station 105-*h*, during the suspension.

At 558, UE 115-*d* may determine that uplink data for base station 105-*i* has arrived or is pending at UE 115-*d*. In response to the determination, UE 115-*d* may, at 560, transmit the uplink data to base station 105-*i* using the uplink data resources maintained by UE 115-*d*. Because the data resources are maintained, UE 115-*d* may transmit the uplink data without first sending a scheduling request to, or performing a random access procedure with, base station 105-*i*. Thus, maintaining the uplink data resources may reduce, relative to other implementations, overhead signaling and/or the delay between identifying uplink data and providing it to base station 105-*i*. In some examples, the downlink between base station 105-*i* and UE 115-*d* may be activated when uplink data is available at UE 115-*d* (e.g., after base station 105-*i* receives the uplink data from UE 115-*d*).

Figure 5D:
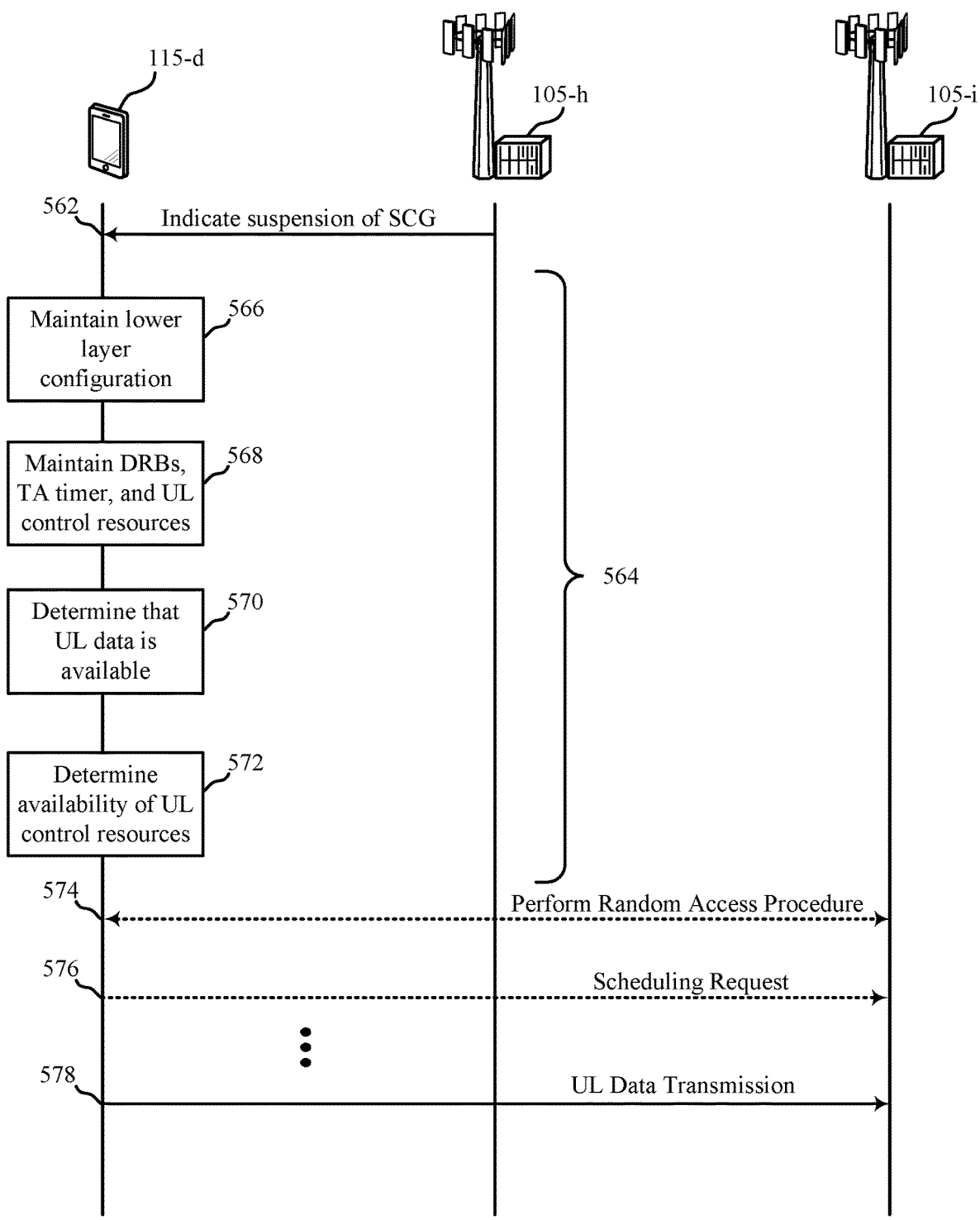

FIG. 5D illustrates an example of a swim diagram 500-*d* that supports fast secondary cell group activation and deactivation using a suspended state in accordance with aspects of the present disclosure. In some examples, swim diagram 500-*d* may implement aspects of wireless communications system 100. In the following description of the swim diagram 500-*d*, the operations between base station 105-*h*, base station 105-*i*, and UE 115-*d* may occur in a different order than the exemplary order shown, or the operations performed by the devices may be performed in different orders or at different times. Certain operations may also be left out of the swim diagram 500-*d*, or other operations may be added to the swim diagram 500-*d*.

In the illustrated example, diagram 500-*d* may include UE 115-*d*, base station 105-*h*, and base station 105-*i*. Prior to 562, base station 105-*i* may enter a suspended state (e.g., in response to a request from base station 105-*h*).

At 562, UE 115-*d* may receive a message from base station 105-*h* indicating that base station 105-*i* is in a suspended state. The message may a MAC-CE message, DCI message, or RRC message. Thus, UE 115-*d* may determine that base station 105-*i* is in the suspended state. In some cases, base station 105-*i* may inform UE 115-*d* of its impending suspended state before entering the suspended state.

At 564, UE 115-*d* may stop monitoring downlink channels associated with base station 105-*i*. For example, UE 115-*d* may stop monitoring the PDCCH for a least a portion of the time base station 105-*i* is in suspended mode. At 566, UE 115-*d* may maintain the lower layer configuration for base station 105-*i* based on determining that base station 105-*i* has entered, or will enter, the suspended state.

At 568, UE 115-*d* may, based on the suspended state of base station 105-*i*, maintain DRBs associated with base station 105-*i* as well as the TA timer associated with base station 105-*i* and uplink control resources associated with base station 105-*i*. UE 115-*d* may also release any uplink data resources that have been reserved for UE 115-*d*. The status of the TA timer may indicate whether UE 115-*d* has maintained synchronization with base station 105-*i*. For example, an expired TA timer may indicate that UE 115-*d* has lost synchronization because no TA parameter was received in the time allotted. And an active (e.g., running) TA timer may indicate that UE 115-*d* has maintained synchronization because a TA parameter was received in the time allotted.

In some examples, UE 115-*d* may release or maintain certain resources based on the status of the TA timer (e.g., based on synchronization with base station 105-*i*). For instance, if the TA timer expires, UE 115-*d* may release uplink control resources that were previously maintained. If the TA timer remains active, UE 115-*d* may continue to maintain those uplink control resources. Thus, UE 115-*d* may release uplink control resources if UE 115-*d* has lost synchronization with base station 105-*i* and maintain uplink control resources if UE 115-*d* has maintained synchronization with base station 105-*i*.

In some examples (e.g., in implementations in which UE 115-*d* maintains uplink resources), UE 115-*d* may be permitted to send reference signals and channel information to base station 105-*i*, or base station 105-*h*, during the suspension. For example, UE 115-*d* may periodically or semi-persistently send SRS and/or CSI to base station 105-*i*, or base station 105-*h*, during the suspension.

At 570, UE 115-*d* may determine that uplink data is available for transmission to base station 105-*i*. Because UE 115-*d* previously released its uplink data resources for base station 105-*d*, UE 115-*d* may attempt to acquire new uplink data resources for transmission of the uplink data. Accordingly, at 572, UE 115-*d* may determine the availability of uplink control resources for sending a scheduling request. For example, UE 115-*d* may determine whether uplink control resources previously allocated to UE 115-*d* have been maintained or released by UE 115-*d*.

If UE 115-*d* determines that the uplink control resources have been released, UE 115-*d* may, at 574, perform a random access procedure with base station 105-*i*. During the random access procedure, UE 115-*d* may acquire timing and synchronization information (e.g., a TA parameter) from base station 105-*i*. Upon completion of the random access procedure, UE 115-*d* may establish a connection with base station 105-*i*. UE 115-*d* may also acquire uplink control resources for sending control information to base station 105-*i*. Accordingly, UE 115 may, at 576, send a scheduling request to base station 105-*i* (e.g., using the timing and synchronization information obtained via the random access procedure).

If, at 572, UE 115-*d* determines that the uplink control resources have been maintained, UE 115-*d* may send a scheduling request to base station 105-*i* without performing the random access procedure at 574.

At 578, UE 115-*d* may transmit the uplink data to base station 105-*i*. The transmission may be based at least in part on scheduling information conveyed by an uplink grant, from base station 105-*i*, that was received in response to the scheduling request. Thus, in some examples, the downlink between base station 105-*i* and UE 115-*d* may be activated when uplink data is available at UE 115-*d* (e.g., after base station 105-*i* receives the uplink data from UE 115-*d*).

Figure 6:
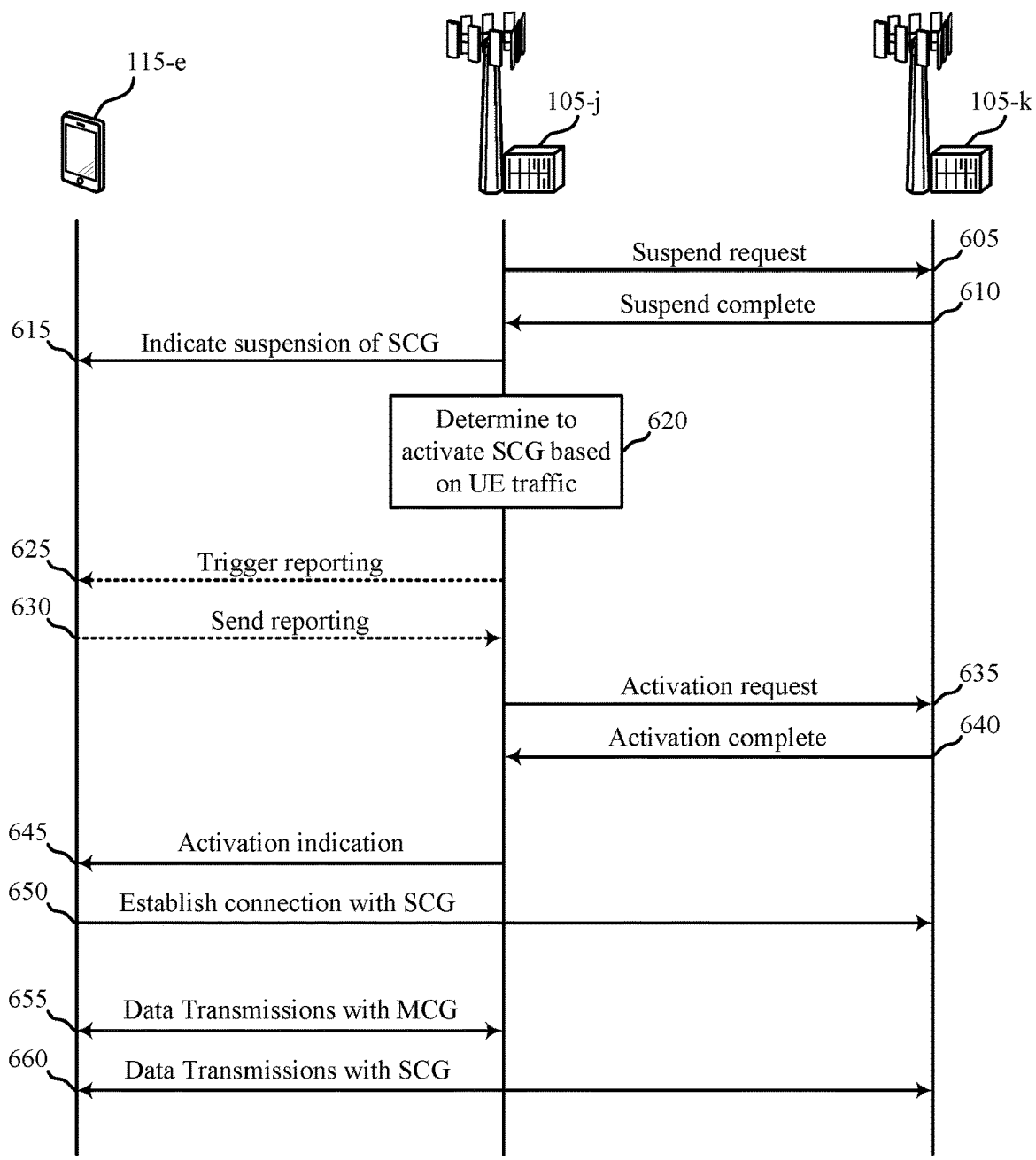
FIG. 6 illustrates an example of a swim diagram that supports fast secondary cell group activation and deactivation using a suspended state in accordance with aspects of the present disclosure.

FIG. 6 illustrates an example of a swim diagram 600 that supports fast secondary cell group activation and deactivation using a suspended state in accordance with aspects of the present disclosure. In some examples, swim diagram 600 may implement aspects of wireless communications system 100.

In the illustrated example, diagram 600 may include UE 115-*e*, base station 105-*j*, and base station 105-*k*. In one example, UE 115-*e* may be one example of a UE 115 from FIG. 1, 2, or 5. In one example, UE 115-*e* may be one example of a dual connectivity device. In one example, UE 115-*e* may be a dual connectivity device that establishes a first connection with base station 105-*j* and a second connection with base station 105-*k*. In some cases, base station 105-*j* may be a master node of a master cell group. In some cases, base station 105-*k* may be a secondary node of a secondary cell group.

At 605, base station 105-*j* may send a suspend request to base station 105-*k*. (e.g., via backhaul link 134). At 610, base station 105-*k* may send a suspend complete message to base station 105-*j* indicating that suspension is completed.

At 615, base station 105-*j* may send a message to UE 115-*e* indicating base station 105-*k* is suspended. In some cases, base station 105-*j* may send a MAC-CE message, DCI message, or RRC message to UE 115-*e* to indicate base station 105-*k* is suspended.

At 620, base station 105-*j* may determine to activate base station 105-*k*. In some cases, at 620 base station 105-*j* may determine whether to activate base station 105-*k* based on an overall traffic status of UE 115-*e* (e.g., based on a buffer status report that base station 105-*j* receives from UE 115-*e*, etc.).

At 625, base station 105-*j* may optionally send a message to UE 115-*e* to trigger reporting by UE 115-*e*. In some cases, the reporting may include a channel measurement report. In some cases, at 625 base station 105-*j* may trigger channel quality indicator (CQI) reporting by UE 115-*e*. For example, the channel measurement report may include CQI reporting. In some cases, base station 105-*j* may be triggered by base station 105-*j* for power saving purposes while base station 105-*k* is suspended.

At 630, UE 115-*e* may optionally provide a channel measurement report to base station 105-*j*. In some cases, the channel measurement report from UE 115-*e* may include CQI reporting. In some cases, the reporting from UE 115-*e* may be based on a tracking reference signal received by UE 115-*e* from base station 105-*j* or base station 105-*k*. In some examples, the tracking reference signal may be periodic or aperiodic. In some cases, the tracking reference signal from base station 105-*j* may be quasi-co-located with base station 105-*k*. In some cases, base station 105-*j* may transmit a tracking reference signal to UE 115-*e* that is quasi-co-located with base station 105-*k*. In some cases, base station 105-*j* may forward a report from UE 115-*e* to base station 105-*k* via an inter-node message (e.g., backhaul link 134 of FIG. 1 or 2).

At 635, base station 105-*j* may send an activation request to base station 105-*k*. In some cases, the activation request at 635 may include data from the channel measurement report sent by UE 115-*e* to base station 105-*j* at 630. For example, in some examples the activation request at 635 may include CQI reporting from UE 115-*e*. As shown, base station 105-*j* may send the activation request at 635 based on a determination by base station 105-*j* at 620 to activate base station 105-*k*. At 640, base station 105-*k* may send an activation complete message to base station 105-*j*.

At 645, base station 105-*j* may send an activation indication to UE 115-*e*. In some cases, base station 105-*j* may send the activation indication at 645 to confirm that base station 105-*k* is activated. In some cases, base station 105-*j* may send MAC-CE message, DCI message, or RRC message to UE 115-*e* to communicate the activation indication.

At 650, UE 115-*e* may establish a connection with base station 105-*k*. In some cases, UE 115-*e* may re-establish a connection with base station 105-*k* at 650. In some cases, UE 115-*e* may perform a random access procedure (e.g., random access channel procedure) with base station 105-*k* after receiving the activation indication at 645. In some cases, UE 115-*e* may perform the random access procedure in order to determine or calculate a timing advance parameter for base station 105-*k*.

At 655, UE 115-*e* may continue sending/receiving data with base station 105-*j*. At 660, UE 115-*e* may start sending/receiving data with base station 105-*k* based on the connection with base station 105-*k* that UE 115-*e* established at 650.

Figure 7:
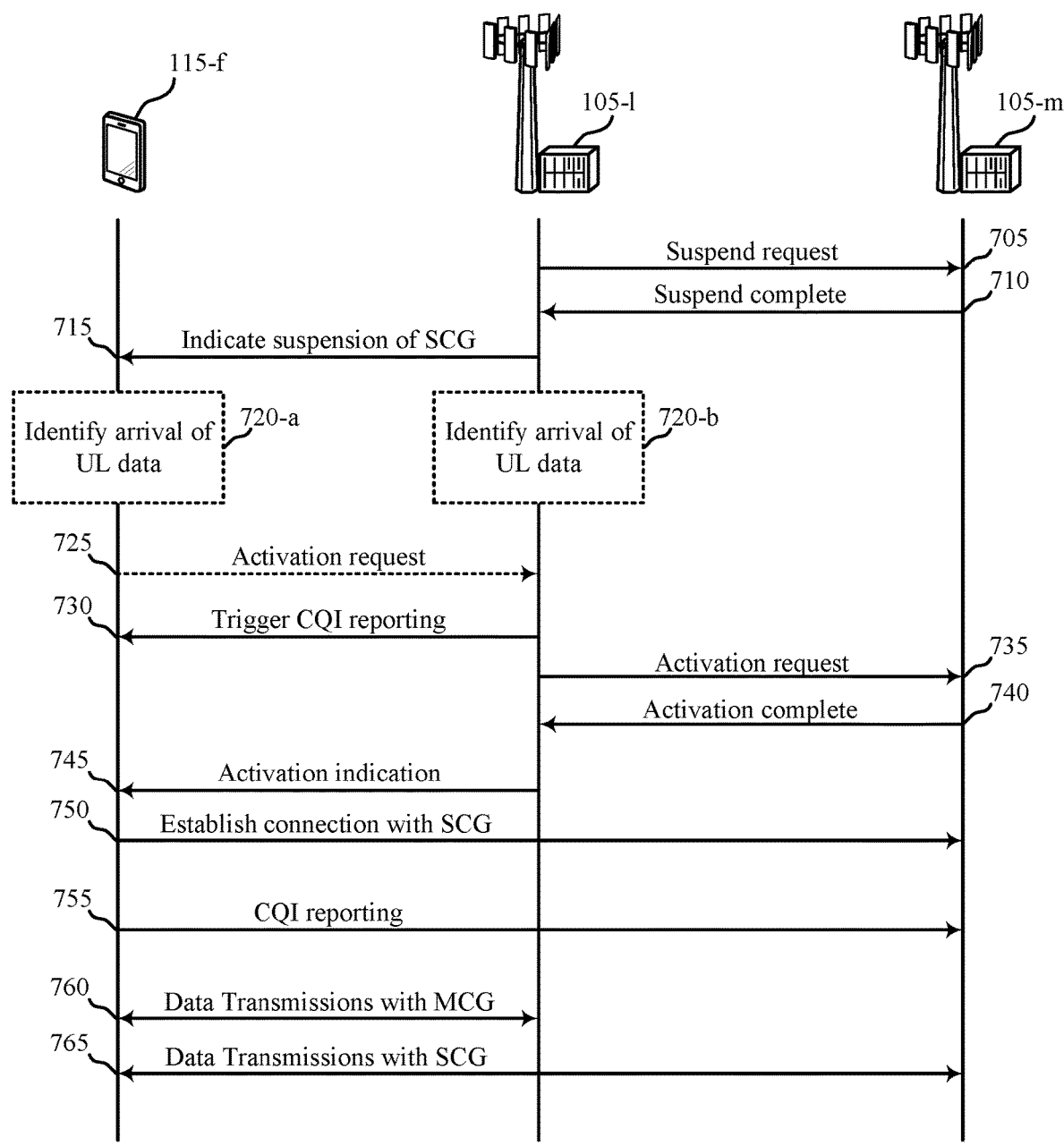
FIG. 7 illustrates an example of a swim diagram that supports fast secondary cell group activation and deactivation using a suspended state in accordance with aspects of the present disclosure.

FIG. 7 illustrates an example of a swim diagram 700 that supports fast secondary cell group activation and deactivation using a suspended state in accordance with aspects of the present disclosure. In some examples, swim diagram 700 may implement aspects of wireless communications system 100.

In the illustrated example, diagram 700 may include UE 115-*f*, base station 105-1, and base station 105-*m*. In one example, UE 115-*f* may be one example of a UE 115 from FIG. 1, 2, 5, or 6. In one example, UE 115-*f* may be one example of a dual connectivity device. In one example, UE 115-*f* may be a dual connectivity device that establishes a first connection with base station 105-1 and a second connection with base station 105-*m*. In some cases, base station 105-1 may be a master node of a master cell group. In some cases, base station 105-*m* may be a secondary node of a secondary cell group.

At 705, base station 105-1 may send a suspend request to base station 105-*m*. (e.g., via backhaul link 134). At 710, base station 105-*m* may send a suspend complete message to base station 105-1 indicating that suspension is completed.

At 715, base station 105-1 may send a message to UE 115-*f* indicating base station 105-*m* is suspended. In some cases, base station 105-1 may send a MAC-CE message, DCI message, or RRC message to UE 115-*f* to indicate base station 105-*m* is suspended.

At 720-*a*, UE 115-*f* may optionally determine to activate base station 105-*m*. Additionally or alternatively, at 720-*b* base station 105-1 may optionally determine to activate base station 105-*m*. In some cases, at 720-*a* UE 115-*f* may determine whether to activate base station 105-*m* based on an overall traffic status of UE 115-*f* (e.g., arrival of uplink data at UE 115-*f* restricted or designated to base station 105-*m*). In some cases, at 720-*b* base station 105-1 may determine whether to activate base station 105-*m* based on an overall traffic status of UE 115-*f* (e.g., based on a buffer status report that base station 105-1 receives from UE 115-*f*, etc.).

At 725, UE 115-*f* may optionally send an activation request to base station 105-1 based on a determination by UE 115-*f* at 720-*a*. In some cases, the activation request from UE 115-*f* may communicated to base station 105-1 via an uplink MAC-CE, a buffer status report, a scheduling request, or a random access preamble (e.g., contention free random access preamble). In some cases, the activation request from UE 115-*f* may include a 1-bit activation request (e.g., binary 1 indicates request, binary 0 indicates no request).

At 730, base station 105-1 may send a message to UE 115-*f* to trigger reporting by UE 115-*f*. In some cases, the reporting may include a channel measurement report. In some cases, at 730 base station 105-1 may trigger channel quality indicator (CQI) reporting by UE 115-*f*. In some cases, base station 105-1 may be triggered by base station 105-1 for power saving purposes while base station 105-*m* is suspended.

At 735, base station 105-1 may send an activation request to base station 105-*m*. In some cases, the activation request at 735 may include data from the channel measurement report sent by UE 115-*f* to base station 105-1 at 735. For example, in some examples the activation request at 735 may include CQI reporting from UE 115-*f*. As shown, base station 105-1 may send the activation request at 735 based on a determination by UE 115-*f* at 720-*a* or a determination by base station 105-1 at 720-*b* to activate base station 105-*m*. At 740, base station 105-*m* may send an activation complete message to base station 105-1.

At 745, base station 105-1 may send an activation indication to UE 115-*f*. In some cases, base station 105-1 may send the activation indication at 745 to confirm that base station 105-*m* is activated. In some cases, base station 105-1 may send a MAC-CE message, DCI message, or RRC message to UE 115-*f* to communicate the activation indication.

At 750, UE 115-*f* may establish a connection with base station 105-*m*. In some cases, UE 115-*f* may re-establish a connection with base station 105-*m* at 750. In some cases, UE 115-*f* may perform a random access procedure (e.g., random access channel procedure) with base station 105-*m* after receiving the activation indication at 745. In some cases, UE 115-*f* may perform the random access procedure in order to determine or calculate a timing advance parameter for base station 105-*m*.

At 755, UE 115-*f* may provide a channel measurement report to base station 105-*m*. In some cases, the channel measurement report from UE 115-*f* may include CQI reporting. In some cases, the reporting from UE 115-*f* may be based on a tracking reference signal received by UE 115-*f* from base station 105-1 or base station 105-*m*. In some examples, the tracking reference signal may be periodic or aperiodic. In some cases, the tracking reference signal from base station 105-1 may be quasi-co-located with base station 105-*m*. In some cases, base station 105-1 may transmit a tracking reference signal to UE 115-*f* that is quasi-co-located with base station 105-*m*. Additionally or alternatively, base station 105-1 may forward a report from UE 115-*f* to base station 105-*m* via an inter-node message (e.g., backhaul link 134 of FIG. 1 or 2).

At 760, UE 115-*f* may continue sending/receiving data with base station 105-1. At 765, UE 115-*f* may start sending/receiving data with base station 105-*m* based on the connection with base station 105-*m* that UE 115-*f* established at 750.

Figure 8:
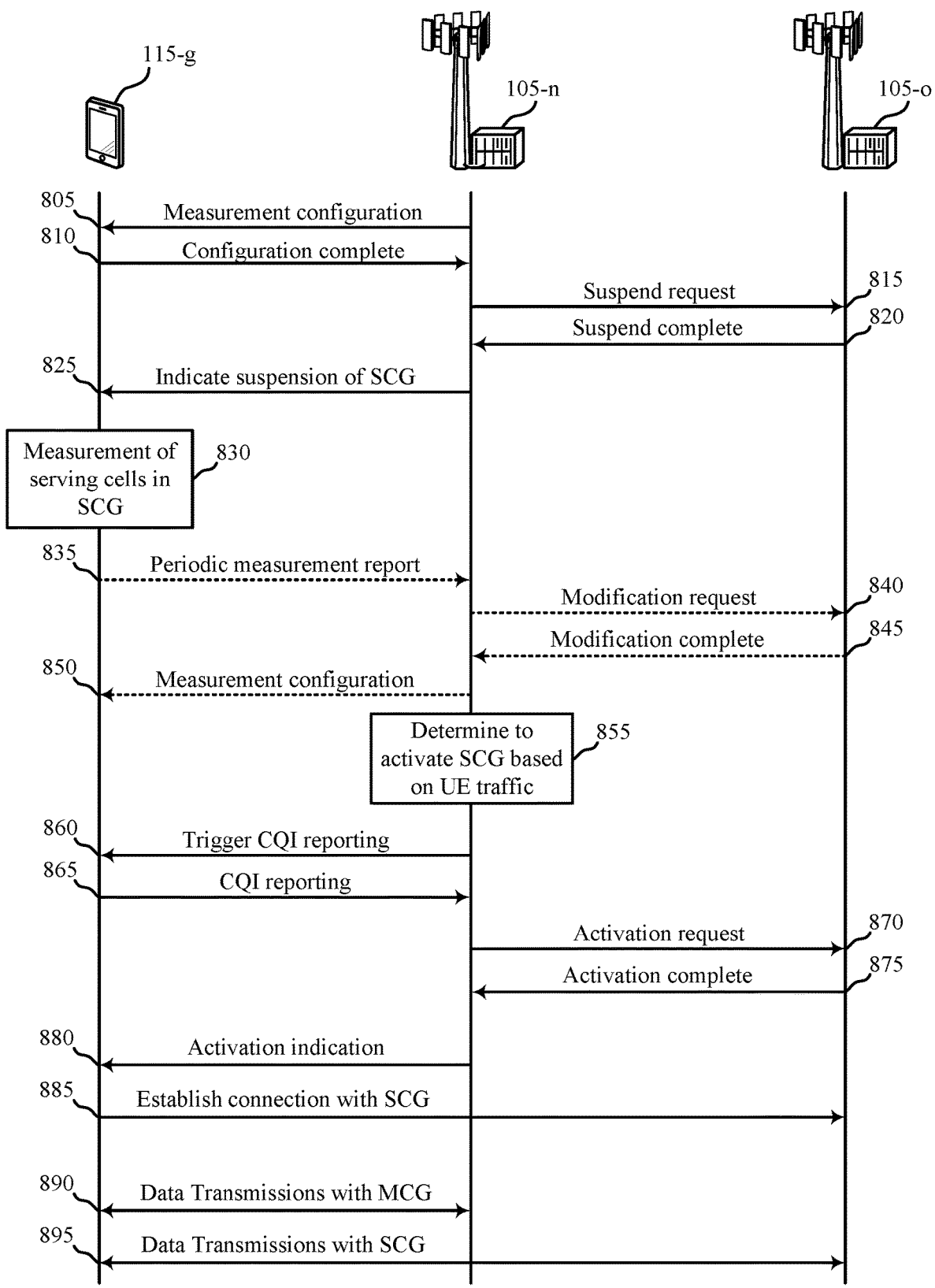
FIG. 8 illustrates an example of a swim diagram that supports fast secondary cell group activation and deactivation using a suspended state in accordance with aspects of the present disclosure.

FIG. 8 illustrates an example of a swim diagram 800 that supports fast secondary cell group activation and deactivation using a suspended state in accordance with aspects of the present disclosure. In some examples, swim diagram 800 may implement aspects of wireless communications system 100.

In the illustrated example, diagram 800 may include UE 115-*g*, base station 105-*n*, and base station 105-*o*. In one example, UE 115-*g* may be one example of a UE 115 from FIG. 1, 2, 5, 6, or 7. In one example, UE 115-*g* may be one example of a dual connectivity device. In one example, UE 115-*g* may be a dual connectivity device that establishes a first connection with base station 105-*n* and a second connection with base station 105-*o*. In some cases, base station 105-*n* may be a master node of a master cell group. In some cases, base station 105-*o* may be a secondary node of a secondary cell group.

At 805, base station 105-*n* may send a measurement configuration message to UE 115-*g*. In some cases, the measurement configuration message at 805 may be based on an RRC message. For example, in some cases the measurement configuration message at 805 may be indicated to UE 115-*g* in an RRC reconfiguration message from base station 105-*n*. As shown in the illustrated example, base station 105-*n* may send the measurement configuration message to UE 115-*g* before suspension of base station 105-*o*. In some cases, the measurement configuration message at 805 may instruct UE 115-*g* to adjust measurements associated with base station 105-*o* (e.g., reduce measurements, etc.). For example, base station 105-*n* may instruct UE 115-*g* to perform less measurements of base station 105-*o* (e.g., less than a default number of measurements) while base station 105-*o* is suspended compared to a when base station 105-*o* is activated. In some cases, measurement configuration message at 805 may specify that UE 115-*g* may only measure serving cells from the secondary cell group. In some cases, measurement configuration message at 805 may specify that the number of frequencies among the serving cells of the second cell group that may be measured by UE 115-*g* is limited to a set number of measured frequencies (e.g., limited to up to 3 measured frequencies, etc.). At 810, UE 115-*g* may indicate to base station 105-*n* that the measurement configuration is completed.

At 815, base station 105-*n* may send a suspend request to base station 105-*o*. (e.g., via backhaul link 134). At 820, base station 105-*o* may send a suspend complete message to base station 105-*n* indicating that suspension is completed.

At 825, base station 105-*n* may send a message to UE 115-*g* indicating base station 105-*o* is suspended. In some cases, base station 105-*n* may send a MAC-CE message, DCI message, or RRC message to UE 115-*g* to indicate base station 105-*o* is suspended.

At 830, UE 115-*g* may perform one or more measurements based on base station 105-*o* being in a suspended state. In some cases, UE 115-*g* may perform a measurement of at least one serving cell associated with a secondary cell group. In some cases, base station 105-*o* may be one of the at least one serving cells from the secondary cell group. In some cases, UE 115-*g* may perform one or more measurements based on the measurement reconfiguration of UE 115-*g* at 805/810.

At 835, UE 115-*g* may optionally send a periodic measurement report to base station 105-*n* (e.g., a radio resource management measurement report). In some cases, a periodicity of the one or more measurements at 830 or a periodicity of the periodic measurement report at 835 may be based on the measurement reconfiguration of UE 115-*g* at 805/810.

At 840, base station 105-*n* may optionally send a modification request message to base station 105-*o*. In some cases, base station 105-*n* may send the modification request to base station 105-*o* based on the periodic measurement report received from UE 115-*g* at 835. In some examples, base station 105-*n* may forward the measurement report received from UE 115-*g* at 835 to base station 105-*o* in the modification request message.

At 845, base station 105-*o* may optionally send a modification complete message to base station 105-*n* (e.g., based on whether base station 105-*n* sends the modification request message at 840). In some cases, base station 105-*o* may send an updated configuration (e.g., updated lower layer configuration) to base station 105-*n* in the modification complete message.

At 850, base station 105-*n* may send a measurement configuration message to UE 115-*g*. In some cases, the measurement configuration message at 850 may be based on an RRC message. For example, in some cases the measurement configuration message at 850 may be indicated to UE 115-*g* in an RRC reconfiguration message from base station 105-*n*. As shown in the illustrated example, base station 105-*n* may send the measurement configuration message to UE 115-*g* after sending the modification request to base station 105-*o* at 840. In some cases, the measurement configuration message at 850 may indicate an updated configuration (e.g., lower layer configuration) of base station 105-*o*.

At 855, base station 105-*n* may determine to activate base station 105-*o*. In some cases, at 855 base station 105-*n* may determine whether to activate base station 105-*o* based on an overall traffic status of UE 115-*g* (e.g., based on a buffer status report that base station 105-*n* receives from UE 115-*g*, etc.).

At 860, base station 105-*n* may send a message to UE 115-*g* to trigger reporting by UE 115-*g*. In some cases, the reporting may include a channel measurement report (e.g., radio resource management measurement). In some cases, at 860 base station 105-*n* may trigger channel quality indicator (CQI) reporting by UE 115-*g*. In some cases, base station 105-*n* may be triggered by base station 105-*n* for power saving purposes while base station 105-*o* is suspended.

At 865, UE 115-*g* may provide a channel measurement report to base station 105-*n*. In some cases, the channel measurement report from UE 115-*g* may include CQI reporting. In some cases, the reporting from UE 115-*g* may be based on a tracking reference signal received by UE 115-*g* from base station 105-*n* or base station 105-*o*. In some examples, the tracking reference signal may be periodic or aperiodic. In some cases, the tracking reference signal from base station 105-*n* may be quasi-co-located with base station 105-*o*. In some cases, base station 105-*n* may transmit a tracking reference signal to UE 115-*g* that is quasi-co-located with base station 105-*o*. In some cases, base station 105-*n* may forward a report from UE 115-*g* to base station 105-*o* via an inter-node message (e.g., backhaul link 134 of FIG. 1 or 2).

At 870, base station 105-*n* may send an activation request to base station 105-*o*. In some cases, the activation request at 870 may include data from the channel measurement report sent by UE 115-*g* to base station 105-*n* at 865. For example, in some examples the activation request at 870 may include CQI reporting from UE 115-*g*. Additionally or alternatively, UE 115-*g* may send a channel measurement report directly to base station 105-*o*. As shown, base station 105-*n* may send the activation request at 870 based on a determination by base station 105-*n* at 855 to activate base station 105-*o*. At 875, base station 105-*o* may send an activation complete message to base station 105-*n*.

At 880, base station 105-*n* may send an activation indication to UE 115-*g*. In some cases, base station 105-*n* may send the activation indication at 880 to confirm that base station 105-*o* is activated. In some cases, base station 105-*n* may send MAC-CE message, DCI message, or RRC message to UE 115-*g* to communicate the activation indication.

At 885, UE 115-g may establish a connection with base station 105-o. In some cases, UE 115-g may re-establish a connection with base station 105-o at 885. In some cases, UE 115-g may perform a random access procedure (e.g., random access channel procedure) with base station 105-o after receiving the activation indication at 880. In some cases, UE 115-g may perform the random access procedure in order to determine or calculate a timing advance parameter for base station 105-o.

At 890, UE 115-g may continue sending/receiving data with base station 105-n. At 895, UE 115-g may start sending/receiving data with base station 105-o based on the connection with base station 105-o that UE 115-g established at 885.

Figure 9:
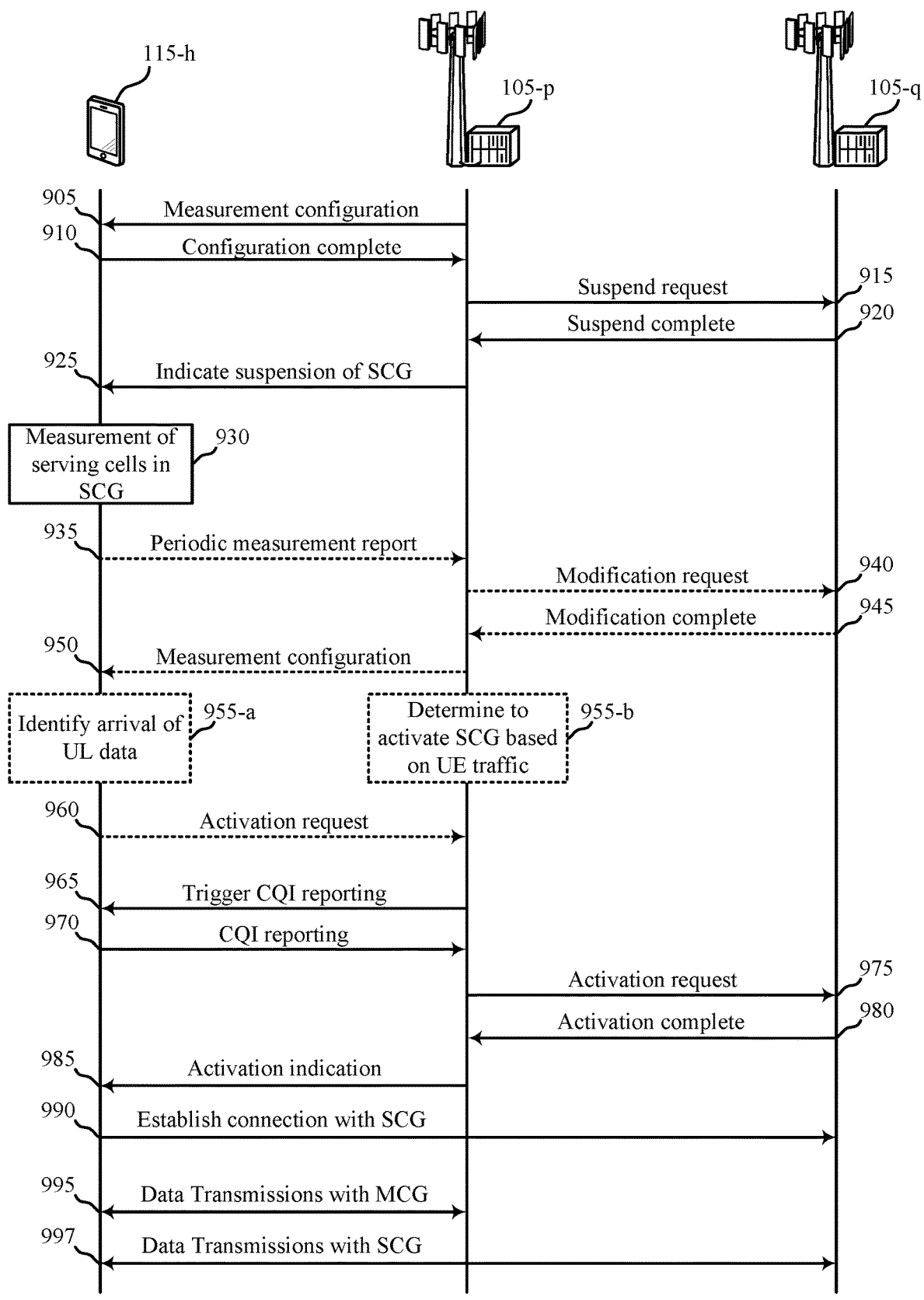
FIG. 9 illustrates an example of a swim diagram that supports fast secondary cell group activation and deactivation using a suspended state in accordance with aspects of the present disclosure.

FIG. 9 illustrates an example of a swim diagram 900 that supports fast secondary cell group activation and deactivation using a suspended state in accordance with aspects of the present disclosure. In some examples, swim diagram 900 may implement aspects of wireless communications system 100.

In the illustrated example, diagram 900 may include UE 115-h, base station 105-p, and base station 105-q. In one example, UE 115-h may be one example of a UE 115 from FIG. 1, 2, 5, 6, 7, or 8. In one example, UE 115-h may be one example of a dual connectivity device. In one example, UE 115-h may be a dual connectivity device that establishes a first connection with base station 105-p and a second connection with base station 105-q. In some cases, base station 105-p may be a master node of a master cell group. In some cases, base station 105-q may be a secondary node of a secondary cell group.

At 905, base station 105-p may send a measurement configuration message to UE 115-h. In some cases, the measurement configuration message at 905 may be based on an RRC message. As shown in the illustrated example, base station 105-p may send the measurement configuration message to UE 115-h before suspension of base station 105-q. In some cases, the measurement configuration message at 905 may instruct UE 115-h to adjust measurements associated with base station 105-q (e.g., reduce measurements, etc.). In some cases, measurement configuration message at 805 may specify that UE 115-g may only measure serving cells from the secondary cell group. In some cases, measurement configuration message at 905 may specify that the number of frequencies among the serving cells of the second cell group that may be measured by UE 115-h is limited to a set number of measured frequencies (e.g., limited to up to 3 measured frequencies, etc.). At 910, UE 115-h may indicate to base station 105-p that the measurement configuration is completed.

At 915, base station 105-p may send a suspend request to base station 105-q. (e.g., via backhaul link 134). At 920, base station 105-q may send a suspend complete message to base station 105-p indicating that suspension is completed.

At 925, base station 105-p may send a message to UE 115-h indicating base station 105-q is suspended. In some cases, base station 105-p may send a MAC-CE message, DCI message, or RRC message to UE 115-h to indicate base station 105-q is suspended.

At 930, UE 115-h may perform one or more measurements at a periodicity that is based on base station 105-q being in a suspended state. In some cases, UE 115-h may perform a measurement of at least one serving cell associated with a secondary cell group. In some cases, base station 105-q may be one of the at least one serving cells from the secondary cell group. In some cases, UE 115-h may perform one or more measurements based on the measurement reconfiguration of UE 115-h at 905/910.

At 935, UE 115-h may optionally send a periodic measurement report to base station 105-p (e.g., a radio resource management measurement report). In some cases, a periodicity of the one or more measurements at 930 or a periodicity of the periodic measurement report at 935 may be based on the measurement reconfiguration of UE 115-h at 905/910.

At 940, base station 105-p may optionally send a modification request message to base station 105-q. In some cases, base station 105-p may send the modification request to base station 105-q based on the periodic measurement report received from UE 115-h at 935. In some examples, base station 105-p may forward the measurement report received from UE 115-h at 935 to base station 105-q in the modification request message.

At 945, base station 105-q may optionally send a modification complete message to base station 105-p (e.g., based on whether base station 105-p sends a modification request message at 940). In some cases, base station 105-q may send an updated configuration (e.g., updated lower layer configuration) to base station 105-p in the modification complete message.

At 950, base station 105-p may send a measurement configuration message to UE 115-h. In some cases, the measurement configuration message at 950 may be based on an RRC message. As shown in the illustrated example, base station 105-p may send the measurement configuration message to UE 115-h after optionally sending a modification request to base station 105-q at 940. In some cases, the measurement configuration message at 950 may indicate an updated configuration (e.g., lower layer configuration) of base station 105-q.

At 955-a, UE 115-h may optionally determine to activate base station 105-q. Additionally or alternatively, at 955-b base station 105-p may optionally determine to activate base station 105-q. In some cases, at 955-b base station 105-p may determine whether to activate base station 105-q based on an overall traffic status of UE 115-h (e.g., based on a buffer status report that base station 105-p receives from UE 115-h, etc.).

At 960, UE 115-h may optionally send an activation request to base station 105-p. In some cases, UE 115-h may send a channel measurement report (e.g., radio resource management measurement of base station 105-q) in the activation request of 960. In one example, UE 115-h send the activation request after determining at 955-a to activate base station 105-q. In some cases, the activation request from UE 115-h may communicated to base station 105-p via a physical uplink shared channel, an uplink MAC-CE, a buffer status report, a scheduling request, or a random access preamble (e.g., contention free random access preamble).

At 965, base station 105-p may send a message to UE 115-h to trigger reporting by UE 115-h. In some cases, the reporting may include a channel measurement report (e.g., radio resource management measurement). In some cases, at 965 base station 105-p may trigger channel quality indicator (CQI) reporting by UE 115-h. In some cases, base station 105-p may be triggered by base station 105-p for power saving purposes while base station 105-q is suspended.

At 970, UE 115-h may provide a channel measurement report to base station 105-p. In some cases, the channel measurement report from UE 115-h may include CQI reporting. In some cases, the reporting from UE 115-h may be based on a tracking reference signal received by UE 115-h from base station 105-p or base station 105-q. In some examples, the tracking reference signal may be periodic or aperiodic. In some cases, the tracking reference signal from base station 105-*p* may be quasi-co-located with base station 105-*q*. In some cases, base station 105-*p* may transmit a tracking reference signal to UE 115-*h* that is quasi-co-located with base station 105-*q*. In some cases, base station 105-*p* may forward a report from UE 115-*h* to base station 105-*q* via an inter-node message (e.g., backhaul link 134 of FIG. 1 or 2).

At 975, base station 105-*p* may send an activation request to base station 105-*q*. In some cases, the activation request at 975 may include data from the channel measurement report sent by UE 115-*h* to base station 105-*p* at 970. For example, in some examples the activation request at 975 may include CQI reporting from UE 115-*h*. Additionally or alternatively, UE 115-*h* may send a channel measurement report directly to base station 105-*q*. As shown, base station 105-*p* may send the activation request at 975 based on a determination by UE 115-*h* at 955-*a* or determination by base station 105-*p* at 955-*a* to activate base station 105-*q*. At 980, base station 105-*q* may send an activation complete message to base station 105-*p*.

At 985, base station 105-*p* may send an activation indication to UE 115-*h*. In some cases, base station 105-*p* may send the activation indication at 985 to confirm that base station 105-*q* is activated. In some cases, base station 105-*p* may send MAC-CE message, DCI message, or RRC message to UE 115-*h* to communicate the activation indication.

At 990, UE 115-*h* may establish a connection with base station 105-*q*. In some cases, UE 115-*h* may re-establish a connection with base station 105-*q* at 990. In some cases, UE 115-*h* may perform a random access procedure (e.g., random access channel procedure) with base station 105-*q* after receiving the activation indication at 985. In some cases, UE 115-*h* may perform the random access procedure in order to determine or calculate a timing advance parameter for base station 105-*q*.

At 995, UE 115-*h* may continue sending/receiving data with base station 105-*p*. At 997, UE 115-*h* may start sending/receiving data with base station 105-*q* based on the connection with base station 105-*q* that UE 115-*h* established at 990.

Figure 10:
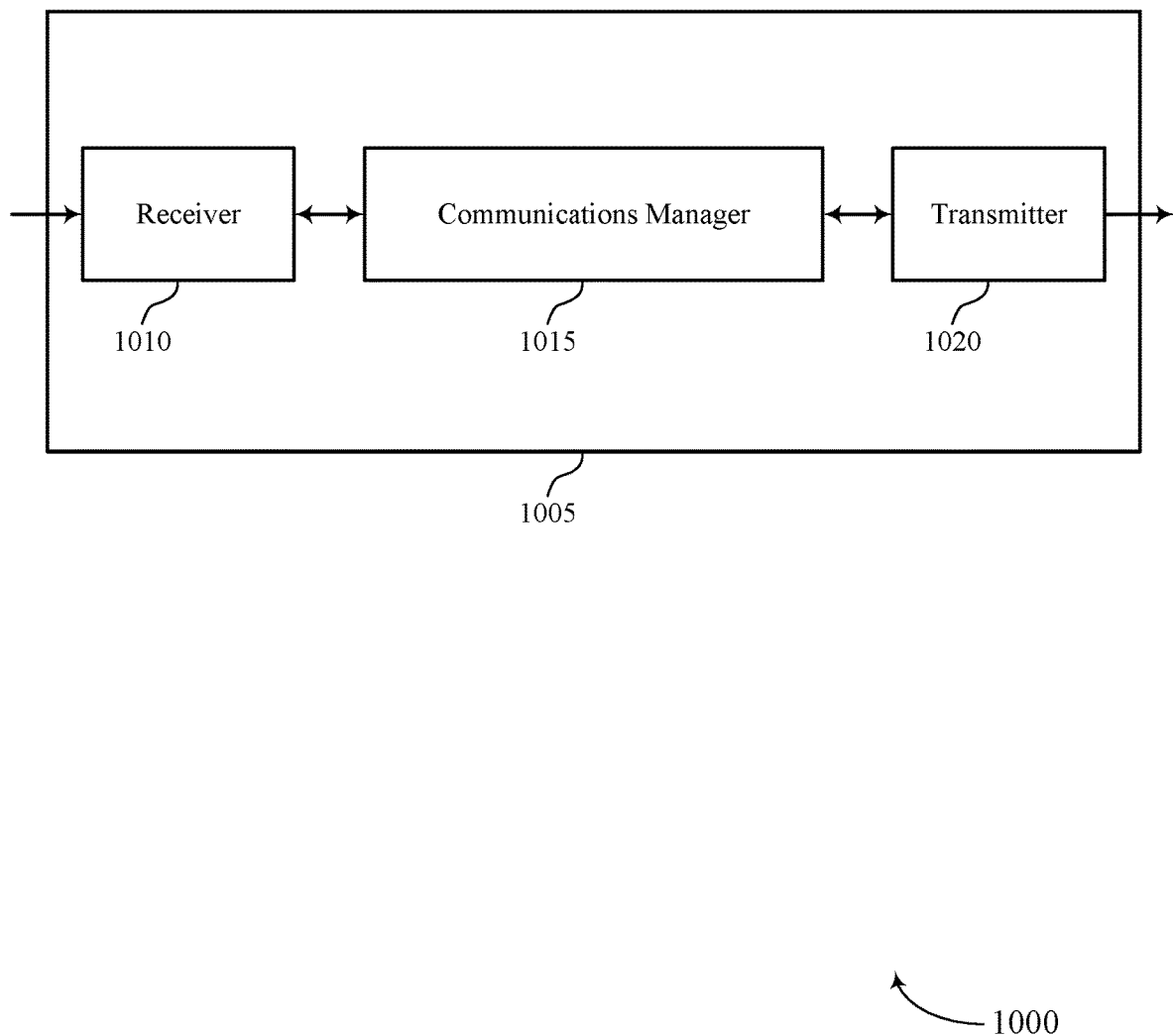
FIGS. 10 and 11 show block diagrams of devices that support fast secondary cell group activation and deactivation using a suspended state in accordance with aspects of the present disclosure.

FIG. 10 shows a block diagram 1000 of a device 1005 that supports fast secondary cell group activation and deactivation using a suspended state in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to fast secondary cell group activation and deactivation using a suspended state, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive from a master cell group of a dual connectivity environment a first message indicating that a secondary cell group of the dual connectivity environment has is suspended, maintain a lower layer configuration for the secondary cell group and modify a measurement report configuration for the secondary cell group based on the first message and while the secondary cell group is suspended, receive from the master cell group a second message indicating that the secondary cell group is no longer suspended, and reconnect to the secondary cell group using the lower layer configuration for the secondary cell group based on the second message. The communications manager 1015 may be an example of aspects of the communications manager 1310 described herein.

The communications manager 1015 may receive from a master cell group of a dual connectivity environment a first message indicating that a secondary cell group of the dual connectivity environment is suspended, maintain a lower layer configuration for the secondary cell group and modify a measurement report configuration for the secondary cell group based at least in part on the first message and while the secondary cell group is suspended, determine that there is data in an uplink buffer for the secondary cell group while the secondary cell group is suspended, and transmit, based at least in part on the determination, the data to the secondary cell group using the lower layer configuration for the secondary cell group.

The communications manager 1015 as described herein may be implemented to realize one or more potential advantages. For example, maintaining the lower layer configuration of the secondary cell may reduce latency by it allowing the device 1005 to avoid delays associated with re-establishing the configuration. Maintaining the lower layer configuration may also conserve power at the device 1005 because the device 1005 avoids signaling to re-establish the configuration. At the system level, the reduction in signaling may increase efficiency by freeing up resources that would otherwise be used to re-establish the lower layer configuration. At the processor level, maintaining the lower layer configuration may reduce the processing burden of the device 1005 because processing resources that would be used to establish the lower layer configuration can be allocated to other tasks.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
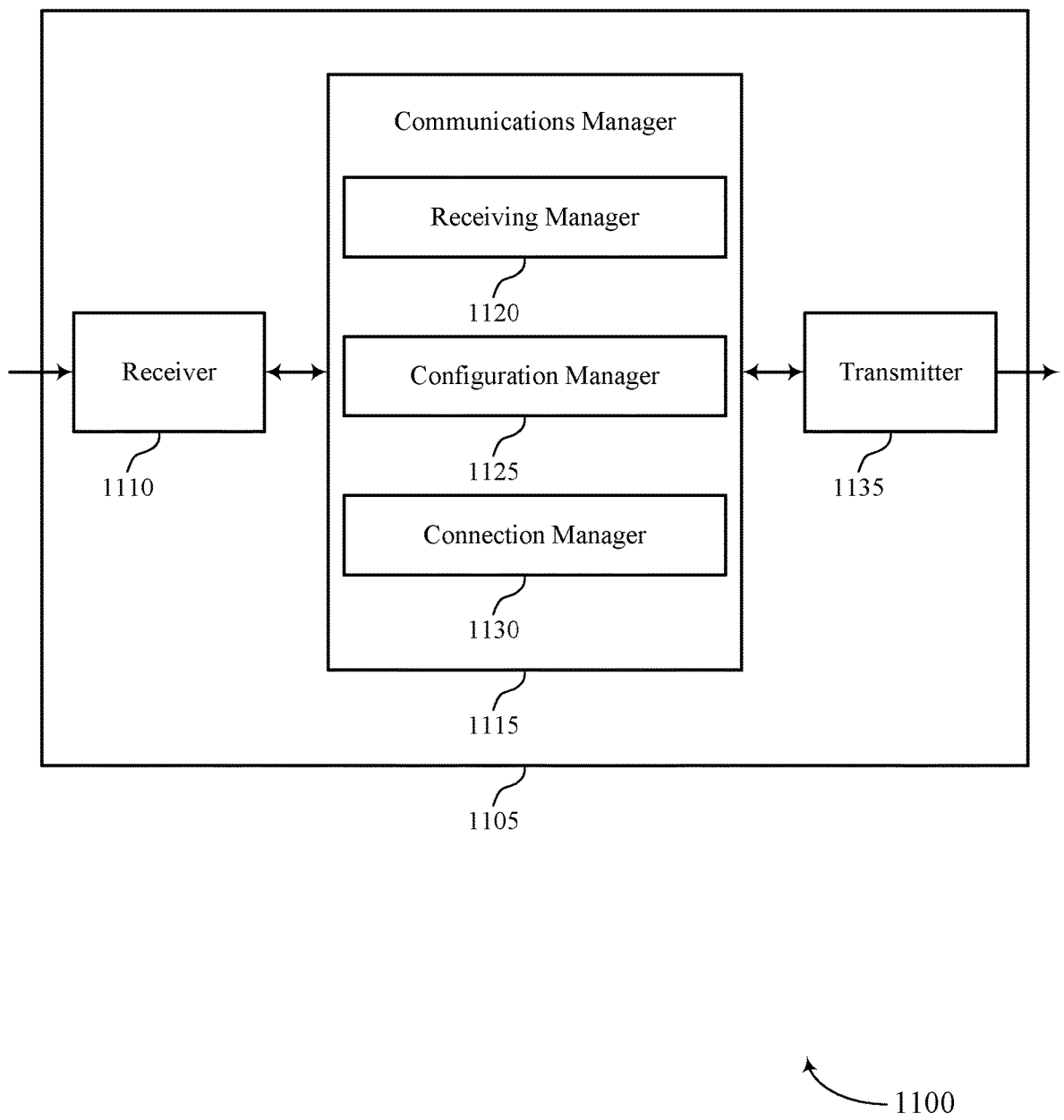

FIG. 11 shows a block diagram 1100 of a device 1105 that supports fast secondary cell group activation and deactivation using a suspended state in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to fast secondary cell group activation and deactivation using a suspended state, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a receiving manager 1120, a configuration manager 1125, and a connection manager 1130. The communications manager 1115 may be an example of aspects of the communications manager 1310 described herein.

The receiving manager 1120 may receive from a master cell group of a dual connectivity environment a first message indicating that a secondary cell group of the dual connectivity environment is suspended and receive from the master cell group a second message indicating that the secondary cell group is no longer suspended.

In some examples, the configuration manager 1125 may maintain a lower layer configuration for the secondary cell group and modify a measurement report configuration for the secondary cell group based on the first message and while the secondary cell group is suspended. In such examples, the connection manager 1130 may reconnect to the secondary cell group using the lower layer configuration for the secondary cell group based on the second message.

In some examples, the configuration manager 1125 may determine that there is data in an uplink buffer for the secondary cell group while the secondary cell group is suspended. In such examples, the connection manager 1130 may transmit, based on the determination, the data to the secondary cell group using the lower layer configuration for the second cell group.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
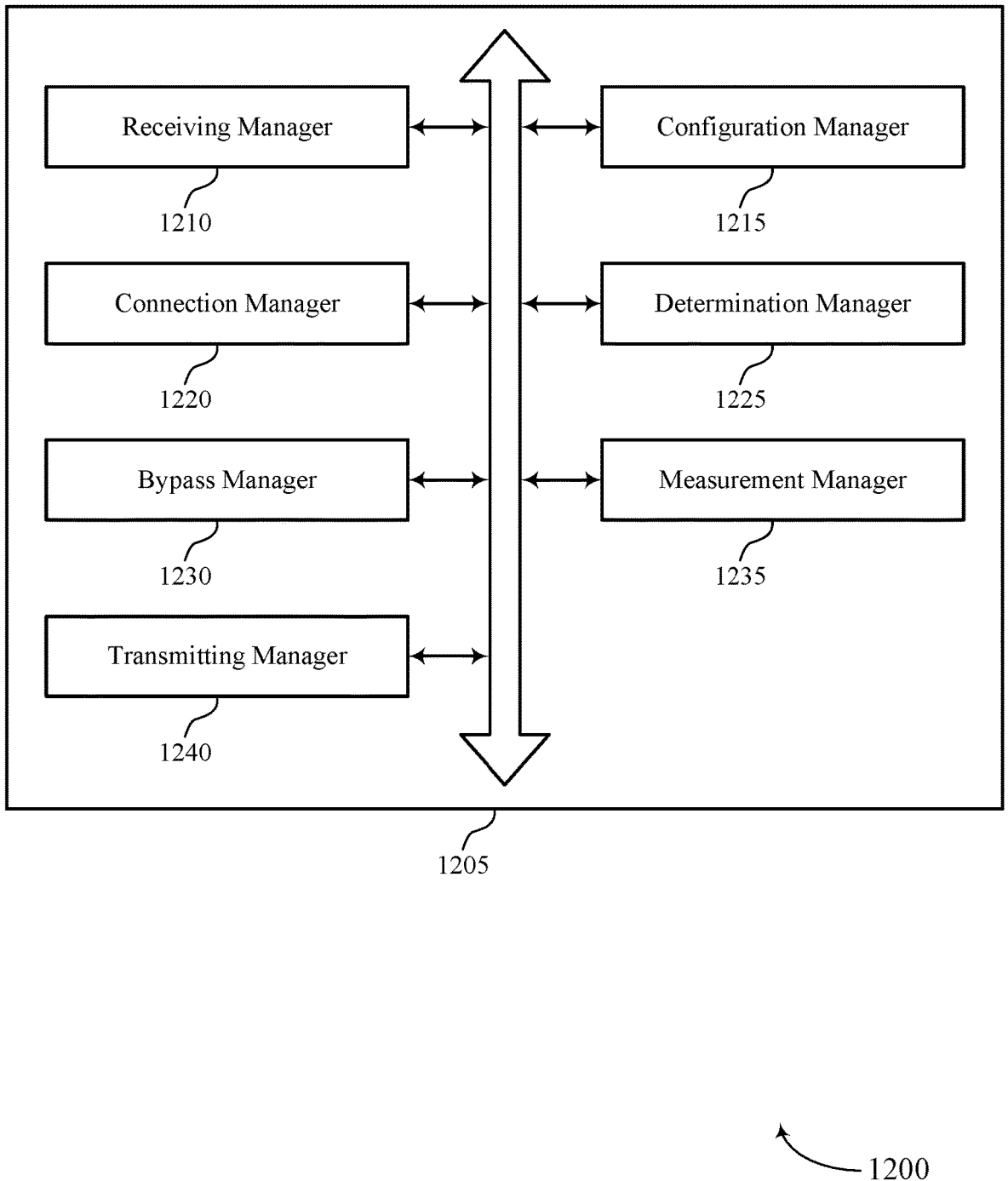
FIG. 12 shows a block diagram of a communications manager that supports fast secondary cell group activation and deactivation using a suspended state in accordance with aspects of the present disclosure.

FIG. 12 shows a block diagram 1200 of a communications manager 1205 that supports fast secondary cell group activation and deactivation using a suspended state in accordance with aspects of the present disclosure. The communications manager 1205 may be an example of aspects of a communications manager 1015, a communications manager 1115, or a communications manager 1310 described herein.

The communications manager 1205 may include a receiving manager 1210, a configuration manager 1215, a connection manager 1220, a determination manager 1225, a bypass manager 1230, a measurement manager 1235, and a transmitting manager 1240. Each of these modules may communicate, directly or indirectly, with one another (e.g., via one or more buses).

The receiving manager 1210 may receive from a master cell group of a dual connectivity environment a first message indicating that a secondary cell group of the dual connectivity environment is suspended. In some examples, the receiving manager 1210 may receive from the master cell group a second message indicating that the secondary cell group is no longer suspended.

In some examples, the receiving manager 1210 may receive the updated lower layer configuration of the secondary cell group from master cell group while the secondary cell group is suspended. In some examples, the receiving manager 1210 may receive a timing advance parameter from the secondary cell group during the random access procedure.

In some examples, the receiving manager 1210 may receive from the master cell group a first master information block indicating the first propagation delay. In some examples, the receiving manager 1210 may receive from the secondary cell group a second master information block indicating the second propagation delay.

In some examples, the receiving manager 1210 may receive from the master cell group a measurement periodicity configuration for the secondary cell group via a radio resource control message. In some examples, the receiving manager 1210 may receive from the master cell group, while the secondary cell group is suspended, a channel measurement trigger for the secondary cell group.

The configuration manager 1215 may maintain a lower layer configuration for the secondary cell group and modify a measurement report configuration for the secondary cell group based on the first message and while the secondary cell group is suspended. In some examples, the configuration manager 1215 may reconfigure the lower layer configuration for the secondary cell group such that data associated with the secondary cell group is mapped to lower layers of the master cell group while the secondary cell group is suspended.

The connection manager 1220 may reconnect to the secondary cell group using the lower layer configuration for the secondary cell group based on the second message. In some examples, the connection manager 1220 may perform a random access procedure with a primary secondary cell of the secondary cell group.

The determination manager 1225 may determine, prior to the first message, a system frame number offset between the master cell group and the secondary cell group, where reconnecting to the secondary cell group includes determining a timing advance parameter based on the system frame number offset, a first propagation delay associated with the master cell group, and a second propagation delay associated with the secondary cell group.

The bypass manager 1230 may refrain from performing one or more of: radio resource management measurements for the secondary cell group or channel quality indicator measurements for the secondary cell group. The measurement manager 1235 may limit radio resource management measurements to serving cells of the secondary cell group while the secondary cell group is suspended.

In some examples, the measurement manager 1235 may limit radio resource management measurements to a fixed number of frequencies of the secondary cell group, where the fixed number of frequencies includes a frequency of a primary secondary cell of the secondary cell group. In some examples, the measurement manager 1235 may perform a radio resource management measurement of the secondary cell group in accordance with the received measurement periodicity configuration while the secondary cell group is suspended.

In some examples, the measurement manager 1235 may perform a channel measurement of the secondary cell group based on a tracking reference signal of the secondary cell group. The transmitting manager 1240 may transmit to the master cell group a radio resource management measurement report for the secondary cell group.

In some examples, the transmitting manager 1240 may transmit to the master cell group a channel measurement report for the secondary cell group. In some examples, the transmitting manager 1240 may transmit to the master cell group an activation request for the secondary cell group.

In some examples, the receiving manager 1210 may receive from a master cell group of a dual connectivity environment a first message indicating that a secondary cell group of the dual connectivity environment is suspended. In some examples, the configuration manager 1215 may maintain a lower layer configuration for the secondary cell group and modify a measurement report configuration for the secondary cell group based at least in part on the first message and while the secondary cell group is suspended. In some examples, the determination manager 1225 may determine that there is data in an uplink buffer for the secondary cell group while the secondary cell group is suspended. In some examples, the transmitting manager 1240 may transmit, based at least in part on the determination, the data to the secondary cell group using the lower layer configuration.

In some examples, the connection manager 1220 may maintain a TA timer for the secondary cell group while the secondary cell group is suspended, the TA timer indicating whether the UE has maintained synchronization with the secondary cell group. In some examples, the determination manager 1225 may determine, based at least in part on the TA timer, that the UE has maintained synchronization with the secondary cell group. In some examples, the transmitting manager 1240 may transmit, based at least in part on determining that the UE has maintained synchronization, a scheduling request to the secondary cell group on PUCCH resources maintained during the suspension of the secondary cell group. In some examples, the receiving manager 1210 may receive an uplink grant in response to the scheduling request, where the data is transmitted to the secondary cell group based at least in part on the received uplink grant.

In some examples, the determination manager 1225 may determine, based at least in part on the TA timer, that the UE has lost synchronization with the secondary cell group. In some examples, the connection manager 1220 may perform a random access procedure with the secondary cell group based at least in part on determining that the UE has lost synchronization with the secondary cell group. In some examples, the connection manager 1220 may obtain timing information for the secondary cell group via the random access procedure, where the data is transmitted to the secondary cell group using the timing information.

In some examples, the connection manager 1220 may maintain DRBs associated with (e.g., established with, shared with) the secondary cell group while the secondary cell group is suspended. In some examples, the connection manager 1220 may maintain uplink resources configured by an uplink grant for the secondary cell group while the secondary cell group is suspended, where the data is transmitted to the secondary cell group using the maintained uplink resources. In some examples, the connection manager 1220 may refrain from sending a scheduling request to, or performing a random access procedure with, the secondary cell group based at least in part on the uplink resources being maintained.

In some examples, the transmitting manager 1240 may transmit SRS or CSI, or both, to the secondary cell group while the secondary cell group is suspended.

In some examples, the connection manager 1220 may release, based at least in part on the secondary cell group being suspended, uplink resources for control information associated with the secondary cell group. In some examples, the transmitting manager 1240 may transmit to the master cell group an activation request for the secondary cell group based on releasing of the uplink resources for control information. In some examples, the connection manager 1220 may release, based on the secondary cell group being suspended, uplink resources configured by an uplink grant for the secondary cell group. In some examples, the activation request includes a MAC-CE, a DCI message, and/or an RRC message.

In some examples, the connection manager 1220 may stop a TA timer for the secondary cell group based at least in part on the secondary cell group being suspended, the TA timer indicating whether the UE has maintained synchronization with the secondary cell group.

In some examples, the connection manager may release resources for CFRA based at least in part on the secondary cell group being suspended. In some examples, the connection manager 1220 may suspend DRBs associated with the secondary cell group based at least in part on the secondary cell group being suspended.

In some examples, the connection manager 1220 may identify that the UE is prohibited from performing a random access procedure with a PSCell of the secondary cell group while the secondary cell group is suspended. In some examples, the connection manager 1220 may stop a TA timer for the secondary cell group based on determining that the UE is prohibited from performing the random access procedure, the TA timer indicating whether the UE has maintained synchronization with the secondary cell group.

In some examples, the connection manager 1220 may identify that the UE is allowed to perform a random access procedure with a PSCell of the secondary cell group while the secondary cell group is suspended. In some examples, the connection manager 1220 may maintain a TA timer for the secondary cell group based on determining that the UE is allowed to perform the random access procedure.

In some examples, the receiving manager 1210 may refrain from monitoring PDCCH resources associated with the secondary cell group while the secondary cell suspended.

Figure 13:
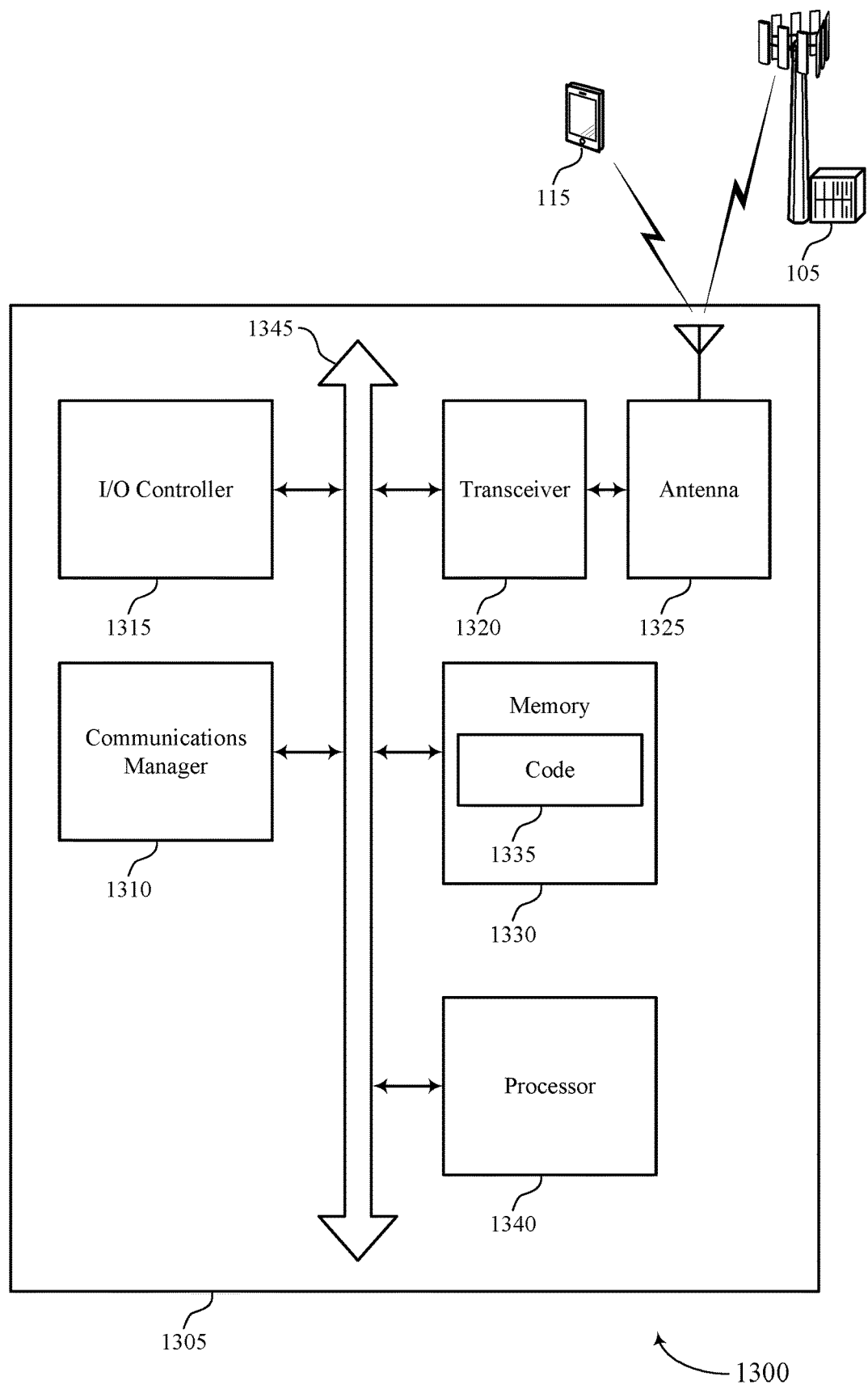
FIG. 13 shows a diagram of a system including a device that supports fast secondary cell group activation and deactivation using a suspended state in accordance with aspects of the present disclosure.

FIG. 13 shows a diagram of a system 1300 including a device 1305 that supports fast secondary cell group activation and deactivation using a suspended state in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

In a first example, the communications manager 1310 may receive from a master cell group of a dual connectivity environment a first message indicating that a secondary cell group of the dual connectivity environment is suspended, maintain a lower layer configuration for the secondary cell group and modify a measurement report configuration for the secondary cell group based on the first message and while the secondary cell group is suspended, receive from the master cell group a second message indicating that the secondary cell group is no longer suspended, and reconnect to the secondary cell group using the lower layer configuration for the secondary cell group based on the second message.

In a second example, the communications manager 1310 may receive from a master cell group of a dual connectivity environment a first message indicating that a secondary cell group of the dual connectivity environment is suspended, maintain a lower layer configuration for the secondary cell group and modify a measurement report configuration for the secondary cell group based on the first message and while the secondary cell group is suspended, determine that there is data in an uplink buffer for the secondary cell group while the secondary cell group is suspended, and transmit, based at least in part on the determination, the data to the secondary cell group using the lower layer configuration.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting fast secondary cell group activation and deactivation using a suspended state).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
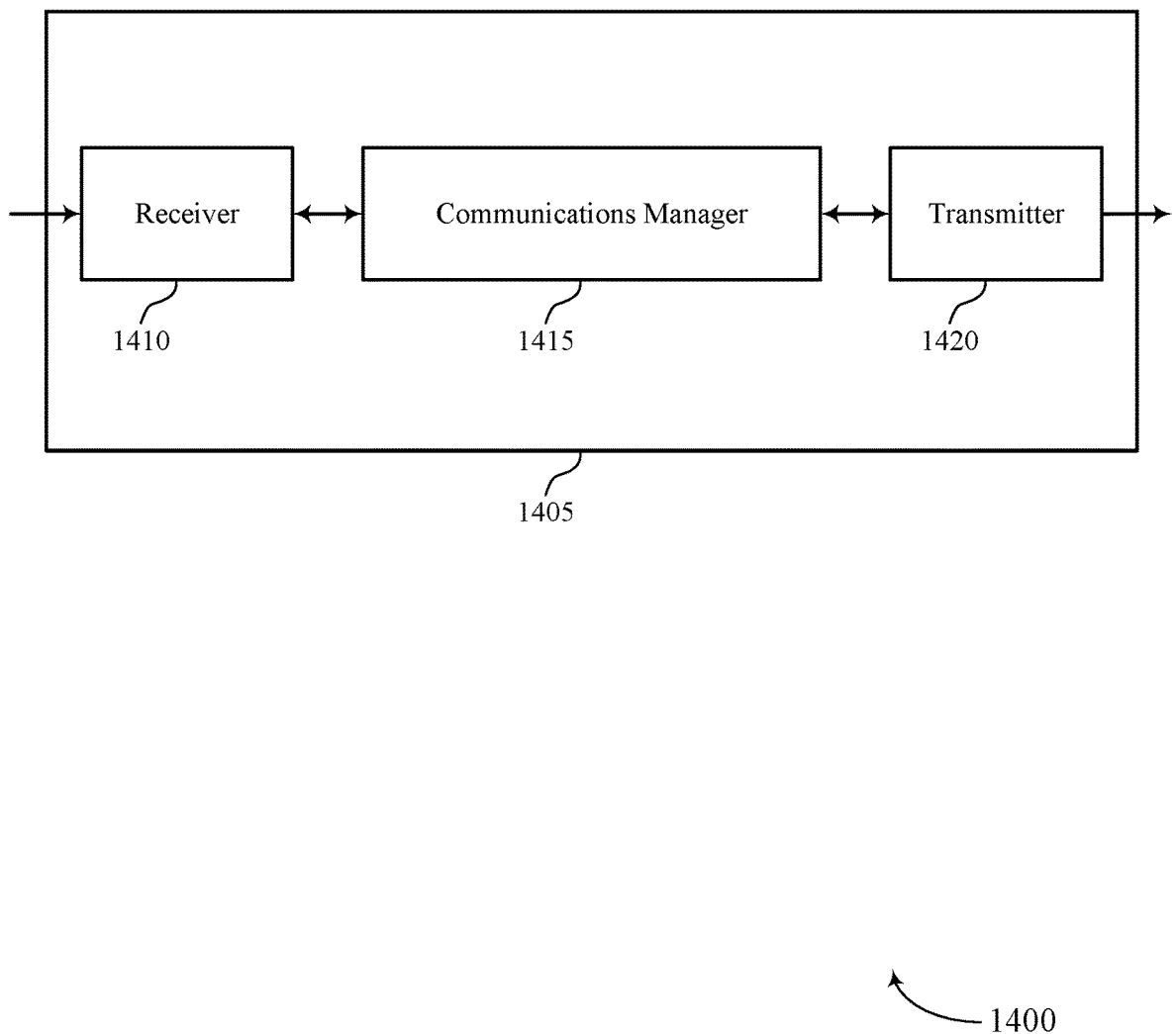
FIGS. 14 and 15 show block diagrams of devices that support fast secondary cell group activation and deactivation using a suspended state in accordance with aspects of the present disclosure.

FIG. 14 shows a block diagram 1400 of a device 1405 that supports fast secondary cell group activation and deactivation using a suspended state in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to fast secondary cell group activation and deactivation using a suspended state, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may transmit to a UE a first message indicating that a secondary cell group in the dual connectivity environment is suspended, receive a channel measurement report from the UE for the secondary cell group, transmit to the secondary cell group an activation request including the channel measurement report from the UE, receive from the secondary cell group a confirmation that the secondary cell group has is no longer suspended, and transmit to the UE a second message indicating that the secondary cell group is no longer suspended. The communications manager 1415 may be an example of aspects of the communications manager 1710 described herein.

The communications manager 1415 may enter a suspended state in which a lower layer configuration for a UE is maintained, receive from a master cell group of the dual connectivity environment an activation request, activate based on the activation request, transmit to the master cell group a confirmation that the secondary cell group has been activated, and reconnect to the UE using the lower layer configuration for the secondary cell group based on being activated. The communications manager 1415 may be an example of aspects of the communications manager 2110 described herein.

The communications manager 1710 as described herein may be implemented to realize one or more potential advantages. For instance, implementing the communications manager 1710 to facilitate the suspension and activation of the secondary cell group may lead to the benefits described herein regarding latency, power consumption, system efficiency, and processing burden. For example, a UE may avoid delays, signaling, and processing associated with re-establishing the lower layer configuration for the secondary cell. And the system efficiency may be increased by freeing up resources that would otherwise be used to re-establish the lower layer configuration.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
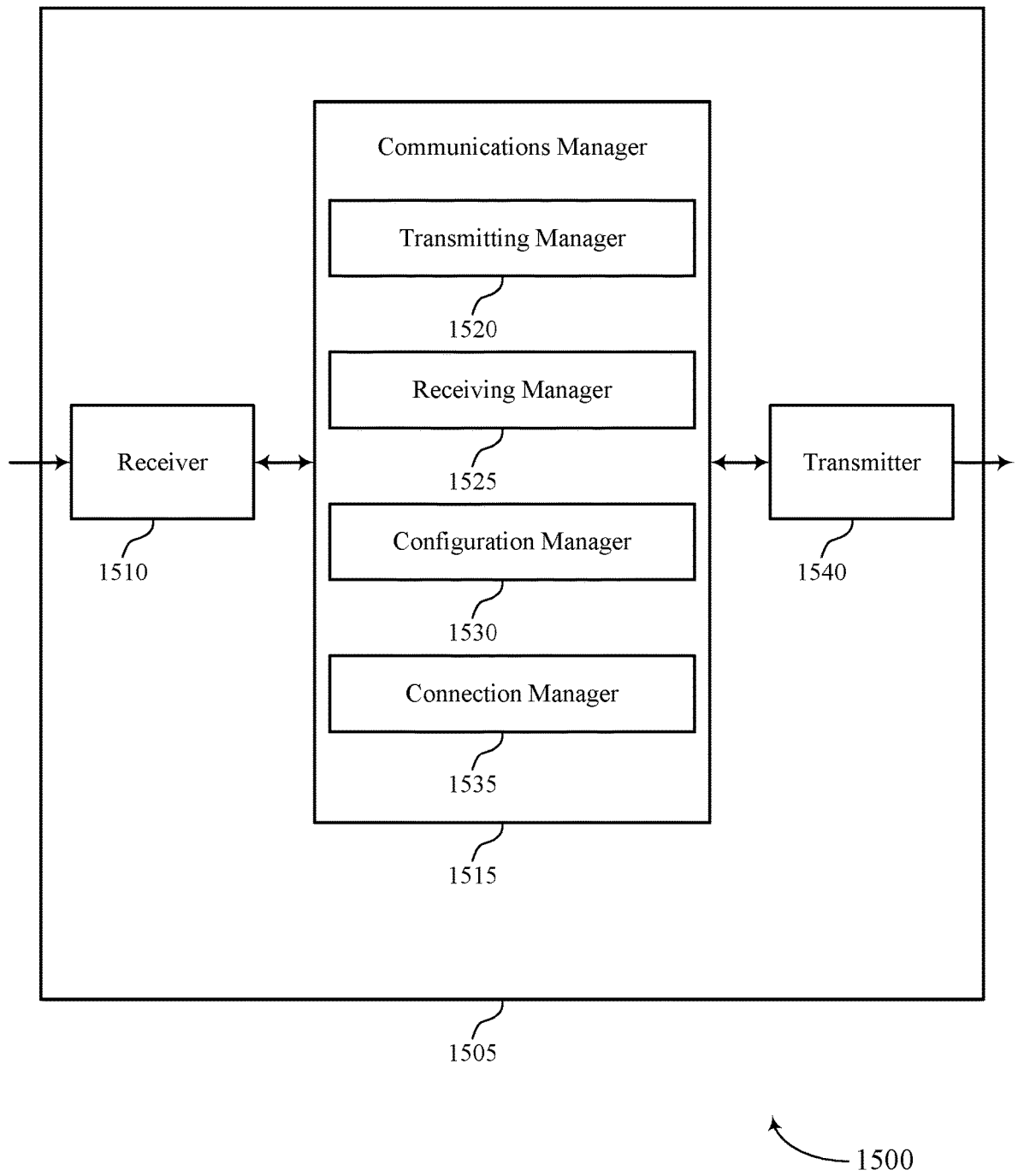

FIG. 15 shows a block diagram 1500 of a device 1505 that supports fast secondary cell group activation and deactivation using a suspended state in accordance with aspects of the present disclosure. The device 1505 may be an example of aspects of a device 1405, or a base station 105 as described herein. The device 1505 may include a receiver 1510, a communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related to fast secondary cell group activation and deactivation using a suspended state, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a transmitting manager 1520, a receiving manager 1525, a configuration manager 1530, and a connection manager 1535. The communications manager 1515 may be an example of aspects of the communications manager 1710 described herein.

The transmitting manager 1520 may transmit to a UE a first message indicating that a secondary cell group in the dual connectivity environment is suspended, transmit to the secondary cell group an activation request including the channel measurement report from the UE, and transmit to the UE a second message indicating that the secondary cell is no longer suspended.

The receiving manager 1525 may receive a channel measurement report from the UE for the secondary cell group and receive from the secondary cell group a confirmation that the secondary cell group is no longer suspended.

The configuration manager 1530 may enter a suspended state in which a lower layer configuration for a UE is maintained and activate based on the activation request. The receiving manager 1525 may receive from a master cell group of the dual connectivity environment an activation request. The transmitting manager 1520 may transmit to the master cell group a confirmation that the secondary cell group has been activated. The connection manager 1535 may reconnect to the UE using the lower layer configuration for the secondary cell group based on being activated.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
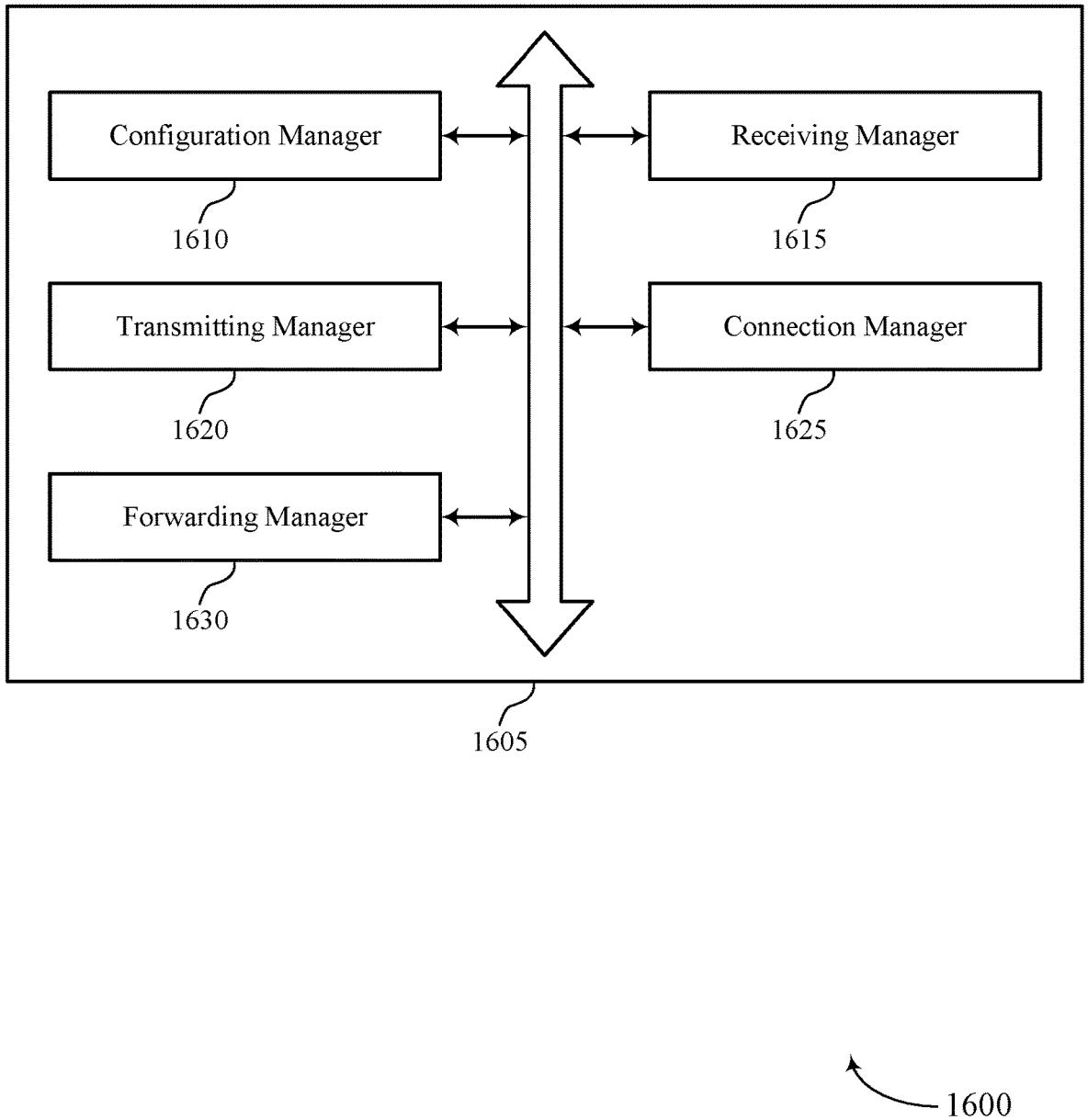
FIG. 16 shows a block diagram of a communications manager that supports fast secondary cell group activation and deactivation using a suspended state in accordance with aspects of the present disclosure.

FIG. 16 shows a block diagram 1600 of a communications manager 1605 that supports fast secondary cell group activation and deactivation using a suspended state in accordance with aspects of the present disclosure. The communications manager 1605 may be an example of aspects of a communications manager 1415, a communications manager 1515, or a communications manager 1710 described herein. The communications manager 1605 may include a configuration manager 1610, a receiving manager 1615, a transmitting manager 1620, a connection manager 1625, and a forwarding manager 1630. Each of these modules may communicate, directly or indirectly, with one another (e.g., via one or more buses).

The transmitting manager 1620 may transmit to a UE a first message indicating that a secondary cell group in the dual connectivity environment is suspended. In some examples, the transmitting manager 1620 may transmit to the secondary cell group an activation request including the channel measurement report from the UE. In some examples, the transmitting manager 1620 may transmit to the UE a second message indicating that the secondary cell group is no longer suspended.

In some examples, the transmitting manager 1620 may transmit a suspend request to the secondary cell group. In some examples, the transmitting manager 1620 may transmit to the UE, prior to the first message, a system frame number offset between the master cell group and the secondary cell group. In some examples, the transmitting manager 1620 may transmit to the UE a measurement periodicity configuration for the secondary cell group via a radio resource control message, where receiving the channel measurement report from the UE includes receiving from the UE a radio resource management measurement report for the secondary cell group.

In some examples, the transmitting manager 1620 may transmit to the UE, while the secondary cell group is suspended, a channel measurement trigger for the secondary cell group, where the channel measurement report from the UE for the secondary cell group is received in response to the channel measurement trigger. In some examples, the transmitting manager 1620 may transmit a tracking reference signal that is QCL with the secondary cell group, where the channel measurement report corresponds to the tracking reference signal.

The receiving manager 1615 may receive a channel measurement report from the UE for the secondary cell group. In some examples, the receiving manager 1615 may receive from the secondary cell group a confirmation that the secondary cell group is no longer suspended. In some examples, the receiving manager 1615 may receive from the secondary cell group an indication that the secondary cell group is suspended, where transmitting the first message is based on the indication received from the secondary cell group.

In some examples, the receiving manager 1615 may receive from the UE an activation request for the secondary cell group, where the activation request is transmitted to the secondary cell group in response to the activation request from the UE. In some examples, the receiving manager 1615 may receive from the secondary cell group an updated lower layer configuration of the secondary cell group while the secondary cell group is suspended.

The configuration manager 1610 may reconfigure the lower layer configuration for the secondary cell group such that data associated with the secondary cell group is mapped to a lower layer of the master cell group while the secondary cell group is suspended. In some examples, the configuration manager 1610 may reconfigure the lower layer configuration of the secondary cell group such that data associated with the secondary cell group is mapped to the lower layer of the secondary cell group while the secondary cell group is no longer suspended. The forwarding manager 1630 may forward the radio resource management measurement report from the UE to the secondary cell group through a modification request message.

The configuration manager 1610 may enter a base station into a suspended state in which a lower layer configuration for a UE to communicate with the base station is maintained. In some examples, the configuration manager 1610 may activate the base station based on the activation request.

In some examples, the configuration manager 1610 may reconfigure the lower layer configuration based on a channel measurement report of the UE that is forwarded to the secondary cell group by the master cell group. In some examples, the configuration manager 1610 may reconfigure the lower layer configuration for the UE such that data associated with the secondary cell group is mapped to the lower layer of the secondary cell group.

In some examples, the configuration manager 1610 may reconfigure the lower layer configuration for the UE such that data associated with the secondary cell group is mapped to a lower layer of the master cell group while the secondary cell group is in the suspended state. The receiving manager 1615 may receive from a master cell group of the dual connectivity environment an activation request. In some examples, the receiving manager 1615 may receive from the master cell group a suspend request, where entering the suspended state is based on the suspend request.

In some examples, the receiving manager 1615 may receive a channel measurement report from the UE, where the channel measurement report corresponds to the tracking reference signal transmitted to the UE. In some examples, the receiving manager 1615 may receive from the master cell group a channel measurement report that the master cell group forwards from the UE to the second cell group, where the channel measurement report corresponds to the tracking reference signal transmitted to the UE.

The transmitting manager 1620 may transmit to the master cell group a confirmation that the secondary cell group has been activated. In some examples, the transmitting manager 1620 may transmit to the master cell group a confirmation that the second cell group has entered the suspended state. In some examples, the transmitting manager 1620 may transmit a timing advance parameter to the UE during the random access procedure.

In some examples, the transmitting manager 1620 may transmit to the UE, after the secondary cell group has been activated, a channel measurement trigger for the secondary cell group. In some examples, the transmitting manager 1620 may transmit a tracking reference signal to the UE. In some examples, the transmitting manager 1620 may transmit a tracking reference signal to the UE while the secondary cell group is in the suspended state.

The connection manager 1625 may reconnect to the UE using the lower layer configuration for the secondary cell group based on being activated. In some examples, the connection manager 1625 may perform a random access procedure with the UE. The forwarding manager 1630 may forward the updated lower layer configuration to the master cell group through a modification request confirmation message.

Figure 17:
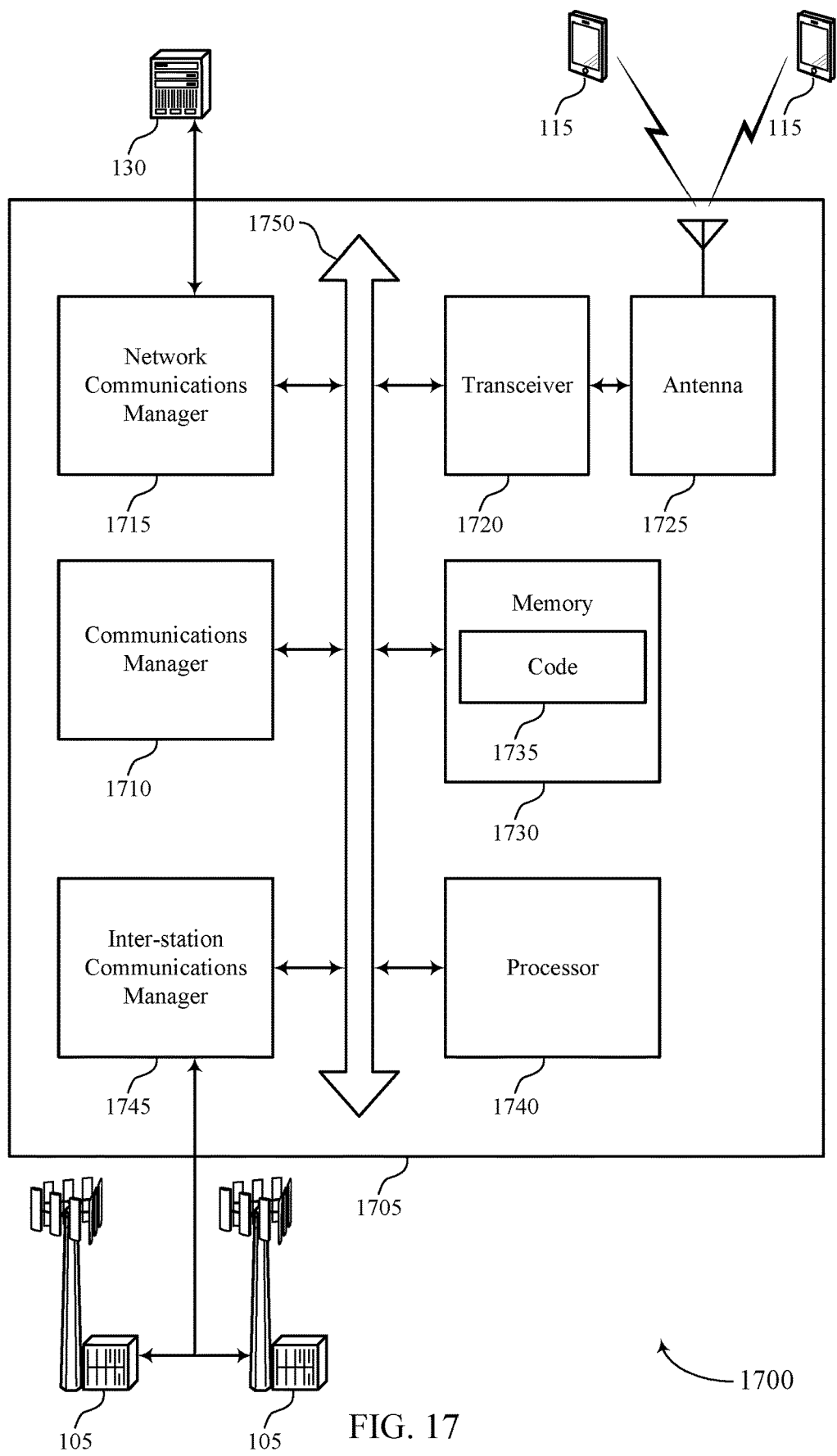
FIG. 17 shows a diagram of a system including a device that supports fast secondary cell group activation and deactivation using a suspended state in accordance with aspects of the present disclosure.

FIG. 17 shows a diagram of a system 1700 including a device 1705 that supports fast secondary cell group activation and deactivation using a suspended state in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit to a UE a first message indicating that a secondary cell group in the dual connectivity environment is suspended, receive a channel measurement report from the UE for the secondary cell group, transmit to the secondary cell group an activation request including the channel measurement report from the UE, receive from the secondary cell group a confirmation that the secondary cell group is no longer suspended, and transmit to the UE a second message indicating that the secondary cell group is no longer suspended.

The communications manager 1710 may enter a suspended state in which a lower layer configuration for a UE, is maintained, receive from a master cell group of the dual connectivity environment an activation request, activate based on the activation request, transmit to the master cell group a confirmation that the secondary cell group has been activated, and reconnect to the UE using the lower layer configuration for the secondary cell group based on being activated.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described herein. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting fast secondary cell group activation and deactivation using a suspended state).

The inter-station communications manager 1745 may manage communications with other base station 105 and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
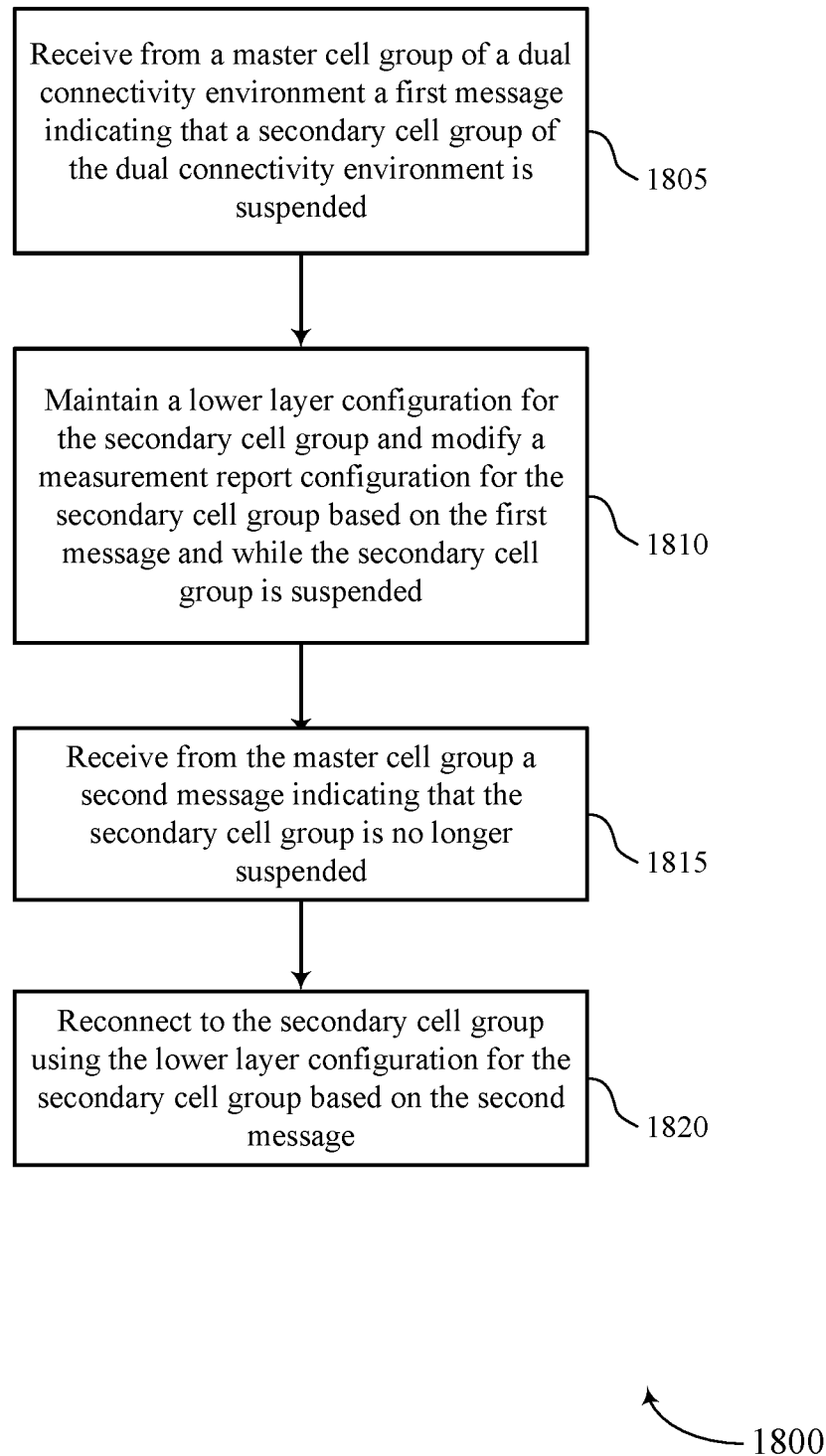
FIGS. 18 through 21 show flowcharts illustrating methods that support fast secondary cell group activation and deactivation using a suspended state in accordance with aspects of the present disclosure.

FIG. 18 shows a flowchart illustrating a method 1800 that supports fast secondary cell group activation and deactivation using a suspended state in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1805, the UE may receive from a master cell group of a dual connectivity environment a first message indicating that a secondary cell group of the dual connectivity environment is suspended. The operations of 1805 may be performed according to the methods described herein. In some examples, aspects of the operations of 1805 may be performed by a receiving manager as described with reference to FIGS. 10 through 13.

At 1810, the UE may maintain a lower layer configuration for the secondary cell group and modify a measurement report configuration for the secondary cell group based on the first message and while the secondary cell group is suspended. The operations of 1810 may be performed according to the methods described herein. In some examples, aspects of the operations of 1810 may be performed by a configuration manager as described with reference to FIGS. 10 through 13.

At 1815, the UE may receive from the master cell group a second message indicating that the secondary cell group is no longer suspended. The operations of 1815 may be performed according to the methods described herein. In some examples, aspects of the operations of 1815 may be performed by a receiving manager as described with reference to FIGS. 10 through 13.

At 1820, the UE may reconnect to the secondary cell group using the lower layer configuration for the secondary cell group based on the second message. The operations of 1820 may be performed according to the methods described herein. In some examples, aspects of the operations of 1820 may be performed by a connection manager as described with reference to FIGS. 10 through 13.

Figure 19:
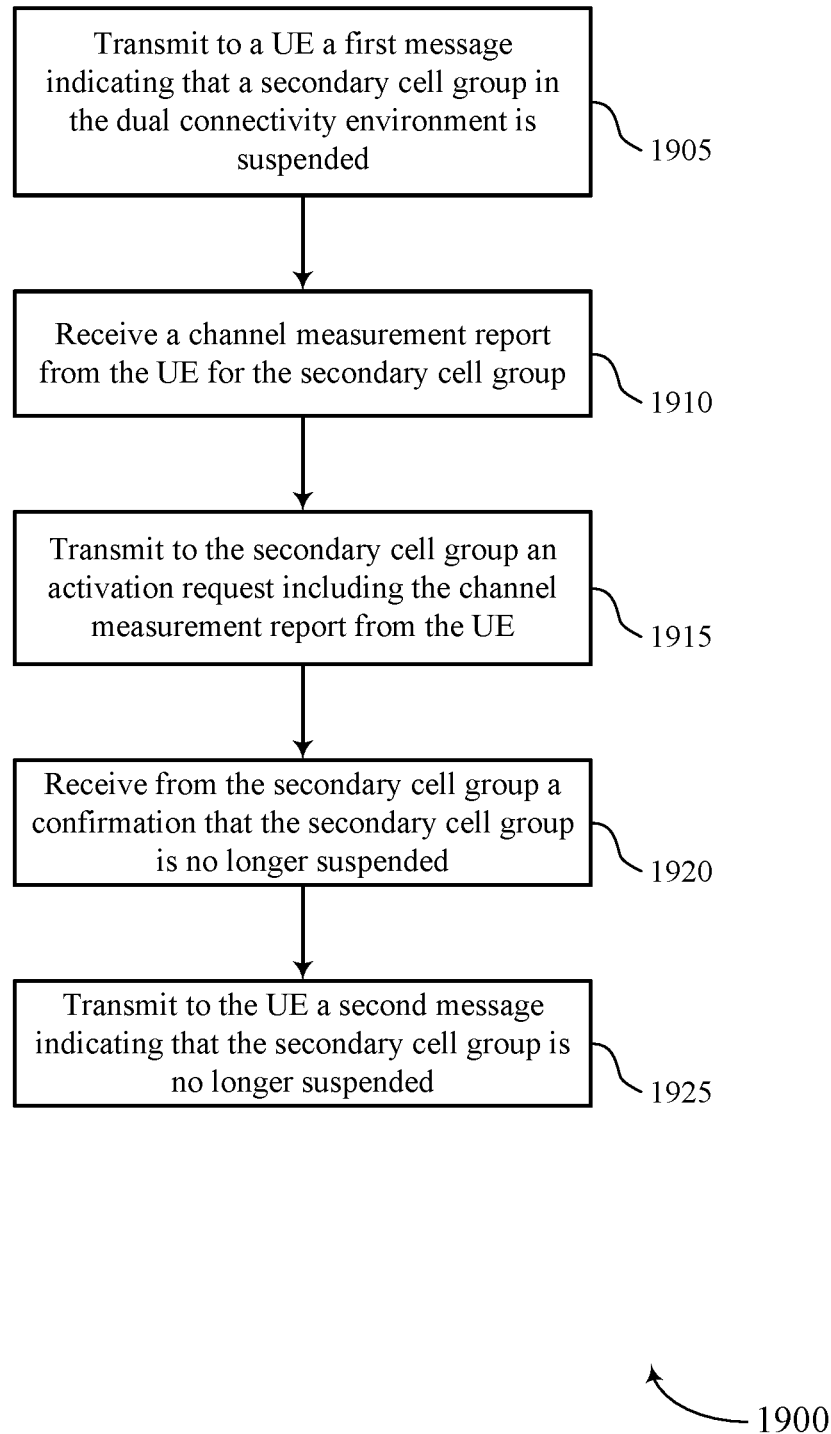

FIG. 19 shows a flowchart illustrating a method 1900 that supports fast secondary cell group activation and deactivation using a suspended state in accordance with aspects of the present disclosure. The operations of method 1900 may be implemented by a base station 105 or its components as described herein. For example, the operations of method 1900 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 1905, the base station may transmit to a UE a first message indicating that a secondary cell group in the dual connectivity environment is suspended. The operations of 1905 may be performed according to the methods described herein. In some examples, aspects of the operations of 1905 may be performed by a transmitting manager as described with reference to FIGS. 14 through 17.

At 1910, the base station may receive a channel measurement report from the UE for the secondary cell group. The operations of 1910 may be performed according to the methods described herein. In some examples, aspects of the operations of 1910 may be performed by a receiving manager as described with reference to FIGS. 14 through 17.

At 1915, the base station may transmit to the secondary cell group an activation request including the channel measurement report from the UE. The operations of 1915 may be performed according to the methods described herein. In some examples, aspects of the operations of 1915 may be performed by a transmitting manager as described with reference to FIGS. 14 through 17.

At 1920, the base station may receive from the secondary cell group a confirmation that the secondary cell group is no longer suspended. The operations of 1920 may be performed according to the methods described herein. In some examples, aspects of the operations of 1920 may be performed by a receiving manager as described with reference to FIGS. 14 through 17.

At 1925, the base station may transmit to the UE a second message indicating that the secondary cell group is no longer suspended. The operations of 1925 may be performed according to the methods described herein. In some examples, aspects of the operations of 1925 may be performed by a transmitting manager as described with reference to FIGS. 14 through 17.

Figure 20:
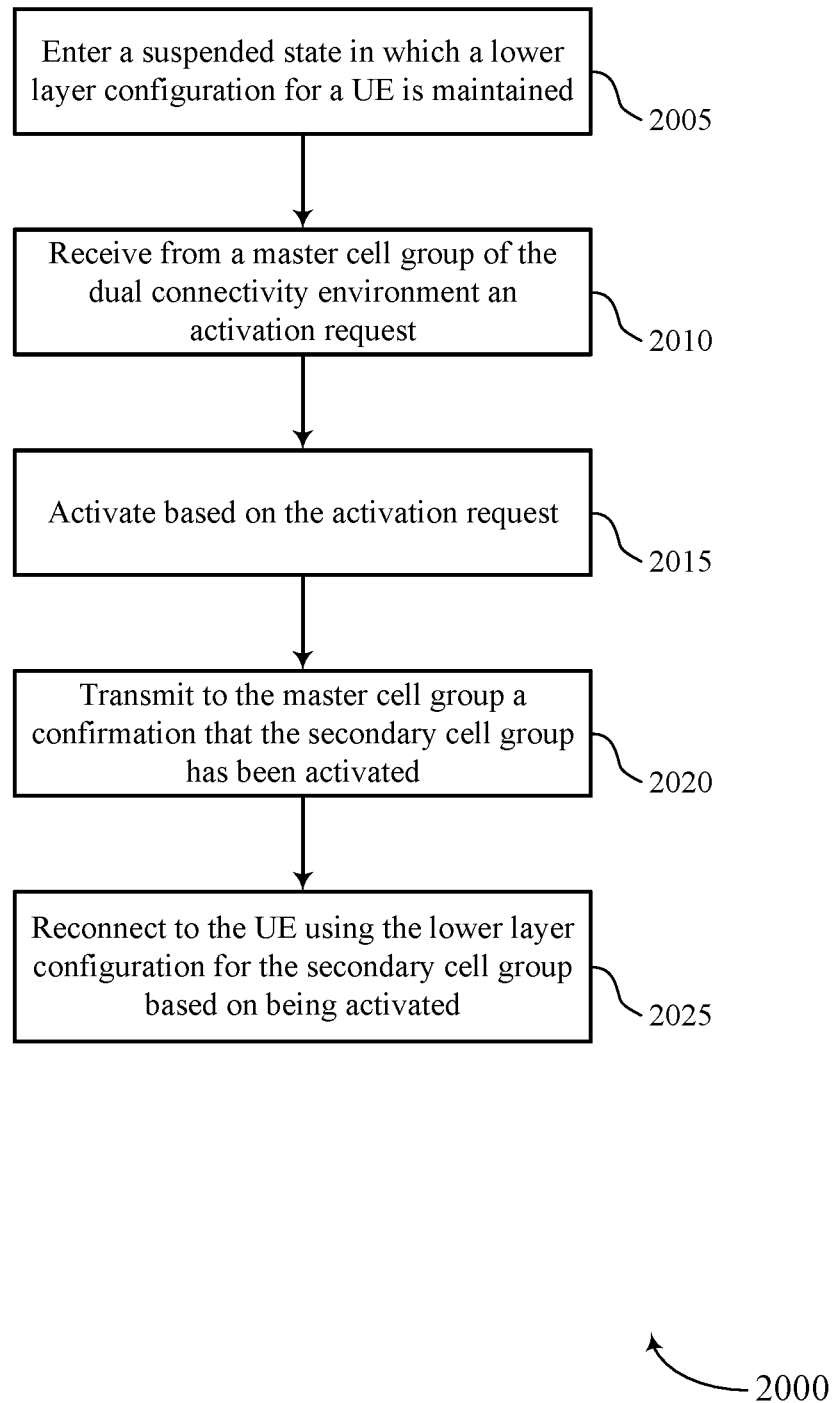

FIG. 20 shows a flowchart illustrating a method 2000 that supports fast secondary cell group activation and deactivation using a suspended state in accordance with aspects of the present disclosure. The operations of method 2000 may be implemented by a master node or its components as described herein. For example, the operations of method 2000 may be performed by a communications manager as described with reference to FIGS. 14 through 17. In some examples, a master node may execute a set of instructions to control the functional elements of the master node to perform the functions described herein. Additionally or alternatively, a master node may perform aspects of the functions described herein using special-purpose hardware.

At 2005, the master node may enter a suspended state in which a lower layer configuration for a UE is maintained. The operations of 2005 may be performed according to the methods described herein. In some examples, aspects of the operations of 2005 may be performed by a configuration manager as described with reference to FIGS. 14 through 17.

At 2010, the master node may receive from a master cell group of the dual connectivity environment an activation request. The operations of 2010 may be performed according to the methods described herein. In some examples, aspects of the operations of 2010 may be performed by a receiving manager as described with reference to FIGS. 14 through 17.

At 2015, the master node may activate based on the activation request. The operations of 2015 may be performed according to the methods described herein. In some examples, aspects of the operations of 2015 may be performed by a configuration manager as described with reference to FIGS. 14 through 17.

At 2020, the master node may transmit to the master cell group a confirmation that the secondary cell group has been activated. The operations of 2020 may be performed according to the methods described herein. In some examples, aspects of the operations of 2020 may be performed by a transmitting manager as described with reference to FIGS. 14 through 17.

At 2025, the master node may reconnect to the UE using the lower layer configuration for the secondary cell group based on being activated. The operations of 2025 may be performed according to the methods described herein. In some examples, aspects of the operations of 2025 may be performed by a connection manager as described with reference to FIGS. 14 through 17.

Figure 21:
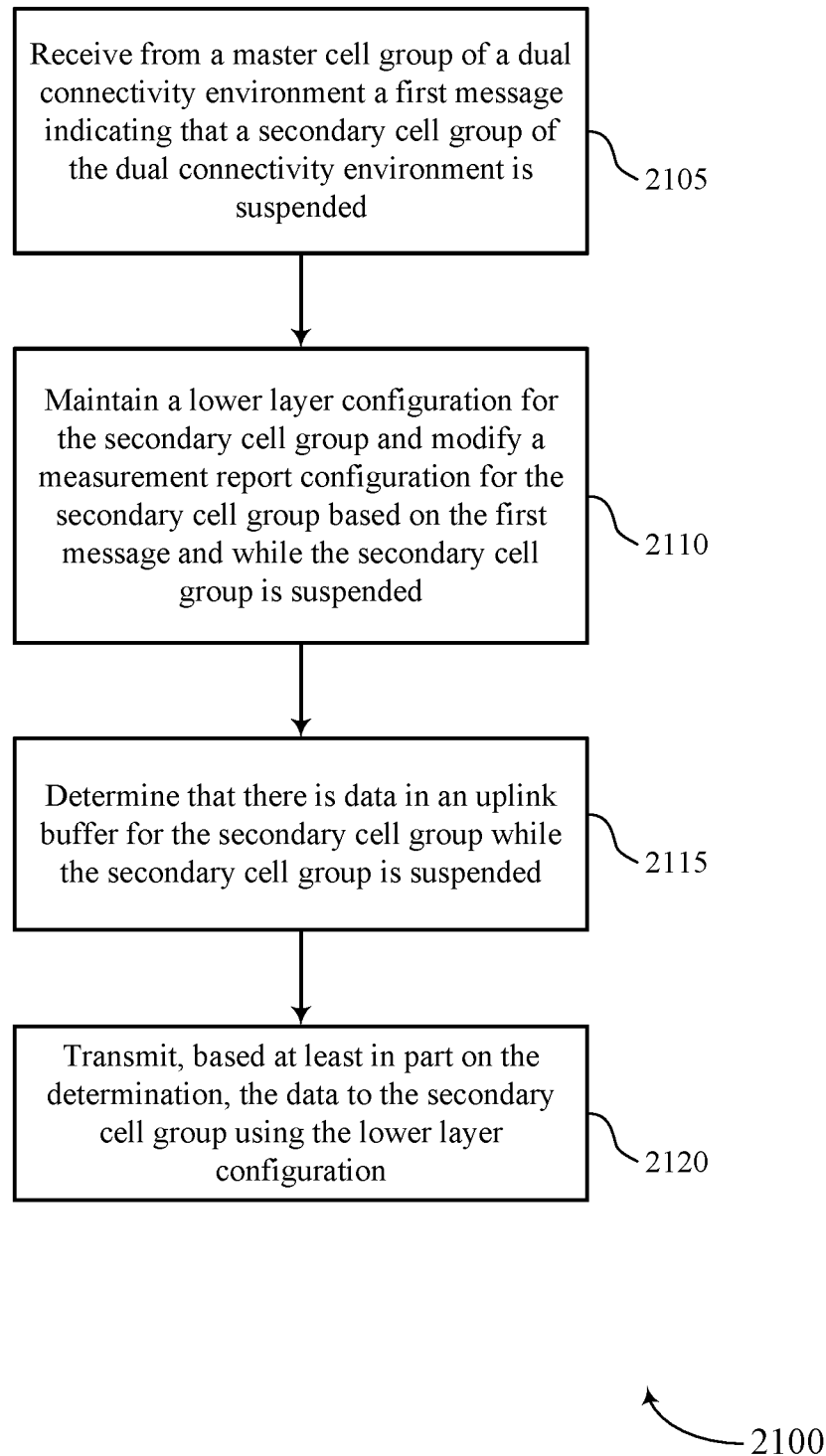

FIG. 21 shows a flowchart illustrating a method 2100 that supports fast secondary cell group activation and deactivation using a suspended state in accordance with aspects of the present disclosure. The operations of method 2100 may be implemented by a UE or its components as described herein. For example, the operations of method 2100 may be performed by a communications manager as described with reference to FIGS. 10 through 13. In some examples, a UE may execute a set of instructions to control the functional elements of the UE to perform the functions described herein. Additionally or alternatively, UE may perform aspects of the functions described herein using special-purpose hardware.

At 2105, the UE may receive from a master cell group of a dual connectivity environment a first message indicating that a secondary cell group of the dual connectivity environment is suspended. The operations of 2105 may be performed according to the methods described herein. In some examples, aspects of the operations of 2105 may be performed by a receiving manager as described with reference to FIGS. 10 through 13.

At 2110, the UE may maintain a lower layer configuration for the secondary cell group and modify a measurement report configuration for the secondary cell group based on the first message and while the secondary cell group is suspended. The operations of 2110 may be performed according to the methods described herein. In some examples, aspects of the operations of 2110 may be performed by a configuration manager as described with reference to FIGS. 10 through 13.

At 2115, the UE may determine that there is data in an uplink buffer for the secondary cell group while the secondary cell group is suspended. The operations of 2115 may be performed according to the methods described herein. In some examples, aspects of the operations of 2115 may be performed by a determination manager as described with reference to FIGS. 10 through 13.

At 2120, the UE may transmit, based at least in part on the determination, the data to the secondary cell group using the lower layer configuration. The operations of 2120 may be performed according to the methods described herein. In some examples, aspects of the operations of 2120 may be performed by a transmitting manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication by a user equipment (UE), comprising:
    receiving, from a master cell group of a dual connectivity environment via a radio resource control message, a measurement periodicity configuration for a secondary cell group of the dual connectivity environment;
    determining a system frame number offset between the master cell group and the secondary cell group;
    receiving, from the master cell group, a first message indicating that the secondary cell group is deactivated, wherein deactivation of the secondary cell group is based at least in part on first data traffic associated with the master cell group, the secondary cell group, and the UE before the secondary cell group is deactivated;
    maintaining a lower layer configuration for the secondary cell group and modifying a measurement report configuration for the secondary cell group based at least in part on the first message and while the secondary cell group is deactivated, wherein modifying the measurement report configuration for the secondary cell group comprises limiting radio resource management measurements to a set quantity of frequencies among serving cells of the secondary cell group while the secondary cell group is deactivated;
    performing a radio resource management measurement of the set quantity of frequencies among serving cells of the secondary cell group in accordance with the modified measurement report configuration and the received measurement periodicity while the secondary cell group is deactivated;
    receiving, from the master cell group based at least in part on second data traffic associated with the master cell group, the secondary cell group, and the UE while the secondary cell group is deactivated, a second message indicating that the secondary cell group is no longer deactivated;
    determining a timing advance parameter based at least in part on the system frame number offset, a first propagation delay associated with the master cell group, and a second propagation delay associated with the secondary cell group; and
    reconnecting, in accordance with determining the timing advance parameter, to the secondary cell group using the lower layer configuration for the secondary cell group based at least in part on the second message.

2. The method of claim 1, wherein reconnecting to the secondary cell group comprises:
    reconfiguring the lower layer configuration for the secondary cell group such that data associated with the secondary cell group is mapped to lower layers of the master cell group.

3. The method of claim 2, further comprising:
    receiving the reconfigured lower layer configuration of the secondary cell group from the master cell group while the secondary cell group is deactivated.

4. The method of claim 2, wherein reconnecting to the secondary cell group comprises:
    reconfiguring the lower layer configuration of the secondary cell group such that data associated with the secondary cell group is mapped to a lower layer of the secondary cell group.

5. The method of claim 1, wherein the first message or the second message comprises one or more of: a medium access control (MAC) control element (MAC-CE), a downlink control information (DCI), or a radio resource control (RRC) message.

6. The method of claim 1, wherein reconnecting to the secondary cell group comprises:
    performing a random access procedure with a primary secondary cell of the secondary cell group.

7. The method of claim 6, further comprising: receiving a second timing advance parameter from the secondary cell group during the random access procedure.

8. The method of claim 1, further comprising:
    receiving from the master cell group a first master information block indicating the first propagation delay; and
    receiving from the secondary cell group a second master information block indicating the second propagation delay.

9. The method of claim 1, wherein modifying the measurement report configuration for the secondary cell group comprises:
    refraining from performing one or more of: radio resource management measurements for the secondary cell group or channel quality indicator measurements for the secondary cell group.

10. The method of claim 1, wherein the set quantity of frequencies includes a frequency of a primary secondary cell of the secondary cell group.

11. The method of claim 1, further comprising:
    transmitting, to the master cell group based at least in part on the radio resource management measurement, a radio resource management measurement report for the secondary cell group.

12. The method of claim 1, further comprising:
    receiving from the master cell group, while the secondary cell group is deactivated, a channel measurement trigger for the secondary cell group;
    performing a channel measurement of the secondary cell group based on a tracking reference signal; and
    transmitting to the master cell group a channel measurement report for the secondary cell group.

13. The method of claim 1, further comprising:
    determining, while the secondary cell group is deactivated, that there is data in an uplink buffer for the secondary cell group; and
    transmitting to the master cell group an activation request for the secondary cell group based at least in part on the determination.

14. The method of claim 1, further comprising:
stopping a timing advance (TA) timer for the secondary cell group based at least in part on the secondary cell group being deactivated, the TA timer indicating whether the UE has maintained synchronization with the secondary cell group.

15. The method of claim 1 further comprising:
releasing, based at least in part on the secondary cell group being deactivated, uplink resources for control information associated with the secondary cell group; and
transmitting to the master cell group an activation request for the secondary cell group based at least in part on releasing of the uplink resources for control information.

16. The method of claim 1 further comprising:
releasing, based at least in part on the secondary cell group being deactivated, uplink resources configured by an uplink grant for the secondary cell group.

17. A user equipment (UE) for wireless communication, comprising:
one or more memories storing processor-executable code; and
one or more processors coupled with the one or more memories and individually or collectively operable to cause the UE to:
receive from a master cell group of a dual connectivity environment via a radio resource control message, a measurement periodicity configuration for a secondary cell group of the dual connectivity environment;
determine a system frame number offset between the master cell group and the secondary cell group;
receive, from the master cell group, a first message indicating that the secondary cell group is deactivated, wherein deactivation of the secondary cell group is based at least in part on first data traffic associated with the master cell group, the secondary cell group, and the UE before the secondary cell group is deactivated;
maintain a lower layer configuration for the secondary cell group and modify a measurement report configuration for the secondary cell group based at least in part on the first message and while the secondary cell group is deactivated, wherein modifying the measurement report configuration for the secondary cell group comprises limiting radio resource management measurements to a set quantity of frequencies among serving cells of the secondary cell group while the secondary cell group is deactivated;
perform a radio resource management measurement of the set quantity of frequencies among the serving cells of the secondary cell group in accordance with the modified measurement report configuration and the received measurement periodicity while the secondary cell group is deactivated;
receive, from the master cell group based at least in part on second data traffic associated with the master cell group, the secondary cell group, and the UE while the secondary cell group is deactivated, a second message indicating that the secondary cell group is no longer deactivated;
determine a timing advance parameter based at least in part on the system frame number offset, a first propagation delay associated with the master cell group, and a second propagation delay associated with the secondary cell group; and
reconnect, in accordance with determining the timing advance parameter, to the secondary cell group using the lower layer configuration for the secondary cell group based at least in part on the second message.

18. The UE of claim 17, wherein the one or more processors are individually or collectively further operable to execute the code to cause the UE to:
reconfigure the lower layer configuration for the secondary cell group such that data associated with the secondary cell group is mapped to lower layers of the master cell group.

19. The UE of claim 18, wherein the one or more processors are individually or collectively further operable to execute the code to cause the UE to:
receive the reconfigured lower layer configuration of the secondary cell group from the master cell group while the secondary cell group is deactivated.

20. The UE of claim 18, wherein the one or more processors are individually or collectively further operable to execute the code to cause the UE to:
reconfigure the lower layer configuration of the secondary cell group such that data associated with the secondary cell group is mapped to a lower layer of the secondary cell group.

21. The UE of claim 17, wherein the first message or the second message comprises one or more of: a medium access control (MAC) control element (MAC-CE), a downlink control information (DCI), or a radio resource control (RRC) message.

22. The UE of claim 17, wherein the one or more processors are individually or collectively further operable to execute the code to cause the UE to:
perform a random access procedure with a primary secondary cell of the secondary cell group.

23. The UE of claim 22, wherein the one or more processors are individually or collectively further operable to execute the code to cause the UE to: receive a second timing advance parameter from the secondary cell group during the random access procedure.

24. The UE of claim 17, wherein the one or more processors are individually or collectively further operable to execute the code to cause the UE to:
receive from the master cell group a first master information block indicating the first propagation delay; and
receive from the secondary cell group a second master information block indicating the second propagation delay.

25. A UE for wireless communication, comprising:
means for receiving from a master cell group of a dual connectivity environment via a radio resource control message, a measurement periodicity configuration for a secondary cell group of the dual connectivity environment;
means for determining a system frame number offset between the master cell group and the secondary cell group;
means for receiving, from the master cell group, a first message indicating that the secondary cell group is deactivated, wherein deactivation of the secondary cell group is based at least in part on first data traffic associated with the master cell group, the secondary cell group, and the UE before the secondary cell group is deactivated;
means for maintaining a lower layer configuration for the secondary cell group and modifying a measurement report configuration for the secondary cell group based at least in part on the first message and while the secondary cell group is deactivated, wherein modifying the measurement report configuration for the secondary cell group comprises limiting radio resource management measurements to a set quantity of frequencies among serving cells of the secondary cell group while the secondary cell group is deactivated;

means for performing a radio resource management measurement of the set quantity of frequencies among serving cells of the secondary cell group in accordance with the modified measurement report configuration and the received measurement periodicity while the secondary cell group is deactivated;

means for receiving, from the master cell group based at least in part on second data traffic associated with the master cell group, the secondary cell group, and the UE while the secondary cell group is deactivated, a second message indicating that the secondary cell group is no longer deactivated;

means for determining a timing advance parameter based at least in part on the system frame number offset, a first propagation delay associated with the master cell group, and a second propagation delay associated with the secondary cell group; and means for reconnecting, in accordance with determining the timing advance parameter, to the secondary cell group using the lower layer configuration for the secondary cell group based at least in part on the second message.

26. A non-transitory computer-readable medium storing code for wireless communication at a user equipment (UE), the code comprising instructions executable by one or more processors to:

receive from a master cell group of a dual connectivity environment via a radio resource control message, a measurement periodicity configuration for a secondary cell group of the dual connectivity environment;

determine a system frame number offset between the master cell group and the secondary cell group;

receive, from the master cell group, a first message indicating that the secondary cell group is deactivated, wherein deactivation of the secondary cell group is based at least in part on first data traffic associated with the master cell group, the secondary cell group, and the UE before the secondary cell group is deactivated;

maintain a lower layer configuration for the secondary cell group and modify a measurement report configuration for the secondary cell group based at least in part on the first message and while the secondary cell group is deactivated, wherein modifying the measurement report configuration for the secondary cell group comprises limiting radio resource management measurements to a set quantity of frequencies among serving cells of the secondary cell group while the secondary cell group is deactivated;

perform a radio resource management measurement of the set quantity of frequencies among serving cells of the secondary cell group in accordance with the modified measurement report configuration and the received measurement periodicity while the secondary cell group is deactivated;

receive, from the master cell group based at least in part on second data traffic associated with the master cell group, the secondary cell group, and the UE while the secondary cell group is deactivated, a second message indicating that the secondary cell group is no longer deactivated;

determine a timing advance parameter based at least in part on the system frame number offset, a first propagation delay associated with the master cell group, and a second propagation delay associated with the secondary cell group; and reconnect, in accordance with determining the timing advance parameter, to the secondary cell group using the lower layer configuration for the secondary cell group based at least in part on the second message.

* * * * *